US009041553B2

(12) United States Patent
Sako et al.

(10) Patent No.: US 9,041,553 B2
(45) Date of Patent: May 26, 2015

(54) INFORMATION PROCESSING DEVICE, TERMINAL DEVICE, INFORMATION PROCESSING METHOD, AND STATUS DISPLAY METHOD

(71) Applicant: Sony Corporation, Tokyo (JP)

(72) Inventors: Yoichiro Sako, Tokyo (JP); Masaaki Tsuruta, Tokyo (JP)

(73) Assignee: SONY CORPORATION, Tokyo (JP)

( * ) Notice: Subject to any disclaimer, the term of this patent is extended or adjusted under 35 U.S.C. 154(b) by 200 days.

(21) Appl. No.: 13/748,830

(22) Filed: Jan. 24, 2013

(65) Prior Publication Data
US 2013/0214940 A1   Aug. 22, 2013

(30) Foreign Application Priority Data
Feb. 16, 2012  (JP) ................. 2012-031652

(51) Int. Cl.
G08G 1/09 (2006.01)
G08G 1/0967 (2006.01)
G01C 21/34 (2006.01)
G08G 1/01 (2006.01)
G08G 1/14 (2006.01)
G08G 1/0968 (2006.01)
G08G 1/0969 (2006.01)
G08G 1/123 (2006.01)
G08G 1/00 (2006.01)

(52) U.S. Cl.
CPC ............. *G08G 1/0967* (2013.01); *G01C 21/34* (2013.01); *G08G 1/0112* (2013.01); *G08G 1/0133* (2013.01); *G08G 1/141* (2013.01); *G08G 1/096716* (2013.01); *G08G 1/096741* (2013.01); *G08G 1/096775* (2013.01); *G08G 1/096816* (2013.01); *G08G 1/096844* (2013.01); *G08G 1/0969* (2013.01); *G08G 1/123* (2013.01); *G08G 1/20* (2013.01); *G01C 21/3415* (2013.01)

(58) Field of Classification Search
CPC .................... G08G 1/0967; G01C 21/3415
USPC ............................................ 340/905
See application file for complete search history.

(56) References Cited

U.S. PATENT DOCUMENTS

| 7,026,958 B2 * | 4/2006 | Wainfan et al. | 340/995.13 |
| 7,755,509 B2 * | 7/2010 | Bespalov et al. | 340/905 |
| 2006/0055565 A1 * | 3/2006 | Kawamata et al. | 340/995.13 |

FOREIGN PATENT DOCUMENTS

JP   2008-147865   6/2008

* cited by examiner

*Primary Examiner* — Kerri McNally
(74) *Attorney, Agent, or Firm* — Hazuki International, LLC

(57) ABSTRACT

There is provided an information processing device including a difference information acquiring unit that acquires, for one or a plurality of first vehicles that travel according to a content of reference information including a predetermined traveling speed or arrival time, difference information representing a difference between an actual traveling speed or arrival time in each of the first vehicles and the content of the reference information, and a road status analyzing unit that analyzes a road status in a predetermined region using difference information related to the first vehicles present in the predetermined region.

16 Claims, 30 Drawing Sheets

EXAMPLE (SPEED DIFFERENCE) OF DIFFERENCE INFORMATION

| PASSAGE REGION | REFERENCE DRIVING SPEED | ACTUAL DRIVING SPEED | SPEED DIFFERENCE |
|---|---|---|---|
| REGION R1 | 20~30 km/h | 32 km/h | +2 km/h |
| REGION R2 | 20~30 km/h | 28 km/h | 0 km/h |
| REGION R3 | 40~60 km/h | 50 km/h | 0 km/h |
| REGION R4 | 40~60 km/h | 30 km/h | -10 km/h |
| REGION R4 (EXPRESSWAY) | 70~90 km/h | 85 km/h | 0 km/h |
| REGION R5 (EXPRESSWAY) | 70~90 km/h | 30 km/h | -40 km/h |

FIG. 1

OX BUS OPERATION SCHEDULE TABLE

| STOP NAME | SCHEDULED TIMES OF ARRIVAL AND DEPARTURE |
|---|---|
| A1 BUS STOP | 17:30 DEPARTURE |
| A2 BUS STOP | 17:45 ARRIVAL |
| A3 BUS STOP | 17:50 ARRIVAL |
| B1 BUS STOP | 17:55 ARRIVAL |
| B2 BUS STOP | 18:10 ARRIVAL |

FIG. 2

△X TAXI SPEED REGULATION TABLE

| LEGAL SPEED | REFERENCE DRIVING SPEED |
|---|---|
| 30 km/h | 20~30 km/h |
| 40 km/h | 35~45 km/h |
| 50 km/h | 40~60 km/h |
| 70 km/h | 60~70 km/h |
| 80 km/h | 70~90 km/h |
| 80 km/h OR MORE | 80~100 km/h |

△X TRANSPORTATION DELIVERY SCHEDULE TABLE

| DELIVERY DESTINATION ADDRESS | SCHEDULED DELIVERY TIME |
|---|---|
| 1-1, △CHO, OX CITY | 17:45 |
| 2-3, △CHO, OX CITY | 18:00 |
| 1-8-2, ●CHO, OX CITY | 18:05 |

- TRAFFIC CONGESTION DETECTION
- SELECTION OF TRAFFIC CONGESTION BYPASS ROUTE
- ANALYSIS OF CAUSE OF TRAFFIC CONGESTION

EXAMPLE (SPEED DIFFERENCE) OF DIFFERENCE INFORMATION

| PASSAGE REGION | REFERENCE DRIVING SPEED | ACTUAL DRIVING SPEED | SPEED DIFFERENCE |
|---|---|---|---|
| REGION R1 | 20~30 km/h | 32 km/h | +2 km/h |
| REGION R2 | 20~30 km/h | 28 km/h | 0 km/h |
| REGION R3 | 40~60 km/h | 50 km/h | 0 km/h |
| REGION R4 | 40~60 km/h | 30 km/h | -10 km/h |
| REGION R4 (EXPRESSWAY) | 70~90 km/h | 85 km/h | 0 km/h |
| REGION R5 (EXPRESSWAY) | 70~90 km/h | 30 km/h | -40 km/h |

METHOD USING SPEED DIFFERENCE

EXAMPLE (TIME DIFFERENCE) OF DIFFERENCE INFORMATION

| STOP NAME | SCHEDULED TIMES OF ARRIVAL AND DEPARTURE | ACTUAL TIMES OF ARRIVAL AND DEPARTURE | DELAY TIME |
|---|---|---|---|
| A1 BUS STOP | 17:30 DEPARTURE | 17:30 DEPARTURE | 0:00 |
| A2 BUS STOP | 17:45 ARRIVAL | 17:47 ARRIVAL | 0:02 |
| A3 BUS STOP | 17:50 ARRIVAL | 17:52 ARRIVAL | 0:02 |
| B1 BUS STOP | 17:55 ARRIVAL | 18:07 ARRIVAL | 0:12 |
| B2 BUS STOP | 18:10 ARRIVAL | - | - |

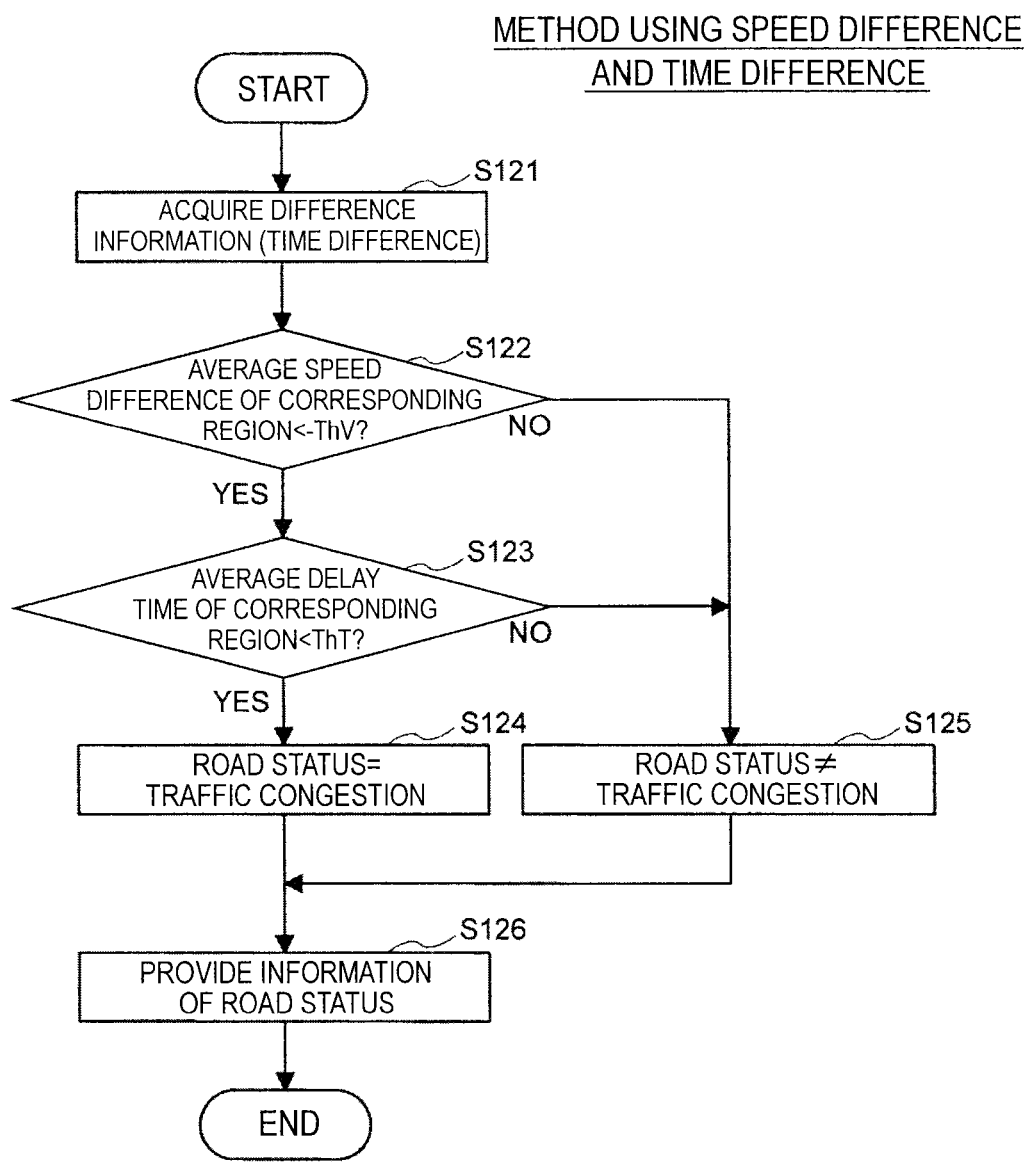

FIG. 13

METHOD CONSIDERING ROAD TYPE/MORE DETAILED ROAD STATUS

| ROAD TYPE | DETERMINATION CONDITION | ROAD STATUS |
|---|---|---|
| GENERAL ROAD | SPEED DIFFERENCE <-ThV1 | LIGHT TRAFFIC CONGESTION |
| GENERAL ROAD | SPEED DIFFERENCE <-ThV2 | TRAFFIC CONGESTION |
| EXPRESSWAY/TOLL ROAD | SPEED DIFFERENCE <-ThV3 | LIGHT TRAFFIC CONGESTION |
| EXPRESSWAY/TOLL ROAD | SPEED DIFFERENCE <-ThV4 | TRAFFIC CONGESTION |

( ThV1 > ThV2, ThV3 > ThV4 )

FIG. 14

METHOD CONSIDERING ROAD TYPE/MORE DETAILED ROAD STATUS

| ROAD TYPE | DETERMINATION CONDITION | ROAD STATUS |
|---|---|---|
| GENERAL ROAD | DELAY TIME >ThT1 | LIGHT TRAFFIC CONGESTION |
| GENERAL ROAD | DELAY TIME >ThT2 | TRAFFIC CONGESTION |
| EXPRESSWAY/TOLL ROAD | DELAY TIME >ThT3 | LIGHT TRAFFIC CONGESTION |
| EXPRESSWAY/TOLL ROAD | DELAY TIME >ThT4 | TRAFFIC CONGESTION |

( ThV1 < ThV2, ThV3 < ThV4 )

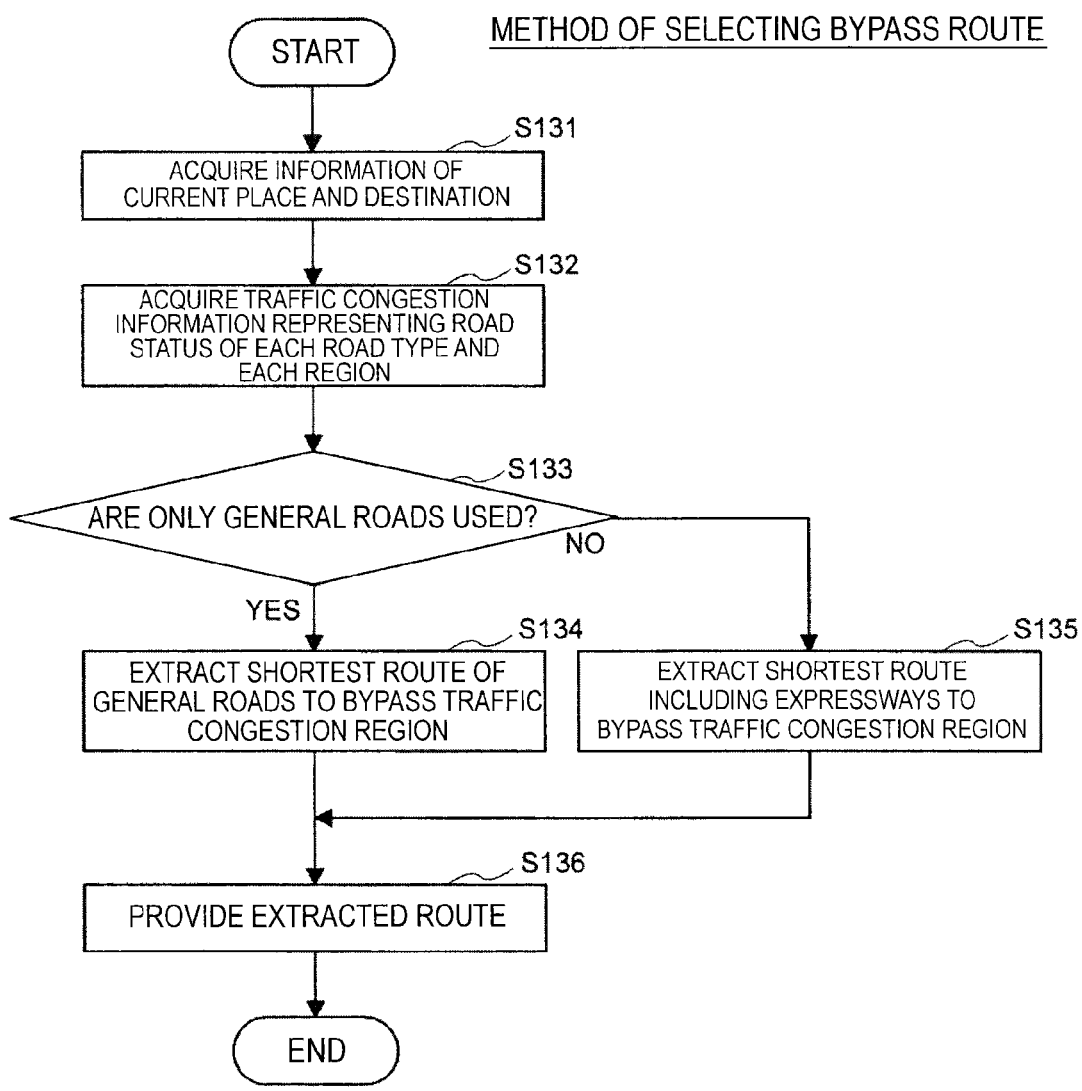

FIG. 16

CAUSE ANALYSIS METHOD

| TRAFFIC CONGESTION OCCURRENCE STATUS | | ANALYSIS RESULT |
|---|---|---|
| LOCALLY OCCURRING | OCCURRING FOR SHORT TIME | CAUSE OF TRAFFIC CONGESTION= TRAFFIC CONGESTION DUE TO ACCIDENT |
| LOCALLY OCCURRING | OCCURRING SLOWLY | CAUSE OF TRAFFIC CONGESTION= TRAFFIC CONGESTION DUE TO CONSTRUCTION |
| WIDELY OCCURRING | OCCURRING SLOWLY | CAUSE OF TRAFFIC CONGESTION= NATURAL TRAFFIC CONGESTION |
| TRAFFIC CONGESTION REGION | TRAFFIC CONGESTION TIME ZONE | CAUSE OF TRAFFIC CONGESTION= NATURAL TRAFFIC CONGESTION |
| EXHIBITION HALL | WHEN EVENT IS HELD | CAUSE OF TRAFFIC CONGESTION=EVENT |
| ⋮ | ⋮ | ⋮ |

FIG. 17

EXAMPLE OF INFORMATION PROVISION

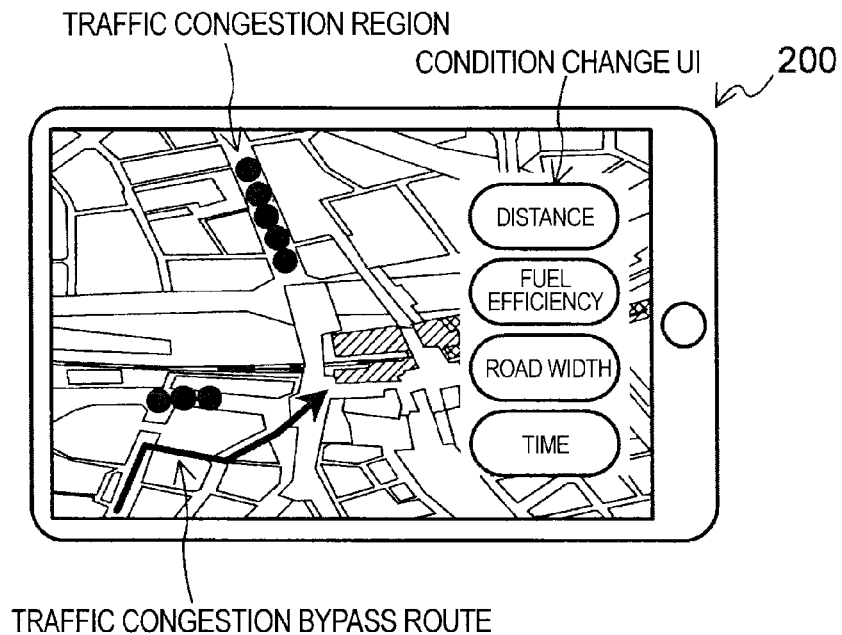

TRAFFIC CONGESTION BYPASS ROUTE

PREDICTION ALGORITHM #2 (FAST CASE)

METHOD USED FOR ROAD DESIGN

● REGION IN WHICH "DEGREE OF HAZARD=HIGH"

◯ REGION IN WHICH TIME ZONE OF
   "ROAD STATUS=TRAFFIC CONGESTION" IS LONG

FIG. 35

EXAMPLE OF ENVIRONMENTAL CONDITION

| ENVIRONMENTAL CONDITION TYPE | DETAILS CLASSIFICATION | | | | | |
|---|---|---|---|---|---|---|
| WEATHER | CLEAR | CLOUDY | RAIN | SNOW | THUNDER-STORM | TYPHOON |
| TIME ZONE | EARLY MORNING | RUSH HOUR 1 | DAYTIME | RUSH HOUR 2 | NIGHT | MIDNIGHT |
| SEASON | SPRING | SUMMER | AUTUMN | WINTER | | |
| HOLIDAY/WEEKDAY | HOLIDAY | WEEKDAY | SPRING BREAK | SUMMER BREAK | WINTER BREAK | NEW YEAR'S DAY | BON FESTIVAL |
| | PUBLIC HOLIDAY | CONSECUTIVE HOLIDAYS | | | | |
| DAY OF WEEK | MONDAY | TUESDAY | WEDNESDAY | THURSDAY | FRIDAY | SATURDAY | SUNDAY |

INFORMATION PROCESSING DEVICE, TERMINAL DEVICE, INFORMATION PROCESSING METHOD, AND STATUS DISPLAY METHOD

BACKGROUND

The present technology relates to an information processing device, a terminal device, an information processing method, and a status display method.

Using car navigation systems, it is possible to enjoy driving without getting lost even in an unfamiliar place. In recent years, car navigation systems that notify of traffic congestion information or suggest a route to arrive at a destination in the shortest time in view of traffic congestion also have shown up in the market. Further, applications of implementing a function of a car navigation system in information terminals such as smart phones are also widely being used. In connection with a display of traffic congestion information or the like, a system of detecting a traveling vehicle based on a traveling speed and displaying a degree of traffic congestion of a road, the flow of a vehicle, or the like based on a traveling speed group has been discussed in JP 2008-147865 A.

SUMMARY

A traveling status of a vehicle can be recognized using a system such as an ORBIS (an automatic speed detector), an intelligent transportation system (ITS), a VICS, an ETC, a driving assistance system (an AHS, a DSSS, or an ASV), or a public transportation assistance system (a PTPS or a TDM). Actually, a road status is recognized based on information recognized using this system. In this system, since information is collected without distinction of vehicles, it is necessary to use a complex algorithm, a huge amount of history data, or the like in order to recognize a road status with a high degree of accuracy. Further, depending on circumstances, confirmation through visual observation from the ground or the sky by humans is necessary. This situation is caused since not all vehicles necessarily travel with regularity in a fixed pattern.

The present technology is made in light of the foregoing, and it is desirable to provide an information processing device, a terminal device, an information processing method, and a status display method, which are novel and improved and capable of recognizing a road status with a high degree of accuracy by a simple system.

According to an embodiment of the present disclosure, there is provided an information processing device, including a difference information acquiring unit that acquires, for one or a plurality of first vehicles that travel according to a content of reference information including a predetermined traveling speed or arrival time, difference information representing a difference between an actual traveling speed or arrival time in each of the first vehicles and the content of the reference information, and a road status analyzing unit that analyzes a road status in a predetermined region using difference information related to the first vehicles present in the predetermined region.

Further, according to another embodiment of the present disclosure, there is provided a terminal device including a display unit that displays an analysis result of a road status in a predetermined region, which is analyzed using difference information related to first vehicles present within the predetermined region among pieces of difference information representing a difference between an actual traveling speed or arrival time in each first vehicle and a content of reference information, the pieces of difference information being acquired for one or a plurality of the first vehicles traveling according to the content of the reference information including a predetermined traveling speed or arrival time.

Further, according to another embodiment of the present disclosure, there is provided an information processing method including acquiring, for one or a plurality of first vehicles that travel according to a content of reference information including a predetermined traveling speed or arrival time, difference information representing a difference between an actual traveling speed or arrival time in each of the first vehicles and the content of the reference information, and analyzing a road status in a predetermined region using difference information related to the first vehicles present in the predetermined region.

Further, according to another embodiment of the present disclosure, there is provided a status display method including displaying an analysis result of a road status in a predetermined region, which is analyzed using difference information related to first vehicles present within the predetermined region among pieces of difference information representing a difference between an actual traveling speed or arrival time in each first vehicle and a content of reference information, the pieces of difference information being acquired for one or a plurality of the first vehicles traveling according to the content of the reference information including a predetermined traveling speed or arrival time.

According to the embodiments of the present technology, it is possible to recognize a road status with a high degree of accuracy by a simple system.

BRIEF DESCRIPTION OF THE DRAWINGS

FIG. 1 is an explanatory diagram for describing an embodiment of operation control;

FIG. 2 is an explanatory diagram for describing an embodiment of operation control;

FIG. 12 is an explanatory diagram for describing a traffic congestion detection method (a method using a speed difference and a time difference) according to the first embodiment;

FIG. 13 is an explanatory diagram for describing a traffic congestion detection method (a method considering a road type) according to the first embodiment;

FIG. 14 is an explanatory diagram for describing a traffic congestion detection method (a method considering a road type) according to the first embodiment;

FIG. 15 is an explanatory diagram for describing a bypass route selecting method according to the first embodiment;

FIG. 16 is an explanatory diagram for describing a method of analyzing the cause of traffic congestion according to the first embodiment;

FIG. 17 is an explanatory diagram for describing an information providing method according to the first embodiment;

FIG. 35 is an explanatory diagram for describing an example of an environmental condition;

DETAILED DESCRIPTION OF THE EMBODIMENT(S)

Figures 3, 4:
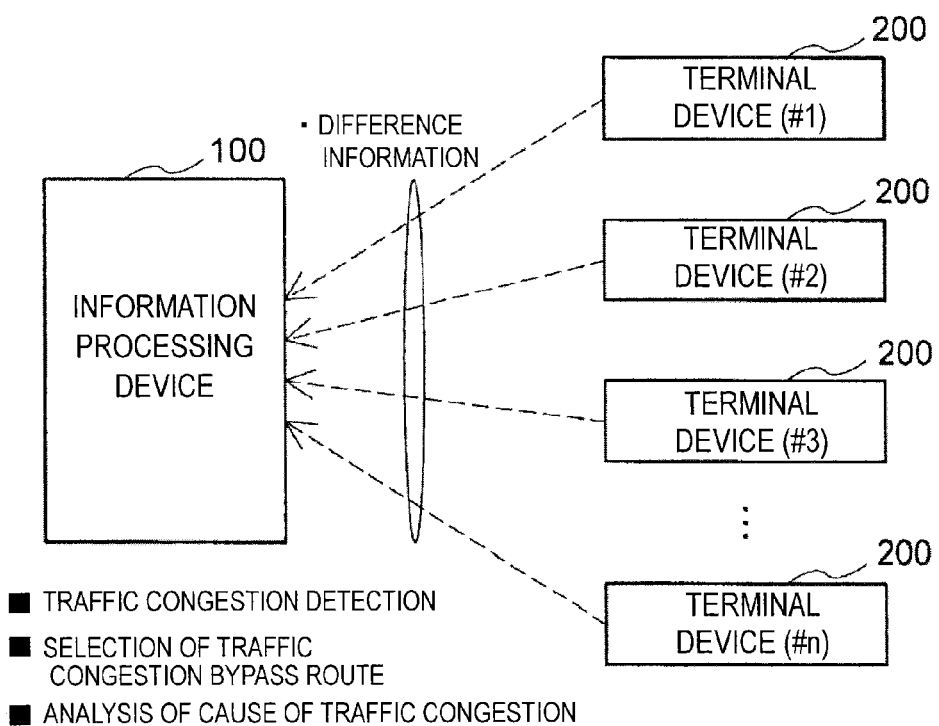
FIG. 3 is an explanatory diagram for describing an embodiment of operation control.
FIG. 4 is an explanatory diagram for describing a system configuration according to a first embodiment.

Hereinafter, preferred embodiments of the present technology will be described in detail with reference to the appended drawings. Note that, in this specification and the appended drawings, structural elements that have substantially the same function and structure are denoted with the same reference numerals, and repeated explanation of these structural elements is omitted.

[Regarding Flow of Description]

Here, the flow of description to be made below will be briefly described.

First, the accuracy of traffic congestion information will be mentioned. Next, an example of an operation-controlled vehicle will be introduced with reference to FIGS. 1 to 3. Next, a traffic congestion detecting method according to a first embodiment of the present technology and a system configuration example capable of implementing the same will be described with reference to FIGS. 4 to 19. Next, a degree of hazard detecting method according to a second embodiment of the present technology and a system configuration example capable of implementing the same will be described with reference to FIGS. 20 to 29.

Next, usage in road design according to a third embodiment of the present technology will be described with reference to FIG. 30. Next, a reference information updating method and a system configuration example capable of implementing the same according to a fourth embodiment of the present technology will be described with reference to FIGS. 31 to 42. Next, a hardware configuration example capable of implementing functions of a device and a system according to the first to fourth embodiments of the present technology will be described with reference to FIG. 43. Lastly, technical spirits of the same embodiments will be summarized, and effects obtained from the technical spirit will be briefly described.

(Description Items)

1: Introduction 1-1: Regarding Accuracy of Traffic Congestion Information 1-2: Regarding Driving-Controlled Vehicle 1-3: Outline of Embodiments 1-3-1: First Embodiment (Method of Usage in Traffic Congestion Detection)

1-3-2: Second Embodiment (Method of Usage in Hazard Anticipation)

1-3-3: Third Embodiment (Method of Usage in Road Design)

1-3-4: Fourth Embodiment (Method of Usage in Improvement of Operation Control)

2: First Embodiment (Method of Usage in Traffic Congestion Detection)
  2-1: System Configuration Example
  2-2: Device Configuration
    2-2-1: Configuration of Information Processing Device 100
    2-2-2: Configuration of Terminal Device 200
  2-3: Traffic Congestion Detecting Method
    2-3-1: Method of Using Difference in Speed
    2-3-2: Method of Using Difference in Time
    2-3-3: Method of Using Speed and Time
    2-3-4: Method of Using Road Type
    2-3-5: Method of Selecting Bypass Route
    2-3-6: Cause Analysis Method 2-4: Information Providing Method 2-4-1: Example of Provision Information
    2-4-2: Example of UI (Operation Example)
3: Second Embodiment (Method of Usage in Hazard Anticipation)
  3-1: System Configuration Example
  3-2: Device Configuration
    3-2-1: Configuration of Information Processing Device 130
    3-2-2: Configuration of Terminal Device 230
  3-3: Hazard Predicting Method
    3-3-1: Prediction Algorithm #1 (Slow Case)
    3-3-2: Prediction Algorithm #2 (Fast Case)
    3-3-3: Configuration Using Traffic Congestion Information (Slow Case)
    3-3-4: Configuration Using Weather Data (Slow Case)
  3-4: Information Providing Method
    3-4-1: Example of Provision Information
    3-4-2: Example of UI (Operation Example)
4: Third Embodiment (Method of Usage in Road Design)
5: Fourth Embodiment (Method of Usage in Improvement of Driving Control)
  5-1: System Configuration Example
  5-2: Device Configuration
    5-2-1: Configuration of Information Processing Device 150
    5-2-2: Configuration of Terminal Device 250
  5-3: Driving Reference Updating Method
    5-3-1: Regarding Environmental Condition
    5-3-2: Basic Configuration
    5-3-3: Configuration Considering Fuel Efficiency
    5-3-3: Configuration Considering Safety
    5-3-5: (Modified Example) Basic Configuration
    5-3-6: (Modified Example) Configuration Considering Fuel Efficiency
    5-3-7: (Modified Example) Configuration Considering Safety
6: Hardware Configuration Example
7: Summary

1: Introduction

First, technical matters according to first to fourth embodiments which will be described later and an outline of each embodiment will be briefly described.

[1-1: Regarding Accuracy of Traffic Congestion Information]

A road status is recognized using visual observation by humans and various systems. For example, a vehicle moving status can be detected using an ORBIS (an automatic speed detector), an intelligent transportation system (ITS), a VICS, an ETC, a driving assistance system (an AHS, a DSSS, or an ASV), a public transportation assistance system (PTPS or TDM), or the like. Further, a vehicle moving status can be recognized using a function mounted in a mobile telephone, an information terminal, or the like such as an acceleration sensor, a gyroscopic sensor, or the Global Positioning System (GPS). A region in which traffic congestion occurs can be recognized by analyzing the recognized vehicle moving status using a statistical method or a predetermined algorithm.

However, when an arbitrary vehicle is used as a target, a vehicle that is extremely fast or slow in speed or a vehicle with an irregular operation pattern may be included. In this case, it is difficult to detect traffic congestion with a high degree of accuracy unless analysis is performed using a group of a statistically significant number of vehicles as a target. Further, there is inevitably a limitation to increasing the fineness (resolution) of a detection region. However, there is still an extent to which the accuracy of detection or the resolution can be improved using a complex algorithm. However, in this case, a high-performance calculation device capable of executing a complex algorithm is necessary, and a memory for storing a huge amount of data is also necessary.

In light of the foregoing, the inventor(s) of the present technology has (have) invented a system of detecting traffic congestion using a relatively simple algorithm on a vehicle decided as being driven with regularity. Typically, an operation rule of an operation-controlled vehicle is decided in view of an environmental factor such as a time zone or a season. Further, this operation rule is made in view of a specific situation such as an individual road or a region. For this reason, when a system of detecting traffic congestion based on an operation-controlled vehicle is used, traffic congestion can be detected with a drastically high degree of accuracy compared to when traffic congestion is detected using a generic algorithm. Here, the description has been made in connection with the example of recognizing traffic congestion, but even when an operation-controlled vehicle is used in detecting a road status rather than traffic congestion, an achievement with a high degree of accuracy can be realized.

[1-2: Regarding Driving-Controlled Vehicle]

Here, an example of an operation-controlled vehicle and a form of an operation-controlled vehicle will be briefly introduced with reference to FIGS. 1 to 3. First, when the type of vehicle is a bus, scheduled times of arrival and departure are decided for each bus stop as illustrated in FIG. 1. For this reason, an actual operation status can be recognized by monitoring a time at which a bus arrives at each bus stop. Further, a road status between bus stops can be recognized based on a delay of an arrival time at a certain bus stop and a delay of an arrival time at previous and next bus stops. In addition, bus stops may be divided according to regions. In this case, a road status in each region may be inferred based on a distribution pattern of arrival delays or the like.

A vehicle whose speed is fixed is also an example of an operation-controlled vehicle. For example, in a certain taxi company, a reference driving speed is fixed in relation to a legal speed as illustrated in FIG. 2. In this case, when a vehicle that is driving at a speed much lower than a lower limit of the reference driving speed is detected, it may be inferred that something has happened in the vehicle or a corresponding driving spot. For example, when a vehicle that usually drives at the reference driving speed drives at the speed much lower than the lower limit of the reference driving speed, it can be determined that traffic congestion is occurring in or near the driving spot. On the other hand, a spot in which driving is consistently performed at a speed much lower than the reference driving speed may be inferred as a spot in which a driver perceives a hazard and reduces the speed.

Further, when a target vehicle is not a vehicle whose operation is controlled based on a common management rule but a vehicle that operates according to a schedule constrained by a destination and an arrival time, the target vehicle is included as the operation-controlled vehicle. For example, vehicles of transportation companies travel according to a schedule constrained by a delivery destination address and an estimated delivery time as illustrated in FIG. 3. Further, the vehicles are managed such that confirmation information of delivery completion at each delivery destination address is transmitted to the company side, so that the company side can check a delivery status. Thus, an arrival delay at each delivery destination address can be checked, similarly to buses, and a road status can be recognized with a high degree of accuracy using this information, similarly to buses.

The examples of the operation-controlled vehicle have been introduced above. Here, in addition to the above-mentioned examples, there are limousine buses, courtesy buses, transportation vehicles, emergency vehicles, mail delivery vehicles, newspaper delivery vehicles, parcel delivery vehicles, and home delivery vehicles. Here, a vehicle is not limited to an automobile but may also include motorbikes and bicycles. In addition, the technology of embodiments which will be described later can be applied even to a specific person (a postal worker, a newspaper deliverer, a patrol officer, or the like). In this case, traffic congestion corresponds to a traffic congestion state.

[1-3: Outline of Embodiments]

Here, outlines of embodiments which will be described later will be briefly described.

(1-3-1: First Embodiment (Method of Usage in Traffic Congestion Detection))

First, an outline of a first embodiment will be described. The first embodiment relates to a method of using a status of an operation-controlled vehicle for traffic congestion detection. An operation-controlled vehicle such as a bus travels along a fixed route according to a fixed operation rule. Particularly, a vehicle such as a bus travels based on an operation rule corresponding to a time zone or a season and thus travels while undergoing consistently occurring natural traffic congestion or the like to some extent.

Thus, when such a vehicle is heavily delayed, accident traffic congestion, construction traffic congestion, or the like is considered to be occurring. In other words, when the vehicle passes through this region, the vehicle is likely to be significantly delayed from an arrival time predicted from a usual road status. If other users are notified of this information, the users that have received this notice can avoid a traffic congestion region, and thus expansion of traffic congestion can be prevented. The first embodiment will be described in detail later in connection with a system related to traffic congestion detection.

(1-3-2: Second Embodiment (Method of Usage in Hazard Anticipation))

Next, an outline of a second embodiment will be described. The second embodiment relates to a method of predicting a degree of hazard of each region based on a status of an operation-controlled vehicle. For example, when a vehicle passing through a certain region consistently drives at a speed much lower than the operation reference, the driver may be inferred to perceive a hazard when passing through the region. Particularly, vehicles whose traveling route is managed such as fixed route buses pass through the same route every day, and thus a region in which a driving speed is consistently low may be inferred as a region in which it is necessary that the driver constantly pays attention. By predicting a degree of hazard as described above, a hazardous region can be detected with a high degree of accuracy. The second embodiment will be described later in connection with a system related to hazard prediction.

(1-3-3: Third Embodiment (Method of Usage in Road Design))

Next, an outline of a third embodiment will be described. The third embodiment relates to a method of using information of a traffic congestion region and a hazardous region which are detected by the systems according to the first and second embodiments for road design. When the traffic congestion region and the hazardous region are detected with a high degree of accuracy as described above, an effective improvement plan can be discussed using the detection result.

Further, the improvement plan can be put into practice centering on the traffic congestion region and the hazardous region obtained using information of a public transportation system or like. In this case, the public transportation system can be smoothly operated, and the users of the public transportation system as well as the drivers who directly drive the vehicles can experience convenience. As a result, the flow of people or things become smooth, and thus road design that make a meaningful contribution to society can be performed. The third embodiment will be described in detail later in connection with a system related to the usage in road design.

(1-3-4: Fourth Embodiment (Usage in Improvement of Operation Control))

Next, an outline of a fourth embodiment will be described. The fourth embodiment relates to a method of updating reference information used for operation control based on a status of an operation-controlled vehicle. Typically, reference information used for operation control is updated based on a result of monitoring a delay time in a predetermined spot at intervals of a predetermined period of time. In many cases, the monitoring is performed by a person on site. For this reason, it is difficult to frequently perform monitoring, and it is difficult to optimize reference information for each minute environmental condition.

For example, as a result of operating a schedule of Golden Week by a typical holiday schedule, cases in which delay becomes severe in certain regions and in which vehicles arrive too early in certain regions occur. In this regard, a difference between an actual operation status and the reference information is sequentially extracted, and the reference information is updated based on the extraction result. Thus, optimal operation control in which a more detailed situation including regional characteristics or seasonal characteristics is considered can be performed. The fourth embodiment will be described in detail later in connection with a system related to the update of the reference information.

The outlines of the embodiments have been described above.

2: First Embodiment

Method of Usage in Traffic Congestion Detection

Hereinafter, the first embodiment according to the present technology will be described. The present embodiment relates to a method of acquiring a traveling status of an operation-controlled vehicle and using the acquired information for traffic congestion detection.

[2-1: System Configuration Example]

Figure 5:
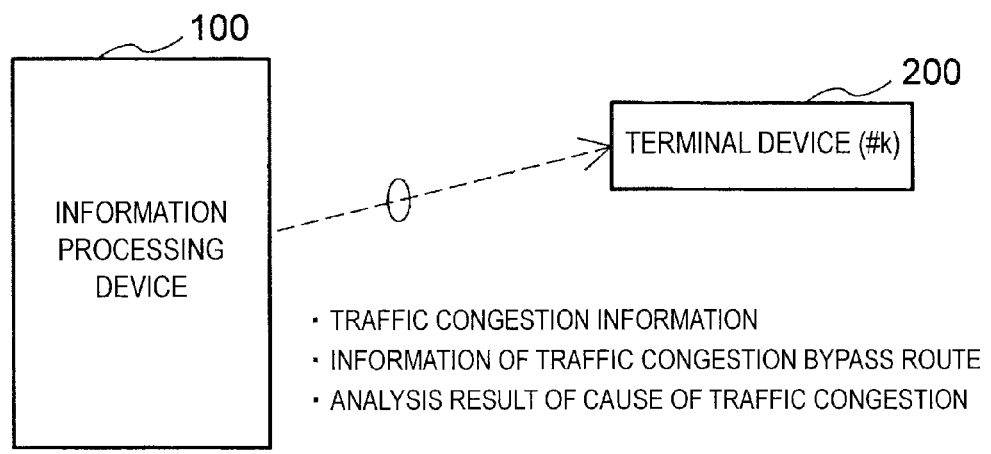
FIG. 5 is an explanatory diagram for describing a system configuration according to the first embodiment.

First, a system configuration example capable of implementing the method according to the present embodiment will be described with reference to FIGS. 4 and 5. FIGS. 4 and 5 are explanatory diagrams for describing a system configuration example capable of implementing a method according to the present embodiment.

As illustrated in FIG. 4, a system according to the present embodiment mainly includes an information processing device 100 and a plurality of terminal devices 200.

For example, the information processing device 100 configures a part of a control system installed in a control center that performs operation control of vehicles. The information processing device 100 may be configured with a plurality of calculation processing devices. Further, the information processing device 100 may be a cloud computing system. Meanwhile, the terminal device 200 is a device mounted in a vehicle in some form. For example, the terminal device 200 may be a device installed in a vehicle such as a car navigation system or an in-vehicle computer or may be a device such as a mobile telephone or an information terminal held by a driver or another passenger. Here, in the following description, for the sake of convenience of description, a device mounted in a vehicle is assumed as the terminal device 200.

As illustrated in FIG. 4, each terminal device 200 detects a difference between a traveling status of a vehicle in which an its own device is mounted and reference information used as a reference of operation control, and transmits difference information representing the difference to the information processing device 100. For example, a vehicle speed, an arrival time at a predetermined spot, or the like may be used as a traveling status of a vehicle. For example, a reference speed of each road based on a legal speed, an estimated time of arrival at a predetermined spot, or the like may be used as the reference information. For example, when the reference speed is used as the reference information, the difference information includes a difference between an actually detected vehicle speed and a reference speed in a corresponding driving region. Meanwhile, when the estimated arrival time is used as the reference information, the difference information includes a difference (delay time) between an actual arrival time at a predetermined spot and an estimated time of arrival at a predetermined spot.

Each terminal device 200 generates the difference information at predetermined time intervals or at a predetermined timing, and transmits the difference information to the information processing device 100. Thus, the difference information from the plurality of terminal devices 200 is collected in the information processing device 100. For this reason, the information processing device 100 can recognize traveling statuses of vehicles in various spots or regions. In this regard, the information processing device 100 analyzes road statuses in various spots or regions using the difference information collected from the plurality of terminal devices 200. For example, the information processing device 100 detects traffic congestion based on the difference information. The information processing device 100 selects a traffic congestion bypass route using information of the detected traffic congestion. In addition, the information processing device 100 analyzes the cause of traffic congestion using the difference information.

An analysis result (traffic congestion information, traffic congestion bypass route information, a result of analyzing the cause of traffic congestion, and the like) obtained by the information processing device 100 is transmitted to the terminal device 200 as illustrated in FIG. 5. At this time, the information processing device 100 may transmit the analysis result to all of the terminal devices 200, and preferably transmits the analysis result to the terminal device 200 mounted in the vehicle traveling in or near the corresponding spot or region. The terminal device 200 to which the analysis result is to be transmitted may be the terminal device 200 different from the terminal device 200 that has transmitted the difference information. In addition, the information processing device 100 may be configured to transmit the analysis result to a system such as a road traffic center or a broadcasting station.

The system configuration according to the present embodiment has been described above.

[2-2: Device Configuration]

Next, configurations of the information processing device 100 and the terminal device 200 that configure the system according to the present embodiment will be described in further detail.

(2-2-1: Configuration of Information Processing Device 100)

Figure 6:
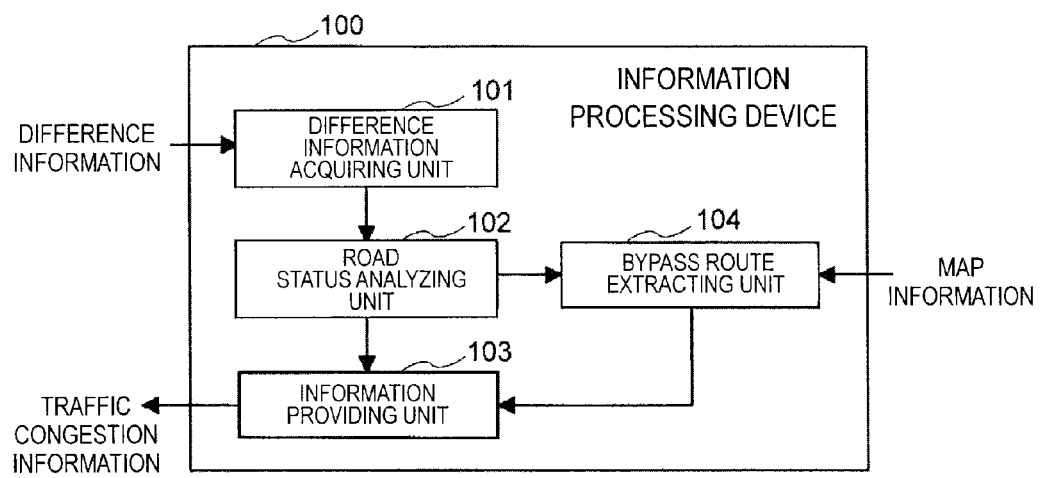
FIG. 6 is an explanatory diagram for describing a functional configuration of an information processing device according to the first embodiment.

First, a functional configuration of the information processing device 100 according to the present embodiment will be described with reference to FIG. 6. FIG. 6 is an explanatory diagram for describing the functional configuration of the information processing device 100 according to the present embodiment.

As illustrated in FIG. 6, the information processing device 100 mainly includes a difference information acquiring unit 101, a road status analyzing unit 102, an information providing unit 103, and a bypass route extracting unit 104.

The difference information acquiring unit 101 acquires the difference information from each terminal device 200. The difference information acquired by the difference information acquiring unit 101 is input to the road status analyzing unit 102. Upon receiving the difference information, the road status analyzing unit 102 detects traffic congestion using the input difference information. The details of a traffic congestion detecting method will be described later. Information of traffic congestion (hereinafter, "traffic congestion information") detected by the road status analyzing unit 102 is input to the information providing unit 103 and the bypass route extracting unit 104. Upon receiving the traffic congestion information, the information providing unit 103 provides the input traffic congestion information to the terminal device 200 or the like.

Meanwhile, the bypass route extracting unit 104 extracts a route (hereinafter, "traffic congestion bypass route") for bypassing the traffic congestion based on the input traffic congestion information. The details of a bypass route selecting method will be described later. Information of the traffic congestion bypass route extracted by the bypass route extracting unit 104 is input to the information providing unit 103. Upon receiving the information of the traffic congestion bypass route, the information providing unit 103 provides the input information of the traffic congestion bypass route to the terminal device 200 or the like. The function of the bypass route extracting unit 104 and the function of the road status analyzing unit 102 may be implemented by different devices. Further, the function of the bypass route extracting unit 104 may be omitted.

The functional configuration of the information processing device 100 according to the present embodiment has been described above.

(2-2-2: Configuration of Terminal Device 200)

Figures 7, 8:
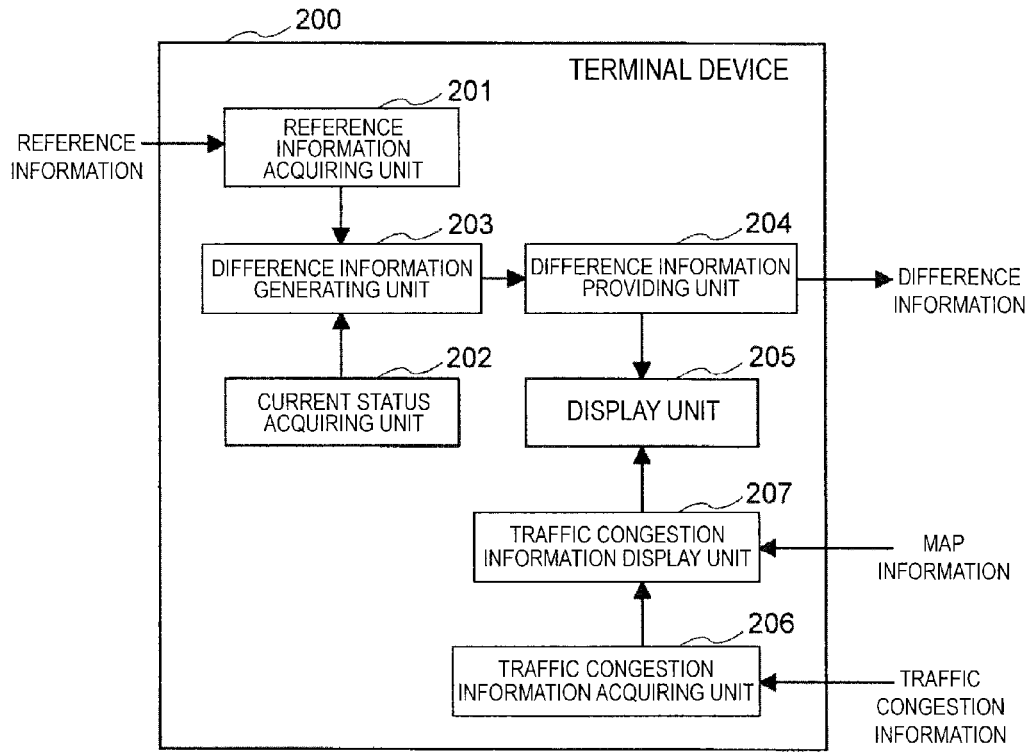
FIG. 7 is an explanatory diagram for describing a functional configuration of a terminal device according to the first embodiment.
FIG. 8 is an explanatory diagram for describing an example (a speed difference) of difference information.

Next, a functional configuration of the terminal device 200 according to the present embodiment will be described with reference to FIG. 7. FIG. 7 is an explanatory diagram for describing the functional configuration of the terminal device 200 according to the present embodiment.

As illustrated in FIG. 7, the terminal device 200 mainly includes a reference information acquiring unit 201, a current status acquiring unit 202, a difference information generating unit 203, a difference information providing unit 204, a display unit 205, a traffic congestion information acquiring unit 206, and a traffic congestion information display unit 207.

The reference information acquiring unit 201 acquires reference information used as a reference of operation control. The reference information may be provided from the information processing device 100 or may be provided from another operation control system. The reference information may be stored in a storage device (not shown) connected to or built in the terminal device 200 in advance. The reference information acquired by the reference information acquiring unit 201 is input to the difference information generating unit 203. A traveling status (hereinafter, "current status") of a vehicle is input from the current status acquiring unit 202 to the difference information generating unit 203.

For example, a traveling speed of a vehicle, an arrival time at a predetermined spot, or the like may be used as the current status. The current status acquiring unit 202 acquires the current status from a driving system or a sensor of a vehicle or the like, and inputs the current status to the difference information generating unit 203. Upon receiving the current status, the difference information generating unit 203 compares the input current status with the reference information, and generates the difference information. For example, the difference information generating unit 203 calculates a difference between the traveling speed of the vehicle and the reference speed, and outputs the calculated difference as the difference information. Further, the difference information generating unit 203 calculates a difference between an actual arrival time and an estimated arrival time represented by the reference information, and outputs the calculated difference as the difference information. At this time, the difference information generating unit 203 includes information of a spot or a region corresponding to the current status in the difference information.

The difference information generated by the difference information generating unit 203 is input to the difference information providing unit 204. Upon receiving the difference information, the difference information providing unit 204 transmits the input difference information to the information processing device 100. In addition, the difference information providing unit 204 causes the input difference information to be displayed on the display unit 205. For example, the difference information providing unit 204 displays a warning on an excessive speed or an arrival delay based on the difference information, displays a concrete numerical value such as a speed difference or an arrival time difference, or displays the reference information together with the above-mentioned information. Through this display, the driver can quickly recognize the current status.

Further, when the traffic congestion information is provided from the information processing device 100, the traffic congestion information acquiring unit 206 acquires the traffic congestion information from the information processing device 100. The traffic congestion information acquired by the traffic congestion information acquiring unit 206 is input to the traffic congestion information display unit 207. Upon receiving the traffic congestion information, the traffic congestion information display unit 207 causes the input traffic congestion information to be displayed on the display unit 205. For example, the traffic congestion information display unit 207 acquires map information including a current driving region, and causes the traffic congestion information to be displayed on the display unit 205 in the form that a traffic congestion spot or a traffic congestion region is displayed on a map. Further, the traffic congestion information display unit 207 may display an address or a geographical name of a traffic congestion spot or a traffic congestion region based on the traffic congestion information using text information. In addition, when the information of the traffic congestion bypass route is provided together with the traffic congestion information, the traffic congestion information display unit 207 causes the traffic congestion bypass route to be displayed on the display unit 205.

The functional configuration of the terminal device 200 according to the present embodiment has been described above.

[2-3: Traffic Congestion Detecting Method]

Next, the details of the traffic congestion detecting method performed by the information processing device 100 will be described.

(2-3-1: Method of Using Difference in Speed)

Figures 9, 10:
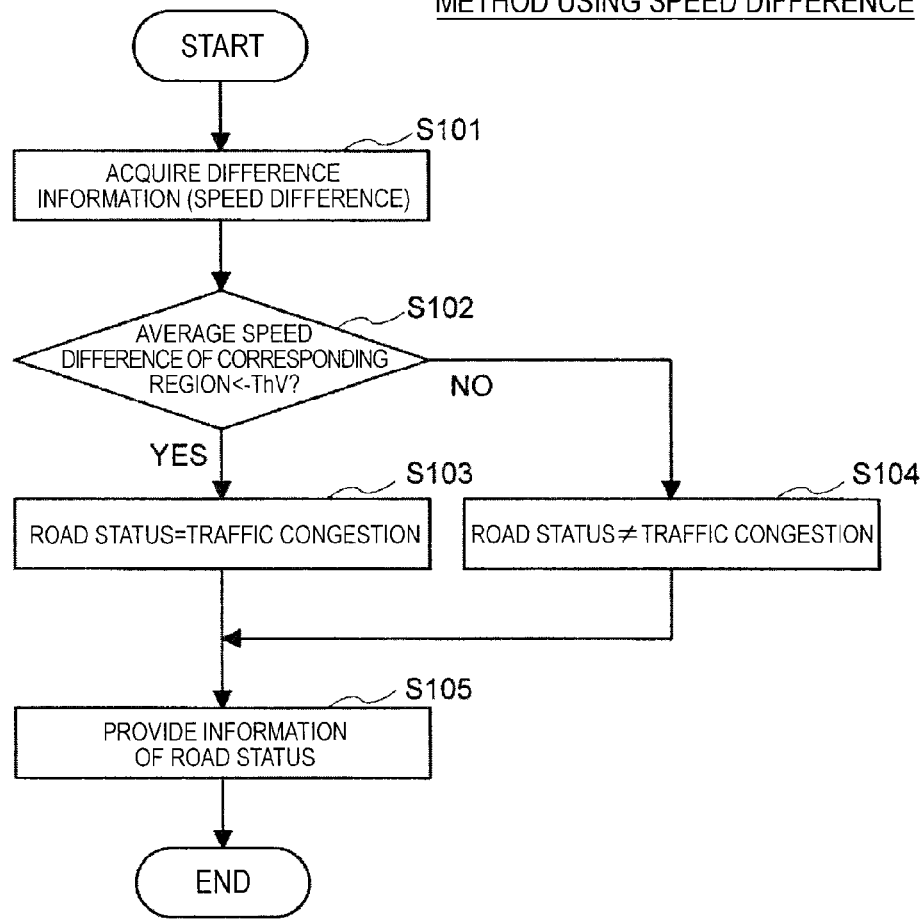
FIG. 9 is an explanatory diagram for describing a traffic congestion detecting method (a method using a speed difference) according to the first embodiment.
FIG. 10 is an explanatory diagram for describing an example (a time difference) of difference information.

First, a traffic congestion detecting method using the difference information including the difference between the actual traveling speed and the reference speed will be described with reference to FIGS. 8 and 9. FIG. 8 is an explanatory diagram illustrating an example of the difference information. FIG. 9 is an explanatory diagram for describing the flow of a traffic congestion detection process performed by the information processing device 100.

As illustrated in FIG. 8, for example, the difference information includes a passage region through which a vehicle is currently passing, a reference driving speed (reference information), an actual driving speed, and a speed difference. However, the reference driving speed and the actual driving speed may be omitted. Further, the information of the passage region may include a road type such as a general road, an expressway, and other toll roads. Actually, even in the same region, it is likely road statuses of a general road and an expressway to be different, and the necessity to consider the road type at the time of road status analysis is high. In the example of FIG. 8, when the actual driving speed is higher than the upper limit of the reference driving speed, the speed difference is expressed as a positive value, whereas when the actual driving speed is lower than the lower limit of the reference driving speed, the speed difference is expressed as a negative value. The expression form of the difference information is arbitrary, but the description will here proceed with the example of FIG. 8.

As illustrated FIG. 9, when the traffic congestion detection process starts on a certain target region, the information processing device 100 acquires the difference information from the terminal device 200 by the function of the difference information acquiring unit 101 (S101). Next, the information processing device 100 calculates an average speed difference of the corresponding region using the difference information acquired in step S101 through the function of the road status analyzing unit 102, and determines whether or not the calculated average speed difference is lower than a predetermined threshold value ($-\text{ThV}$; $\text{ThV}>0$) (S102). When the average speed difference is lower than the predetermined threshold value, the information processing device 100 causes the process to proceed to step S103. However, when the average speed difference is higher than the predetermined threshold value, the information processing device 100 causes the process to proceed to step S104.

When the process proceeds to step S103, the information processing device 100 determines that traffic congestion is occurring in the target region (road status=traffic congestion) through the function of the road status analyzing unit 102 (S103), and causes the process to proceed to step S105. However, when the process proceeds to step S104, the information processing device 100 determines that traffic congestion is not occurring (road status≠traffic congestion) through the function of the road status analyzing unit 102 (S104), and causes the process to proceed to step S105. When the process proceeds to step S105, the information processing device 100 provides information of the road status representing the determination result of step S103 or S104 to the terminal device 200 or the like through the function of the information providing unit 103 as the traffic congestion information (S105).

The traffic congestion detecting method using the difference information including the difference between the actual traveling speed and the reference speed has been described above. The above description has been made in connection with the method of determining traffic congestion using the average speed difference, but a method of determining traffic congestion using an evaluation index other than the average speed difference may be considered. For example, a method of counting the number of vehicles in which the speed difference is lower than the predetermined threshold value and determining traffic congestion when the number of counted vehicles is larger than a predetermined number may be considered.

(2-3-2: Method of Using Difference in Time)

Next, a traffic congestion detecting method using the difference information including the difference between the actual arrival time and the estimated arrival time will be described with reference to FIGS. 10 and 11. FIG. 10 is an explanatory diagram illustrating an example of the difference information. Meanwhile, FIG. 11 is an explanatory diagram for describing the flow of a traffic congestion detection process performed by the information processing device 100.

As illustrated in FIG. 10, the difference information includes a stop name (information of a predetermined spot), scheduled times of arrival and departure (reference information), actual times of arrival and departure, and a delay time. However, the scheduled times of arrival and departure and the actual times of arrival and departure may be omitted. In the example of FIG. 10, the delay time refers to a difference between the actual times of arrival and departure and the scheduled times of arrival and departure in each stop. Thus, since a delay is likely to be accumulated, when a delay between stops is considered, it is necessary to pay attention to the fact that a delay time at a previous stop has to be considered. Further, in this example, since a delay occurs at all stops, a delay time has a positive value, but if a vehicle arrived earlier than the scheduled times of arrival and departure, a delay time would be expressed, for example, as a negative value. The expression form of the difference information is arbitrary, but the description will herein proceed with the example of FIG. 10.

Figure 11:
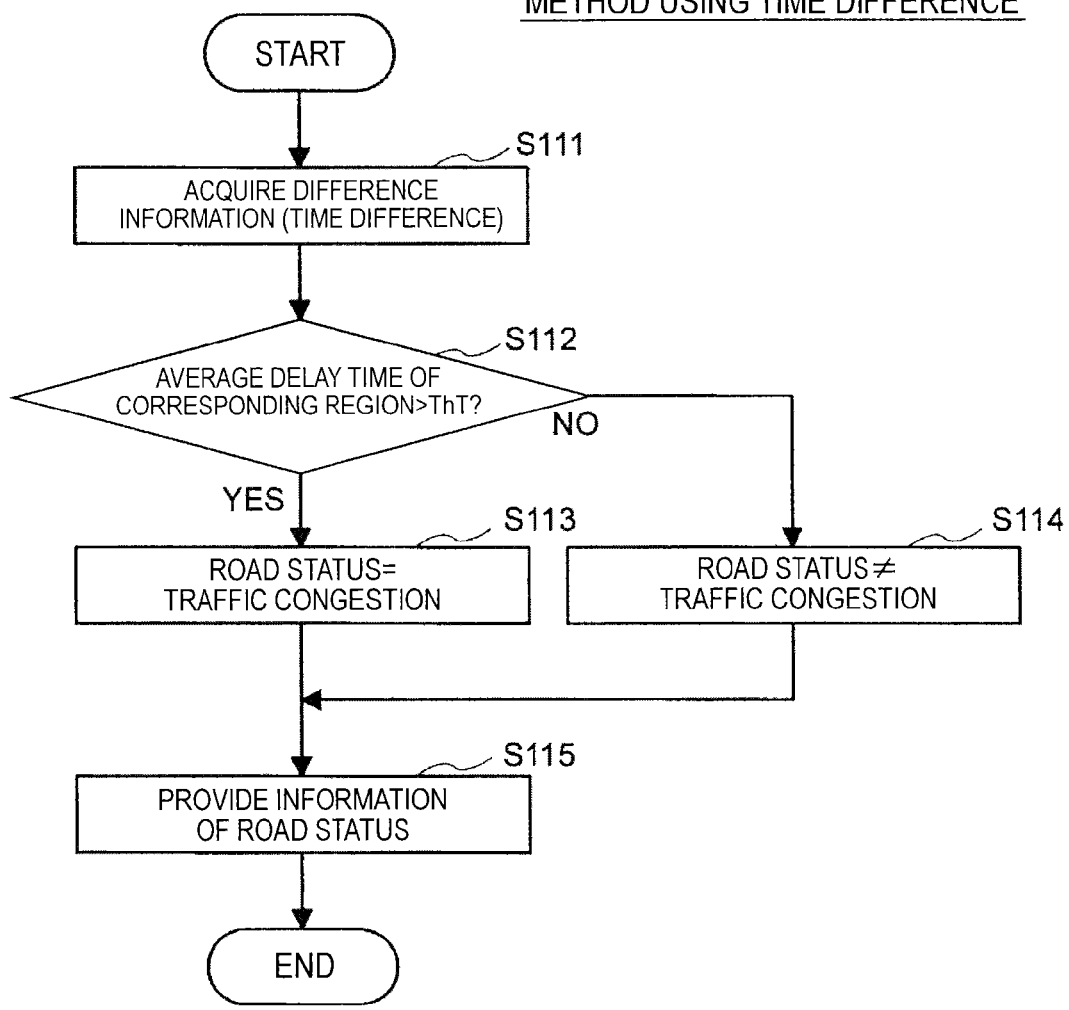
FIG. 11 is an explanatory diagram for describing a traffic congestion detection method (a method using a time difference) according to the first embodiment.

As illustrated in FIG. 11, when the traffic congestion detection process starts on a certain target region, the information processing device 100 acquires the difference information from the terminal device 200 through the function of the difference information acquiring unit 101 (S111). Next, the information processing device 100 calculates a delay time of the corresponding region using the difference information acquired in step S111 through the function of the road status analyzing unit 102, and determines whether or not the calculated average delay time is larger than a predetermined threshold value (ThT; ThT>0) (S112). When the average delay time is larger than the predetermined threshold value, the information processing device 100 causes the process to proceed to step S113. However, when the average delay time is smaller than the predetermined threshold value, the information processing device 100 causes the process to proceed to step S114.

When the process proceeds to step S113, the information processing device 100 determines that traffic congestion is occurring in the target region (road status=traffic congestion) through the function of the road status analyzing unit 102 (S113), and causes the process to proceed to step S115. However, when the process proceeds to step S114, the information processing device 100 determines that traffic congestion is not occurring in the target region through the function of the road status analyzing unit 102 (road status≠traffic congestion) (S114), and causes the process to proceed to step S115. When the process proceeds to step S115, the information processing device 100 provides information of the road status representing the determination result of step S113 or S114 to the terminal device 200 or the like through the function of the information providing unit 103 as the traffic congestion information (S115).

The traffic congestion detecting method using the difference information including the difference between the actual arrival time and the estimated arrival time has been described above. The above description has been made in connection with the method of determining traffic congestion using the average delay time, but a method of determining traffic congestion using an evaluation index other than the average delay time may be considered. For example, a method of counting the number of vehicles in which the delay time is larger than the predetermined threshold value and determining that traffic congestion is occurring when the number of counted vehicles is larger than a predetermined number may be considered. Further, a method using an average value of a difference between a delay time at a target stop and a delay time at a previous stop as an index of traffic congestion determination in view of a case in which a delay is accumulated may be considered.

(2-3-3: Method of Using Speed and Time)

Next, the traffic congestion detecting method using the difference between the actual traveling speed and the reference speed and the difference information including the difference between the actual arrival time and the estimated arrival time will be described with reference to FIG. 12. FIG. 12 is an explanatory diagram for describing the flow of the traffic congestion detection process performed by the information processing device 100.

As illustrated in FIG. 12, when the traffic congestion detection process starts on a certain target region, the information processing device 100 acquires the difference information from the terminal device 200 by the function of the difference information acquiring unit 101 (S121). Next, the information processing device 100 calculates an average speed difference of the corresponding region using the difference information acquired in step S121 through the function of the road status analyzing unit 102, and determines whether or not the calculated average speed difference is lower than a predetermined threshold value (−ThV; ThV>0) (S122). When the average speed difference is lower than the predetermined threshold value, the information processing device 100 causes the process to proceed to step S123. However, when the average speed difference is higher than the predetermined threshold value, the information processing device 100 causes the process to proceed to step S125.

When the process proceeds to step S123, the information processing device 100 calculates a delay time of the corresponding region using the difference information acquired in step S121 through the function of the road status analyzing unit 102, and determines whether or not the calculated average delay time is larger than a predetermined threshold value (ThT; ThT>0) (S123). When the average delay time is larger than the predetermined threshold value, the information processing device 100 causes the process to proceed to step S124. However, when the average delay time is smaller than the predetermined threshold value, the information processing device 100 causes the process to proceed to step S125.

When the process proceeds to step S124, the information processing device 100 determines that traffic congestion is occurring in the target region (road status=traffic congestion) through the function of the road status analyzing unit 102 (S124), and causes the process to proceed to step S126. However, when the process proceeds to step S125, the information processing device 100 determines that traffic congestion is not occurring in the target region (road status≠traffic congestion) through the function of the road status analyzing unit 102 (S125), and causes the process to proceed to step S126. When the process proceeds to step S126, the information processing device 100 provides information of the road status representing the determination result of step S124 or S125 to the terminal device 200 or the like through the function of the information providing unit 103 as the traffic congestion information (S126).

The traffic congestion detecting method using the difference between the actual traveling speed and the reference speed and the difference information including the difference between the actual arrival time and the estimated arrival time has been described above. The above description has been made in connection with the method of determining traffic congestion using the average speed difference, but a method of determining traffic congestion using an evaluation index other than the average speed difference may be considered. For example, a method of counting the number of vehicles in which the speed difference is lower than the predetermined threshold value and determining that traffic congestion is occurring when the number of counted vehicles is larger than a predetermined number may be considered.

The above description has been made in connection with the method of determining traffic congestion using the average delay time, but a method of determining traffic congestion using an evaluation index other than the average delay time may be considered. For example, a method of counting the number of vehicles in which the delay time is larger than the predetermined threshold value and determining that traffic congestion is occurring when the number of counted vehicles is larger than a predetermined number may be considered. Further, a method using an average value of a difference between a delay time at a target stop and a delay time at a previous stop as an index of traffic congestion determination in view of a case in which a delay is accumulated may be considered.

(2-3-4: Method of Using Road Type)

Next, a method of determining traffic congestion in view of a road type will be described with reference to FIGS. 13 and 14. FIG. 13 is an explanatory diagram for describing a method of considering a road type in the traffic congestion detecting method using the difference information including the difference between the actual traveling speed and the reference speed. FIG. 14 is an explanatory diagram for describing a traffic congestion detecting method using the difference information including the difference between the actual arrival time and the estimated arrival time in which a road type is considered.

As the road type, there are a general road, an expressway, and a toll road. There are big differences in road environments (a difference of a legal speed, the presence or absence of a signal, the number of lanes, the presence or absence of an intersection, and an exclusive road) between the general road and the expressway/toll road. For this reason, the road status also differs according to the road type. A method of classifying a road in the same region according to the road type and determining traffic congestion may be considered as a method considering the road type. When this method is applied, the information processing device 100 classifies the difference information according to the road type, and executes traffic congestion determination using the difference information belonging to each classification. Through this configuration, a traffic congestion determination result is obtained for each road type, and thus traffic congestion information of the general road, traffic congestion information of the expressway, traffic congestion information of the toll road, or the like can be provided.

However, since there are big differences in the road environments between the general road and the expressway/toll road, an appropriate determination result may not be obtained by the method using the same threshold value. In this regard, a method using a threshold value that differs according to the road type as illustrated in FIGS. 13 and 14 is proposed. In addition, a method of determining a road status in further detail is proposed together. When roads are divided into two types (the general road and the expressway/toll road) as illustrated in FIGS. 13 and 14, a predetermined threshold value is prepared for each road type. In addition, when the road status is determined in further detail, a plurality of predetermined threshold values are prepared for each road type.

In the example of FIG. 13, four types of threshold values ThV1 to ThV4 are prepared in connection with the speed difference. First, items of the general road will be considered. The threshold values ThV1 and ThV2 are used for traffic congestion determination in the general road. Here, the threshold value ThV1 is larger than threshold value ThV2 (ThV1>ThV2). At this time, the information processing device 100 determines "road status=light traffic congestion" when the speed difference is smaller than −ThV1, and determines "road status=traffic congestion" when the speed difference is smaller than −ThV2. Through this configuration, a determination result in which traffic congestion with the flow of a vehicle is distinguished from heavy traffic congestion can be obtained. Similarly, the threshold values ThV3 and ThV4 are used for traffic congestion determination in the expressway/toll road. Here, the threshold value ThV3 is larger than the threshold value ThV4. At this time, the information processing device 100 determines "road status=light traffic congestion" when the speed difference is smaller than −ThV3, and determines "road status=traffic congestion" when the speed difference is smaller than −ThV4.

In the example of FIG. 14, four types of threshold values ThV1 to ThV4 are prepared in connection with the delay time. First, items of the general road will be considered. The threshold values ThV1 and ThV2 are used for traffic congestion determination in the general road. Here, the threshold value ThV1 is smaller than the threshold value ThV2 (ThV1<ThV2). At this time, the information processing device 100 determines "road status=light traffic congestion" when the delay time is larger than ThV1, and determines "road status=traffic congestion" when the delay time is larger than ThV2. Through this configuration, a determination result in which traffic congestion with the flow of a vehicle is distinguished from heavy traffic congestion can be obtained. Similarly, the threshold values ThV3 and ThV4 are used for traffic congestion determination in the expressway/toll road. Here, the threshold value ThV3 is smaller than the threshold value ThV4. At this time, the information processing device 100 determines "road status=light traffic congestion" when the delay time is larger than ThV3, and determines "road status=traffic congestion" when the delay time is larger than ThV4.

The method of determining traffic congestion in view of the road type has been described above. By executing the above-described traffic congestion determination process using the threshold values illustrated in FIG. 13 or FIG. 14, the analysis result of the more appropriate and detailed road status can be obtained.

(2-3-5: Method of Selecting Bypass Route)

Next, a traffic congestion bypass route selecting method will be described with reference to FIG. 15. FIG. 15 is an explanatory diagram for describing a traffic congestion bypass route selecting method.

As illustrated in FIG. 15, first, the information processing device 100 acquires information of a current position and a destination from the terminal device 200 (S131). For example, when a driver of a certain vehicle inputs a destination to the terminal device 200, information representing a current position automatically acquired by the terminal device 200 or a current position input by the driver or the like and the input destination is transmitted to the information processing device 100 together with a traffic congestion bypass route request. The information processing device 100 acquires the information and the request in step S131. Next, the information processing device 100 acquires traffic congestion information representing a road status of each road type and each region through the function of the road status analyzing unit 102 (S132). The traffic congestion information may be information obtained in real time or may be information based on the analysis result that has been executed in advance and stored.

Next, the information processing device 100 determines whether or not only general roads are to be used (S133). For example, information representing whether or not only general roads are to be used is transmitted to the information processing device 100 through the terminal device 200. Further, when information representing whether or not only general roads are to be used is not transmitted, the information processing device 100 determines that general roads and other roads are to be used. When it is determined that only general roads are to be used, the information processing device 100 causes the process to proceed to step S134. However, when it is determined that general roads and other roads are to be used, the information processing device 100 causes the process to proceed to step S135.

When the process proceeds to step S134, the information processing device 100 extracts the general roads of the shortest route that connects the current position with the destination while bypassing a traffic congestion region (or a traffic congestion road) represented by the traffic congestion information through the function of the bypass route extracting unit 104 (S134), and then causes the process to proceed to step S136. However, when the process proceeds to step S135, the information processing device 100 extracts the shortest route including an expressway or the like, which connects the current position with the destination while bypassing a traffic congestion region (or a traffic congestion road) represented by the traffic congestion information through the function of the bypass route extracting unit 104 (S135), and then causes the process to proceed to step S136. When the process proceeds to step S136, the information processing device 100 provides the extracted traffic congestion bypass route to the terminal device 200 through the function of the information providing unit 103 (S136), and then ends a series of processes related to extraction of the traffic congestion bypass route.

The traffic congestion bypass route selecting method has been described above. Here, the description has been made in connection with the method of extracting the shortest route, but, for example, a method of extracting a route having the highest fuel efficiency or a route passing through highways as much as possible as the traffic congestion bypass route may be considered. This modified example is obviously included in the technical scope of the present embodiment.

(2-3-6: Cause Analysis Method)

Next, a method of analyzing the cause of traffic congestion will be described with reference to FIG. 16. FIG. 16 is an explanatory diagram for describing a method of analyzing the cause of traffic congestion.

When the cause of traffic congestion is analyzed, there are cases in which time taken until the traffic congestion will subside is predicted, or a determination on whether or not the traffic congestion has to be avoided is relatively easily performed. For example, when the cause of traffic congestion is an event, the traffic congestion is predicted to subside after the event ends. Further, when the cause of traffic congestion is construction, the traffic congestion is predicted to subside after a construction time zone ends. However, when the cause of traffic congestion is an accident, a period of time necessary for handling the accident or an expansion status of the traffic congestion changes according to an accident situation, and thus it is difficult to predict a timing at which the traffic congestion will subside. However, when at least the cause of traffic congestion is understood, certain steps can be taken to find a route of passage.

In this regard, the information processing device 100 analyzes the cause of traffic congestion through the function of the road status analyzing unit 102, and provides the analysis result to the terminal device 200 through the function of the information providing unit 103. There are diverse cause analysis methods, but, for example, a method of analyzing the cause of traffic congestion based on a combination of geographical factors and temporal factors on traffic congestion as illustrated in FIG. 16 is introduced. First, when traffic congestion occurs locally for a short time, the information processing device 100 determines accident traffic congestion as the cause of traffic congestion. Further, when traffic congestion occurs locally and slowly, the information processing device 100 determines construction traffic congestion as the cause of traffic congestion. Further, when traffic congestion occurs widely and slowly, the information processing device 100 determines natural traffic congestion as the cause of traffic congestion.

Further, when traffic congestion occurs in a region in which traffic congestion occurs more frequently than normal in a fixed time zone in which traffic congestion regularly occurs, the information processing device 100 determines natural traffic congestion as the cause of traffic congestion. Further, when traffic congestion occurs near an exhibition hall during a period of time in which an event is held, the information processing device 100 determines that the cause of traffic congestion is an event. Information of the cause of traffic congestion determined as described above is provided to the terminal device 200 or the like. In addition, even when the cause of traffic congestion is analyzed, information of a traffic congestion occurrence region based on the difference information is used. Typically, the operation-controlled vehicle is operated based on the reference information in which a consistently occurring traffic congestion state is considered. Thus, as traffic congestion analysis is performed based on the difference information representing the difference with the reference information, the occurrence of traffic congestion that is difficult to predict by the driver can be detected.

The method of analyzing the cause of traffic congestion has been described above.

[2-4: Information Providing Method]

The method of generating the traffic congestion information, the information of the traffic congestion bypass route, the information of the cause of traffic congestion, and the like have been described so far. Here, a concrete information providing method and an example of an operation user interface (UI) including a method of displaying the above information will be described.

(2-4-1: Example of Provision Information)

As a method of providing the traffic congestion information, for example, a method of displaying a traffic congestion region or a traffic congestion bypass route to overlap map information as illustrated in FIG. 17 may be used. For example, this display is implemented such that the terminal device 200 that has received information such as the traffic congestion information causes the information to be displayed on the display unit 205 through the function of the traffic congestion information display unit 207.

Figure 18:
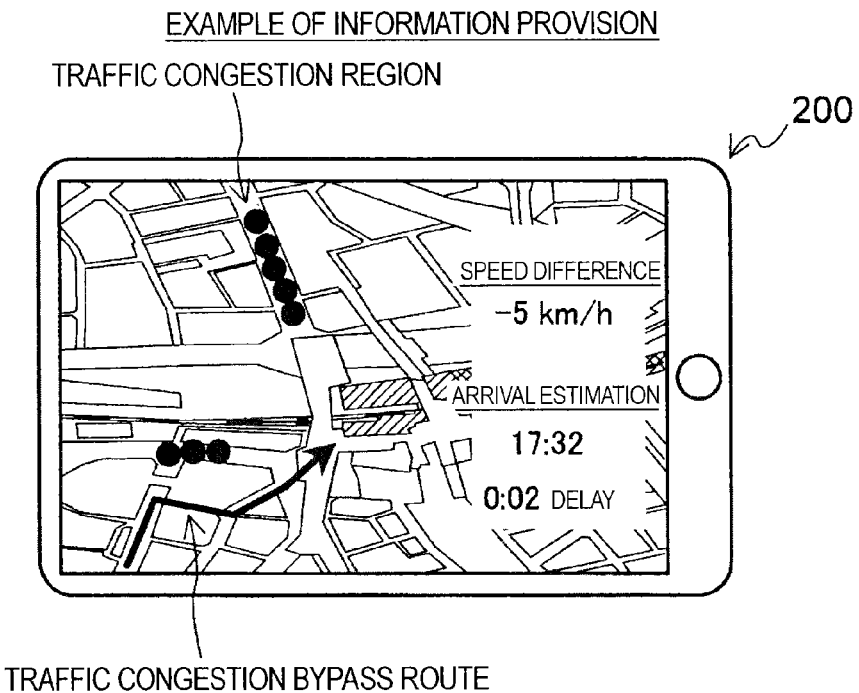
FIG. 18 is an explanatory diagram for describing an information providing method according to the first embodiment.

The terminal device 200 may be configured to display a condition change UI for changing an extraction condition of a traffic congestion bypass route in addition to the information of the traffic congestion information and the like. For example, a method in which when a distance button is pushed down, a traffic congestion bypass route having the shortest distance is displayed, and when a fuel efficiency button is pushed down, a traffic congestion bypass route with the highest fuel efficiency is displayed may be considered. A process of generating the display data may be executed on the side of the information processing device 100 or may be executed on the side of the terminal device 200. In addition, as illustrated in FIG. 18, the terminal device 200 may be configured to display content of the difference information and an estimated arrival time and an arrival delay time which are calculable based on the difference information.

(2-4-2: Example of UI (Operation Example))

Figure 19:
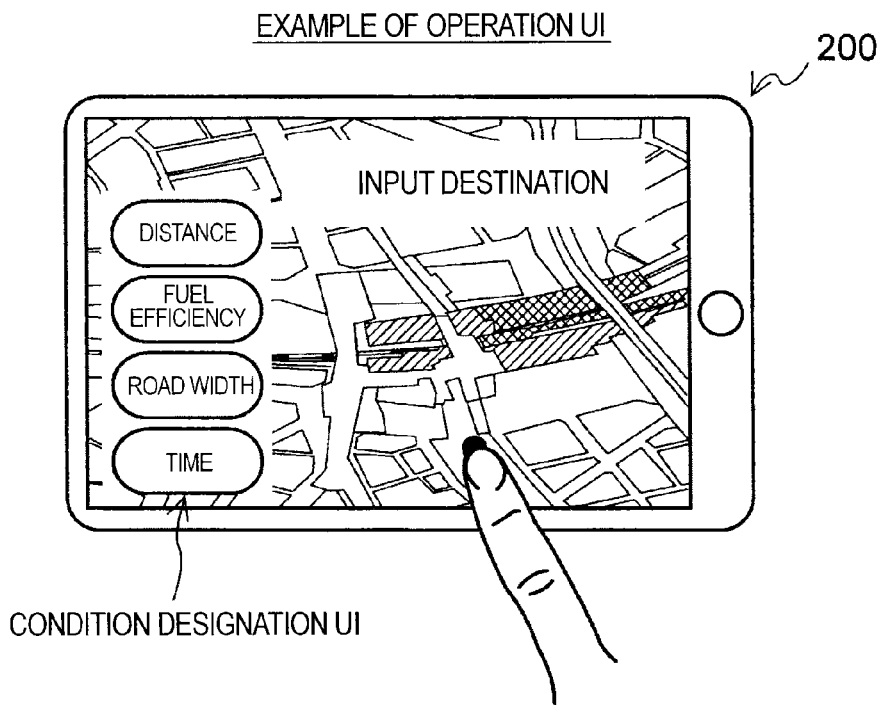
FIG. 19 is an explanatory diagram for describing an operation UI according to the first embodiment.

An operation of the terminal device 200 is performed through an interface such that a screen of the device is touched as illustrated in FIG. 19. FIG. 19 illustrates an operation UI for designating the extraction condition of the traffic congestion bypass route. An operator searches for a destination on a map displayed on a screen and touches the position of the destination. The destination is designated by this operation. Further, the operator operates a condition designation UI for designating the extraction condition of the traffic congestion bypass route and selects the extraction condition. For example, when a road width button is touched, a traffic congestion bypass route passing through roads with a broad road width is extracted. Further, when a time button is touched, a traffic congestion bypass route arriving at a destination in the shortest time is extracted.

The concrete information providing method and the example of the operation UI have been described above. Here, the above-described screen configuration and UI are exemplary and may be arbitrarily changed.

The first embodiment according to the present technology has been described above. By applying the technology according to the present embodiment, traffic congestion can be detected with a high degree of accuracy. In addition, extraction of a traffic congestion bypass route and analysis of the cause of traffic congestion can be performed with a high degree of accuracy.

3: Second Embodiment

Method of Usage in Hazard Anticipation

Next, a second embodiment according to the present technology will be described. The second embodiment relates to a method of acquiring a traveling status of an operation-controlled vehicle and using the acquired information for hazard prediction.

[3-1: System Configuration Example]

Figure 20:
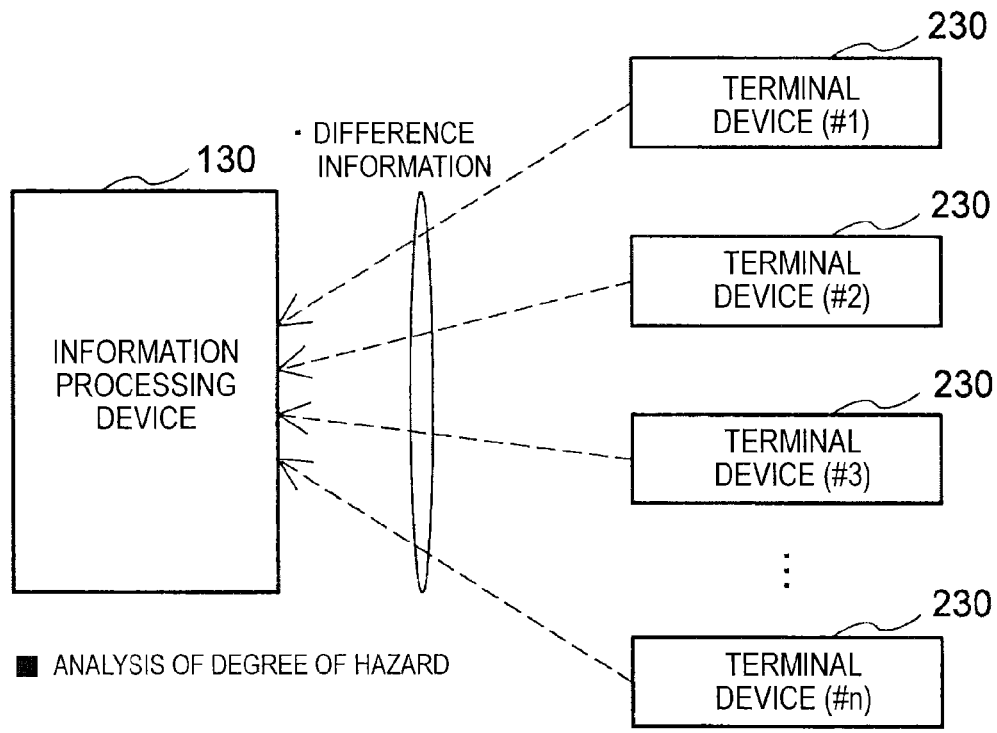
FIG. 20 is an explanatory diagram for describing a system configuration according to a second embodiment.
Figure 21:
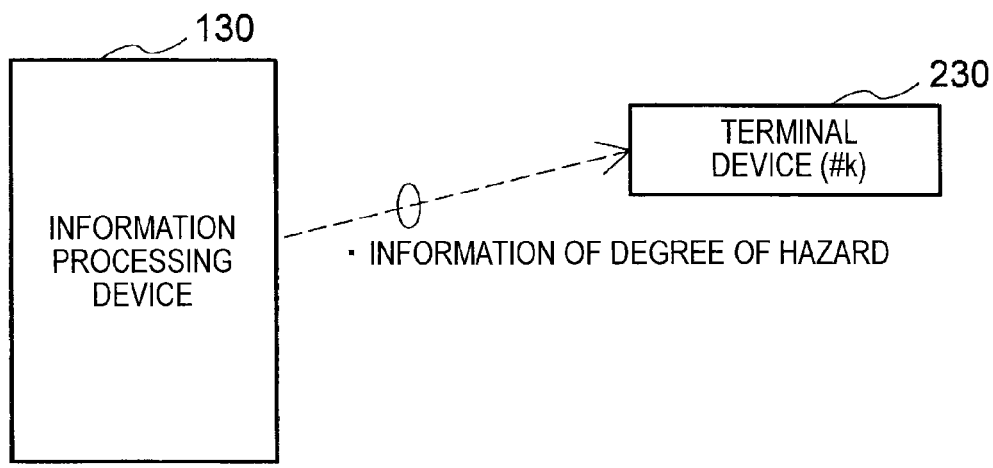
FIG. 21 is an explanatory diagram for describing a system configuration according to the second embodiment.

First, a system configuration example capable of implementing a method according to the present embodiment will be described with reference to FIGS. 20 and 21. FIGS. 20 and 21 are explanatory diagrams for describing a system configuration example capable of implementing a method according to the present embodiment.

As illustrated in FIG. 20, a system according to the present embodiment mainly includes an information processing device 130 and a plurality of terminal devices 230.

For example, the information processing device 130 configures a part of a control system installed in a control center that performs operation control of vehicles. The information processing device 130 may be configured with a plurality of calculation processing devices. Further, the information processing device 130 may be a cloud computing system. Meanwhile, the terminal device 230 is a device mounted in a vehicle in some form. For example, the terminal device 230 may be a device installed in a vehicle such as a car navigation system or an in-vehicle computer or may be a device such as a mobile telephone or an information terminal held by a driver or another passenger. Here, in the following description, for the sake of convenience of description, a device mounted in a vehicle is assumed as the terminal device 230.

As illustrated in FIG. 20, each terminal device 230 detects a difference between a traveling status of a vehicle in which the its own device is mounted and the reference information used as the reference of operation control, and transmits difference information representing the difference to the information processing device 130. For example, a vehicle speed, an arrival time at a predetermined spot, or the like may be used as a traveling status of a vehicle. For example, a reference speed of each road based on a legal speed, an estimated time of arrival at a predetermined spot, or the like may be used as the reference information. For example, when the reference speed is used as the reference information, the difference information includes a difference between an actually detected vehicle speed and a reference speed in a corresponding driving region. Meanwhile, when the estimated arrival time is used as the reference information, the difference information includes a difference (delay time) between an actual arrival time at a predetermined spot and an estimated time of arrival at a predetermined spot.

Each terminal device 230 generates the difference information at predetermined time intervals or at a predetermined timing, and transmits the difference information to the information processing device 130. Thus, the difference information from the plurality of terminal devices 230 is collected in the information processing device 130. For this reason, the information processing device 130 can recognize traveling statuses of vehicles in various spots or regions. In this regard, the information processing device 130 analyzes a degree of hazard of a road in various spots or regions using the difference information collected from the plurality of terminal devices 230. In addition, the information processing device 130 provides information of a hazard bypass route or transmits warning information using the analysis result.

An analysis result (degree of hazard information, hazard bypass route information, and the like) obtained by the information processing device 130 as described above is transmitted to the terminal device 230 as illustrated in FIG. 21. At this time, the information processing device 130 may transmit the analysis result to all of the terminal devices 230, and preferably transmits the analysis result to the terminal device 230 mounted in the vehicle traveling in or near the corresponding spot or region. The terminal device 230 to which the analysis result is to be transmitted may be the terminal device 230 different from the terminal device 230 that has transmitted the difference information. In addition, the information processing device 130 may be configured to transmit the analysis result to a system such as a road traffic center or a broadcasting station.

The system configuration according to the present embodiment has been described above.

[3-2: Device Configuration]

Next, configurations of the information processing device 130 and the terminal device 230 that configure the system according to the present embodiment will be described in further detail.

(3-2-1: Configuration of Information Processing Device 130)

Figure 22:
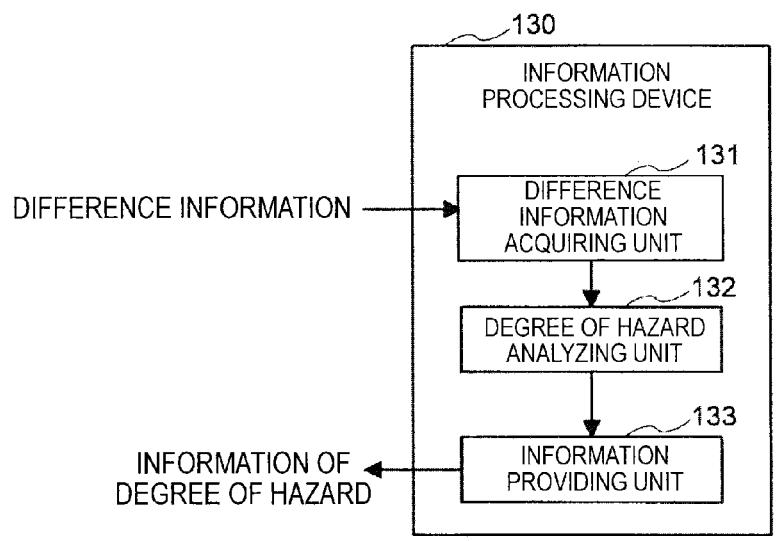
FIG. 22 is an explanatory diagram for describing a functional configuration of an information processing device according to the second embodiment.

First, a functional configuration of the information processing device 130 according to the present embodiment will be described with reference to FIG. 22. FIG. 22 is an explanatory diagram for describing the functional configuration of the information processing device 130 according to the present embodiment.

As illustrated in FIG. 22, the information processing device 130 mainly includes a difference information acquiring unit 131, a degree of hazard analyzing unit 132, and an information providing unit 133.

The difference information acquiring unit 131 acquires the difference information from each terminal device 230. The difference information acquired by the difference information acquiring unit 131 is input to the degree of hazard analyzing unit 132. Upon receiving the difference information, the degree of hazard analyzing unit 132 detects a region or a road in which a degree of hazard is high using the input difference information. The details of a hazardous region detecting method will be described later. Information of a hazardous region (hereinafter, "degree of hazard information") detected by the degree of hazard analyzing unit 132 is input to the information providing unit 133. Upon receiving the degree of hazard information, the information providing unit 133 provides the input degree of hazard information to the terminal device 230 or the like.

The functional configuration of the information processing device 130 according to the present embodiment has been described above.

(3-2-2: Configuration of Terminal Device 230)

Figure 23:
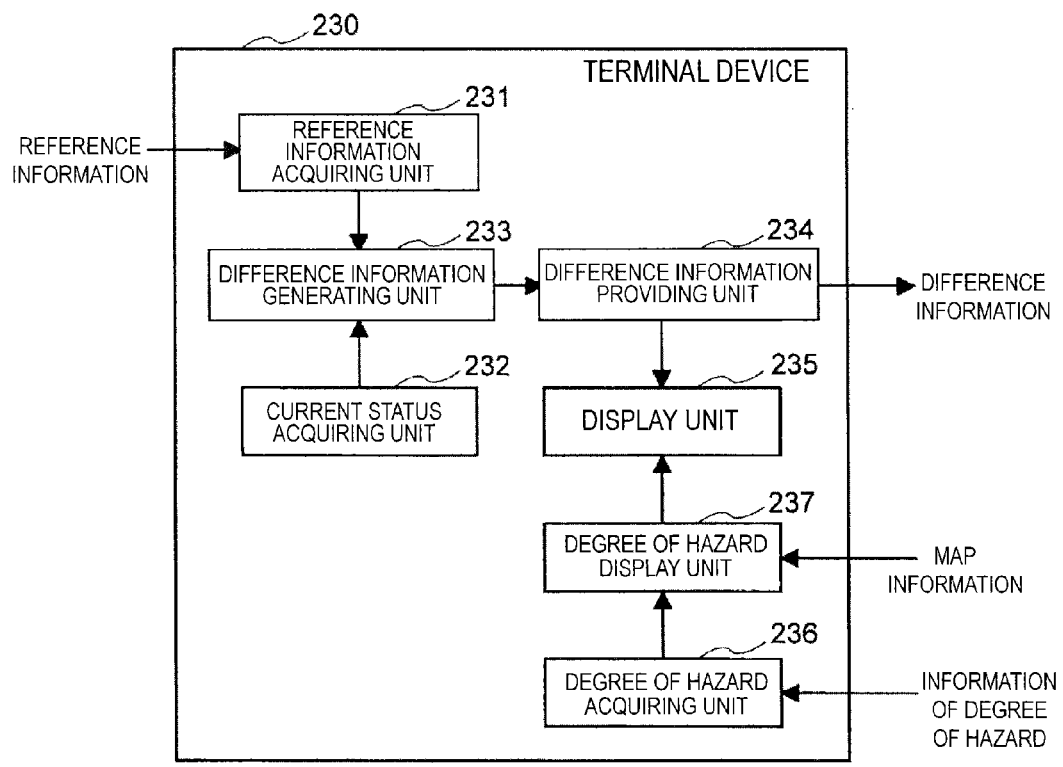
FIG. 23 is an explanatory diagram for describing a functional configuration of a terminal device according to the second embodiment.

Next, a functional configuration of the terminal device 230 according to the present embodiment will be described with reference to FIG. 23. FIG. 23 is an explanatory diagram for describing the functional configuration of the terminal device 230 according to the present embodiment.

As illustrated in FIG. 23, the terminal device 230 mainly includes a reference information acquiring unit 231, a current status acquiring unit 232, a difference information generating unit 233, a difference information providing unit 234, a display unit 235, a degree of hazard acquiring unit 236, and a degree of hazard display unit 237.

The reference information acquiring unit 231 acquires reference information used as a reference of operation control. The reference information may be provided from the information processing device 130 or may be provided from another operation control system. The reference information may be stored in a storage device (not shown) connected to or built in the terminal device 230 in advance. The reference information acquired by the reference information acquiring unit 231 is input to the difference information generating unit 233. A traveling status (hereinafter, "current status") of a vehicle is input from the current status acquiring unit 232 to the difference information generating unit 233.

For example, a traveling speed of a vehicle, an arrival time at a predetermined spot, or the like may be used as the current status. The current status acquiring unit 232 acquires the current status from a driving system or a sensor of a vehicle or the like, and inputs the current status to the difference information generating unit 233. Upon receiving the current status, the difference information generating unit 233 compares the input current status with the reference information, and generates the difference information. For example, the difference information generating unit 233 calculates a difference between the traveling speed of the vehicle and the reference speed, and outputs the calculated difference as the difference information. The difference information generating unit 233 calculates a difference between an actual arrival time and an estimated arrival time represented by the reference information, and outputs the calculated difference as the difference information. At this time, the difference information generating unit 233 includes information of a spot or a region corresponding to the current status in the difference information.

The difference information generated by the difference information generating unit 233 is input to the difference information providing unit 234. Upon receiving the difference information, the difference information providing unit 234 transmits the input difference information to the information processing device 130. In addition, the difference information providing unit 234 causes the input difference information to be displayed on the display unit 235. For example, the difference information providing unit 234 displays a warning of an excessive speed or an arrival delay based on the difference information, displays a concrete numerical value such as a speed difference or an arrival time difference, or displays the reference information together with the above-mentioned information. Through this display, the driver can quickly recognize the current status.

Further, when the degree of hazard information is provided from the information processing device 130, the degree of hazard acquiring unit 236 acquires the degree of hazard information from the information processing device 130. The degree of hazard information acquired by the degree of hazard acquiring unit 236 is input to the degree of hazard display unit 237. Upon receiving the degree of hazard information, the degree of hazard display unit 237 causes display content based on the input degree of hazard information to be displayed on the display unit 235. For example, the degree of hazard display unit 237 acquires map information including a current driving region, and causes the degree of hazard information to be displayed on the display unit 235 in such a form that a hazardous region is displayed on a map. The degree of hazard display unit 237 may display an address or a geographical name of a hazardous region based on the degree of hazard information using text information.

The functional configuration of the terminal device 230 according to the present embodiment has been described above.

[3-3: Hazard Predicting Method]

Next, the details of a hazardous region detecting (hazard predicting) method performed by the information processing device 130 will be described.

First, an action taken by the driver in a hazardous region is considered. For example, an action taken by the driver at an intersection having a broken signal light or a sharp curve region with a broken curve mirror is considered. The normal driver is considered to reduce a traveling speed at the intersection or the sharp curve spot in terms of safety. In other words, the driver has a tendency to reduce the vehicle speed in a hazardous region. Further, whether or not a spot in which many vehicles travel at a high speed is safe is considered. Typically, a road in which a legal speed is 30 km/h but many vehicles travel at a speed of 50 km/h or higher is obviously considered to be a hazardous road. In other words, a road in which vehicles pass through at a speed higher than the reference speed is naturally considered to be a hazardous road.

Based on this consideration, a region in which many vehicles pass through at a speed clearly lower than the reference speed or a region in which many vehicles travel at a speed clearly higher than the reference speed is considered as a region with a high degree of hazard. In this regard, the following prediction algorithm is proposed.

(3-3-1: Prediction Algorithm #1 (Slow Case))

Figure 24:
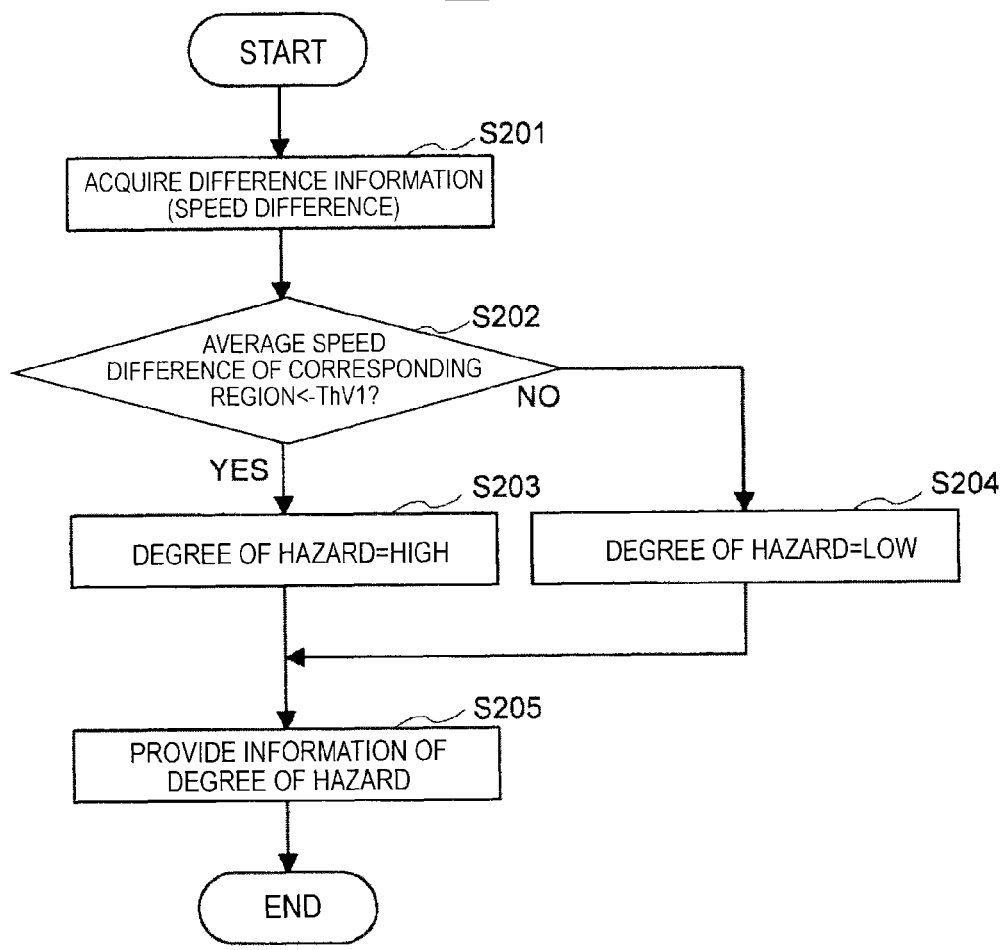
FIG. 24 is an explanatory diagram for describing an example of a prediction algorithm according to the second embodiment.

First, a hazard predicting method (a prediction algorithm #1) using the difference information including the difference between the actual traveling speed and the reference speed will be described with reference to FIG. 24. The prediction algorithm #1 is an algorithm that determines a region in which many vehicles travel at a speed lower than the reference speed as a region with a high degree of hazard. FIG. 24 is an explanatory diagram for describing the flow of a hazard prediction process performed by the information processing device 130.

As illustrated in FIG. 24, when the hazard prediction process starts on a certain target region, the information processing device 130 acquires the difference information from the terminal device 230 by the function of the difference information acquiring unit 131 (S201). Next, the information processing device 130 calculates an average speed difference of the corresponding region using the difference information acquired in step S201 through the function of the degree of hazard analyzing unit 132, and determines whether or not the calculated average speed difference is lower than a predetermined threshold value (−ThV1; ThV1>0) (S202). When the average speed difference is lower than the predetermined threshold value, the information processing device 130 causes the process to proceed to step S203. However, when the average speed difference is higher than the predetermined threshold value, the information processing device 130 causes the process to proceed to step S204.

When the process proceeds to step S203, the information processing device 130 determines that the degree of hazard of the target region is high (degree of hazard=high) through the function of the degree of hazard analyzing unit 132 (S203), and then causes the process to proceed to step S205. However, when the process proceeds to step S204, the information processing device 130 determines that the degree of hazard of the target region is low (degree of hazard=low) through the function of the degree of hazard analyzing unit 132 (S204), and then causes the process to proceed to step S205. When the process proceeds to step S205, the information processing device 130 provides information representing the determination result of step S203 or S204 to the terminal device 230 or the like as the degree of hazard information through the function of the information providing unit 133 (S205).

The hazard predicting method (the prediction algorithm #1) using the difference information including the difference between the actual traveling speed and the reference speed has been described above. Meanwhile, the above description has been made in connection with the method of determining a degree of hazard using the average speed difference, but a method of determining a degree of hazard using an evaluation index other than the average speed difference may be considered. For example, a method of counting the number of vehicles in which the speed difference is lower than the predetermined threshold value and determining that the degree of hazard is high when the number of counted vehicles is larger than a predetermined number may be considered.

(3-3-2: Prediction Algorithm #2 (Fast Case))

Figure 25:
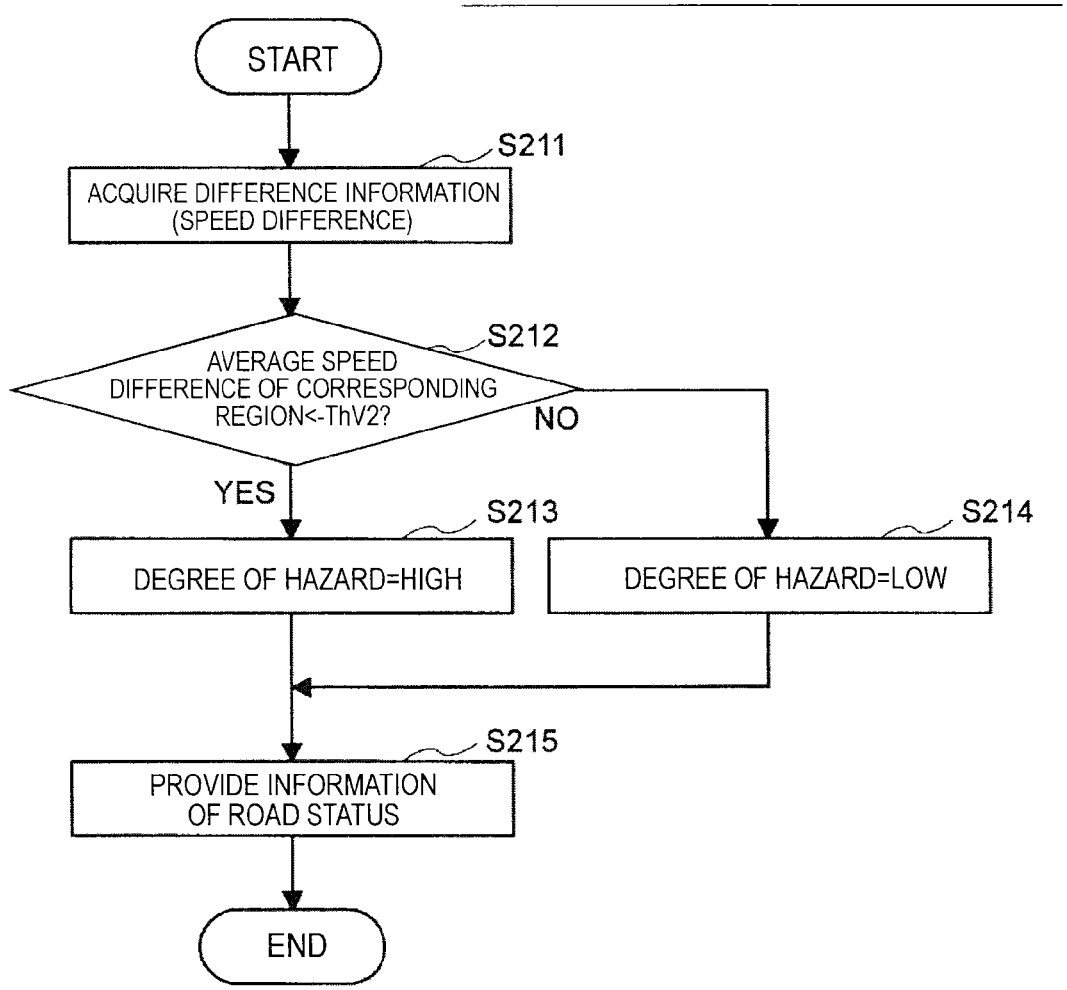
FIG. 25 is an explanatory diagram for describing an example of a prediction algorithm according to the second embodiment.

Next, a hazard predicting method (a prediction algorithm #2) using the difference information including the difference between the actual traveling speed and the reference speed will be described with reference to FIG. 25. The prediction algorithm #2 is an algorithm that determines a region in which many vehicles travel at a speed higher than the reference speed as a region with a high degree of hazard. FIG. 25 is an explanatory diagram for describing the flow of a hazard prediction process performed by the information processing device 130.

As illustrated in FIG. 25, when the hazard prediction process starts on a certain target region, the information processing device 130 acquires the difference information from the terminal device 230 by the function of the difference information acquiring unit 131 (S211). Next, the information processing device 130 calculates an average speed difference of the corresponding region using the difference information acquired in step S211 through the function of the degree of hazard analyzing unit 132, and determines whether or not the calculated average speed difference is higher than a predetermined threshold value (ThV2; ThV2>0) (S212). When the average speed difference is higher than the predetermined threshold value, the information processing device 130 causes the process to proceed to step S213. However, when the average speed difference is lower than the predetermined threshold value, the information processing device 130 causes the process to proceed to step S214.

When the process proceeds to step S213, the information processing device 130 determines that the degree of hazard of the target region is high (degree of hazard=high) through the function of the degree of hazard analyzing unit 132 (S213), and then causes the process to proceed to step S215. However, when the process proceeds to step S214, the information processing device 130 determines that the degree of hazard of the target region is low (degree of hazard=low) through the function of the degree of hazard analyzing unit 132 (S214), and then causes the process to proceed to step S215. When the process proceeds to step S215, the information processing device 130 provides information representing the determination result of step S213 or S214 to the terminal device 230 or the like as the degree of hazard information through the function of the information providing unit 133 (S215).

The hazard predicting method (the prediction algorithm #2) using the difference information including the difference between the actual traveling speed and the reference speed has been described above. Meanwhile, the above description has been made in connection with the method of determining a degree of hazard using the average speed difference, but a method of determining a degree of hazard using an evaluation index other than the average speed difference may be considered. For example, a method of counting the number of vehicles in which the speed difference is higher than the predetermined threshold value and determining that the degree of hazard is high when the number of counted vehicles is larger than a predetermined number may be considered. In addition, a combination of the prediction algorithms #1 and #2 may be used.

(3-3-3: Configuration Using Traffic Congestion Information (Slow Case))

Figure 26:
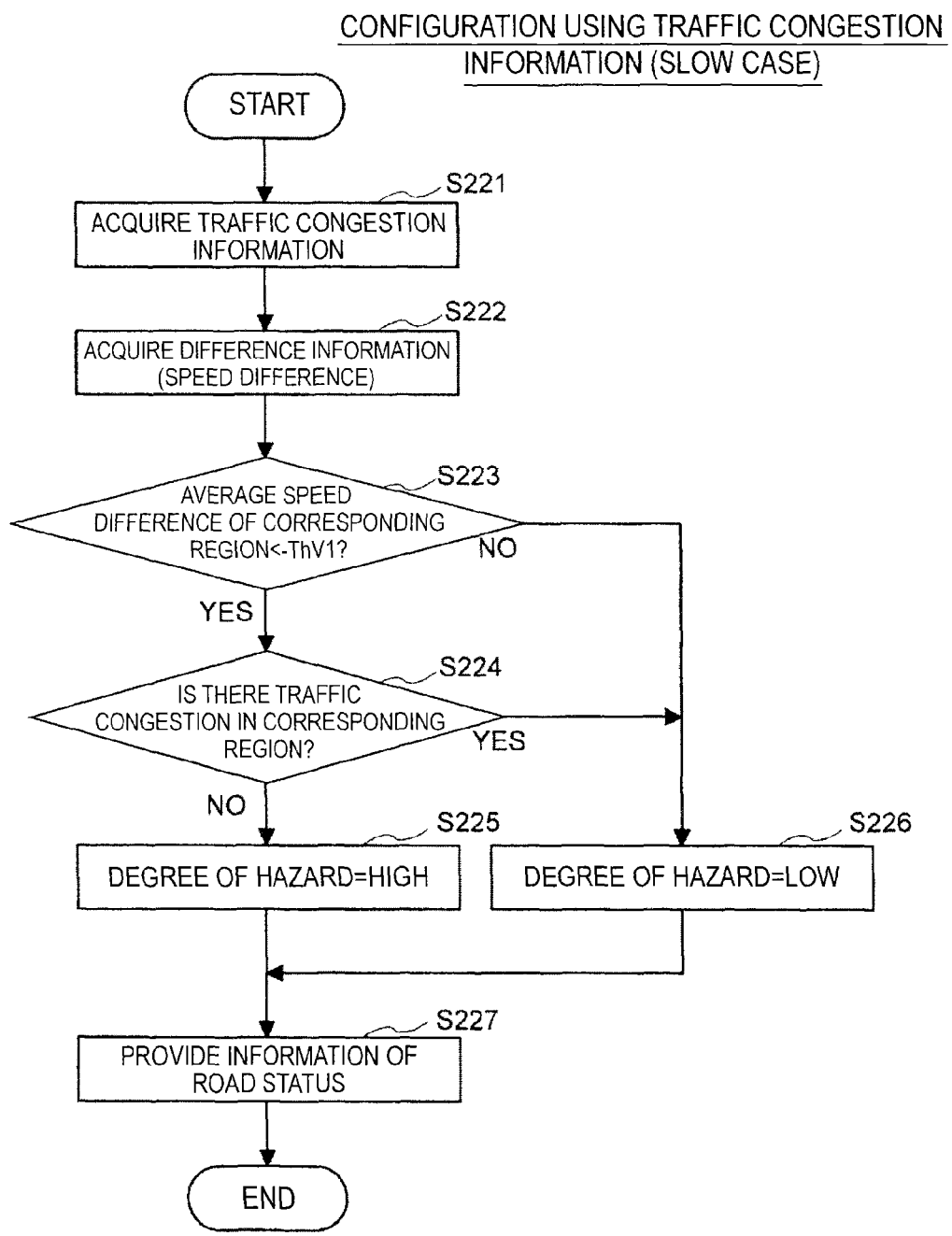
FIG. 26 is an explanatory diagram for describing an example (a configuration using traffic congestion information) of a prediction algorithm according to the second embodiment.

Next, an algorithm of predicting a hazardous region using traffic congestion information based on the prediction algorithm #1 with a high degree of accuracy is proposed. FIG. 26 is an explanatory diagram for describing an algorithm of predicting a hazardous region using traffic congestion information based on the prediction algorithm #1 with a high degree of accuracy.

As illustrated in FIG. 26, when the hazard prediction process starts on a certain target region, the information processing device 130 first acquires traffic congestion information (S221). Here, the traffic congestion information may be generated using the technology according to the first embodiment or may be acquired from a system such as a road traffic center. Next, the information processing device 130 acquires the difference information from the terminal device 230 through the function of the difference information acquiring unit 131 (S222).

Next, the information processing device 130 calculates an average speed difference of the corresponding region using the difference information acquired in step S222 through the function of the degree of hazard analyzing unit 132, and determines whether or not the calculated average speed difference is lower than a predetermined threshold value (−ThV1; ThV1>0) (S223). When the average speed difference is lower than the predetermined threshold value, the information processing device 130 causes the process to proceed to step S224. However, when the average speed difference is higher than the predetermined threshold value, the information processing device 130 causes the process to proceed to step S226.

When the process proceeds to step S224, the information processing device 130 determines whether or not traffic congestion is occurring in the target region based on the traffic congestion information acquired in step S221 (S224). When it is determined that traffic congestion is occurring in the target region, the information processing device 130 causes the process to proceed to step S226. However, when it is determined that traffic congestion is not occurring in the target region, the information processing device 130 causes the process to proceed to step S225.

When the process proceeds to step S225, the information processing device 130 determines that the degree of hazard of the target region is high (degree of hazard=high) through the function of the degree of hazard analyzing unit 132 (S225), and then causes the process to proceed to step S227. However, when the process proceeds to step S226, the information processing device 130 determines that the degree of hazard of the target region is low (degree of hazard=low) through the function of the degree of hazard analyzing unit 132 (S226), and then causes the process to proceed to step S227. When the process proceeds to step S227, the information processing device 130 provides information representing the determination result of step S225 or S226 to the terminal device 230 or the like as the degree of hazard information through the function of the information providing unit 133 (S227).

The hazard predicting method (the improved version of the prediction algorithm #1) using the difference information including the difference between the actual traveling speed and the reference speed has been described above. By considering the traffic congestion information, a possibility of a hazard being erroneously predicted based on a vehicle traveling at a low speed due to traffic congestion can be reduced. Meanwhile, the above description has been made in connection with the method of determining a degree of hazard using the average speed difference, but a method of determining a degree of hazard using an evaluation index other than the average speed difference may be considered. For example, a method of counting the number of vehicles in which the speed difference is lower than the predetermined threshold value and determining that the degree of hazard is high when the number of counted vehicles is larger than a predetermined number may be considered.

(3-3-4: Configuration Using Weather Data (Slow Case))

Figure 27:
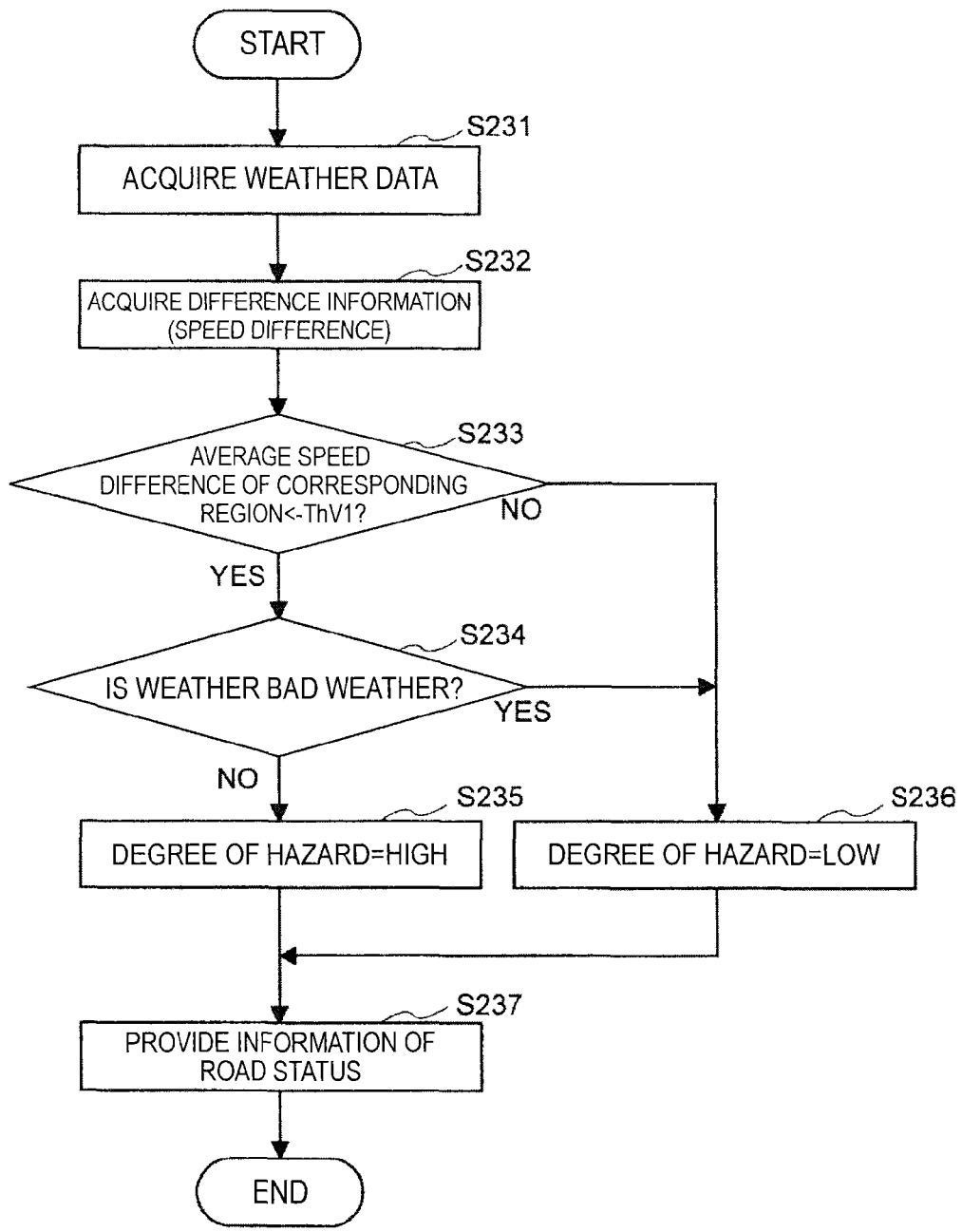
FIG. 27 is an explanatory diagram for describing an example (a configuration using weather data) of a prediction algorithm according to the second embodiment.

Next, an algorithm of predicting a hazardous region using weather data based on the prediction algorithm #1 with a high degree of accuracy is proposed. FIG. 27 is an explanatory diagram for describing an algorithm of predicting a hazardous region using weather data based on the prediction algorithm #1 with a high degree of accuracy.

As illustrated in FIG. 27, when the hazard prediction process starts on a certain target region, the information processing device 130 first acquires weather data (S231). Next, the information processing device 130 acquires the difference information from the terminal device 230 through the function of the difference information acquiring unit 131 (S232). Next, the information processing device 130 calculates an average speed difference of the corresponding region using the difference information acquired in step S232 through the function of the degree of hazard analyzing unit 132, and determines whether or not the calculated average speed difference is lower than a predetermined threshold value (−ThV1; ThV 1>0) (S233). When the average speed difference is lower than the predetermined threshold value, the information processing device 130 causes the process to proceed to step S234. However, when the average speed difference is higher than the predetermined threshold value, the information processing device 130 causes the process to proceed to step S236.

When the process proceeds to step S234, the information processing device 130 determines whether or not the weather of the target region is bad weather (for example, heavy rain, snow, a thunderstorm, dense fog, a typhoon, or the like) based on the weather data acquired in step S231 (S234). When it is determined that the weather of the target region is bad weather, the information processing device 130 causes the process to proceed to step S236. However, when it is determined that the weather of the target region is not bad weather, the information processing device 130 causes the process to proceed to step S235.

When the process proceeds to step S235, the information processing device 130 determines that the degree of hazard of the target region is high (degree of hazard=high) due to a cause other than bad weather of the target region through the function of the degree of hazard analyzing unit 132 (S235), and then causes the process to proceed to step S237. However, when the process proceeds to step S236, the information processing device 130 determines that the degree of hazard of the target region is low (degree of hazard=low) due to a cause other than bad weather of the target region through the function of the degree of hazard analyzing unit 132 (S236), and then causes the process to proceed to step S237. When the process proceeds to step S237, the information processing device 130 provides information representing the determination result of step S235 or S236 to the terminal device 230 or the like as the degree of hazard information through the function of the information providing unit 133 (S237).

The hazard predicting method (the improved version of the prediction algorithm #1) using the difference information including the difference between the actual traveling speed and the reference speed has been described above. By considering the weather, a possibility of a hazard being erroneously predicted based on a vehicle traveling a low speed due to bad weather can be reduced. Meanwhile, the above description has been made in connection with the method of determining a degree of hazard using the average speed difference, but a method of determining a degree of hazard using an evaluation index other than the average speed difference may be considered. For example, a method of counting the number of vehicles in which the speed difference is lower than the predetermined threshold value and determining that the degree of hazard is high when the number of counted vehicles is larger than a predetermined number may be considered.

[3-4: Information Providing Method]

A method of generating the degree of hazard information has been described above. Here, a concrete information providing method and an example of an operation user interface (UI) including a method of displaying the degree of hazard information will be described.

(3-4-1: Example of Provision Information)

Figure 28:
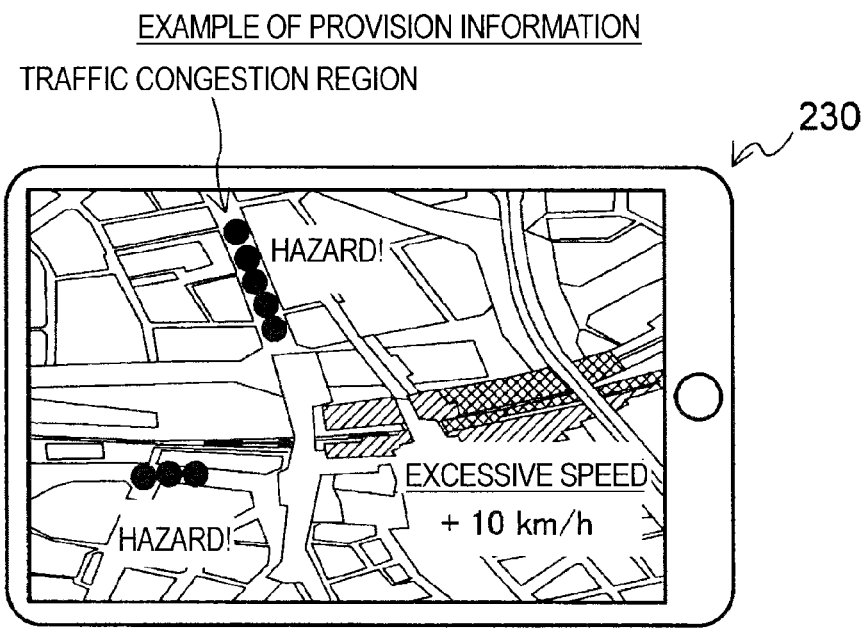
FIG. 28 is an explanatory diagram for describing an information providing method according to the second embodiment.

As a method of providing the traffic congestion information, for example, a method of displaying a traffic congestion region or a hazardous region to overlap map information as illustrated in FIG. 28 may be used. The hazard bypass route is extracted by the same algorithm as in extraction of the traffic congestion bypass route. The difference between the hazard bypass route and the traffic congestion bypass route is merely whether or not a region to bypass is a hazardous region or a traffic congestion region. For example, this display is implemented such that the terminal device 230 that has received the degree of hazard information causes the degree of hazard information to be displayed on the display unit 235 through the function of the degree of hazard display unit 237.

(3-4-2: Example of UI (Operation Example))

Figure 29:
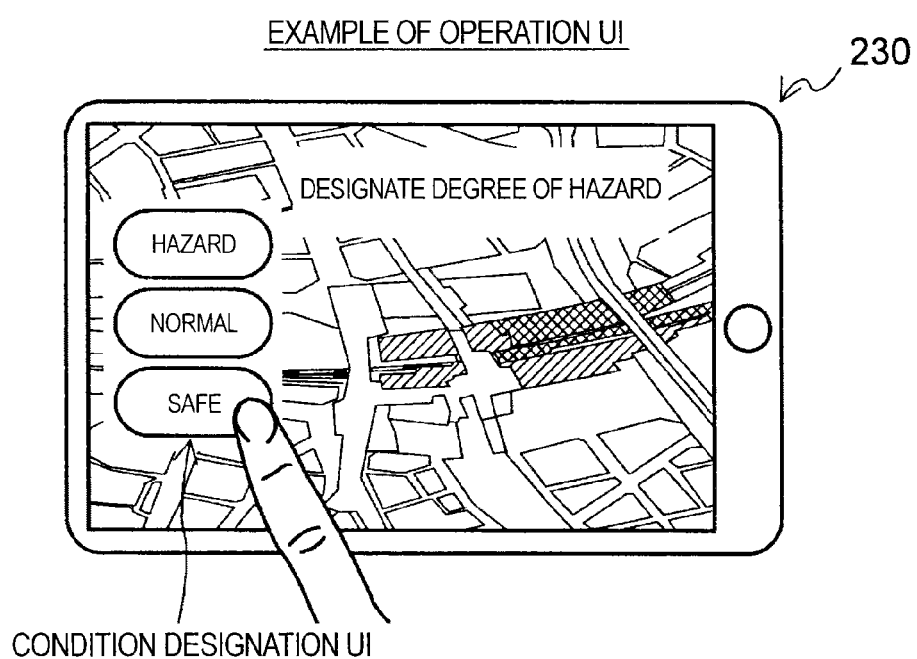
FIG. 29 is an explanatory diagram for describing an operation UI according to the second embodiment.

An operation of the terminal device 230 is performed through an interface such that a screen of the device is touched as illustrated in FIG. 29. FIG. 29 illustrates an operation UI for designating the extraction condition of the hazard bypass route. An operator searches for a destination on a map displayed on a screen and touches the position of the destination. The destination is designated by this operation. Further, the operator operates a condition designation UI for designating the extraction condition of the hazard bypass route and selects the extraction condition. For example, when a safety button is touched, a hazard bypass route in which the frequency of passing through hazardous regions is minimized is extracted.

The concrete information providing method and the example of the operation UI have been described above. Here, the above-described screen configuration and UI are exemplary and may be arbitrarily changed.

The second embodiment according to the present technology has been described above. By applying the technology according to the present embodiment, a hazardous region can be detected with a high degree of accuracy.

4: Third Embodiment

Method of Usage in Road Design

Next, a third embodiment according to the present technology will be described. The present embodiment relates to a method of using information of the traffic congestion region and the hazardous region detected by the systems according to the first and second embodiments for road design. As the traffic congestion region and the hazardous region can be detected with a high degree of accuracy as described above, road design for implementing safe and comfortable roads is performed using the detection result.

Specifically, an improvement plan can be put into practice centering on the traffic congestion region and the hazardous region obtained using information of the public transportation system or the like. In this case, the public transportation system can be smoothly operated, and the users of the public transportation system as well as the drivers who directly drive the vehicles can experience convenience. As a result, the flow of people or things become smooth, and thus road design that makes a meaningful contribution to society can be performed. For example, using the techniques according to the first and second embodiments, a region with a high degree of hazard and a region with a long traffic congestion time zone (hereinafter, "region in need of improvement") can be automatically extracted as illustrated in FIG. 30.

Figure 30:
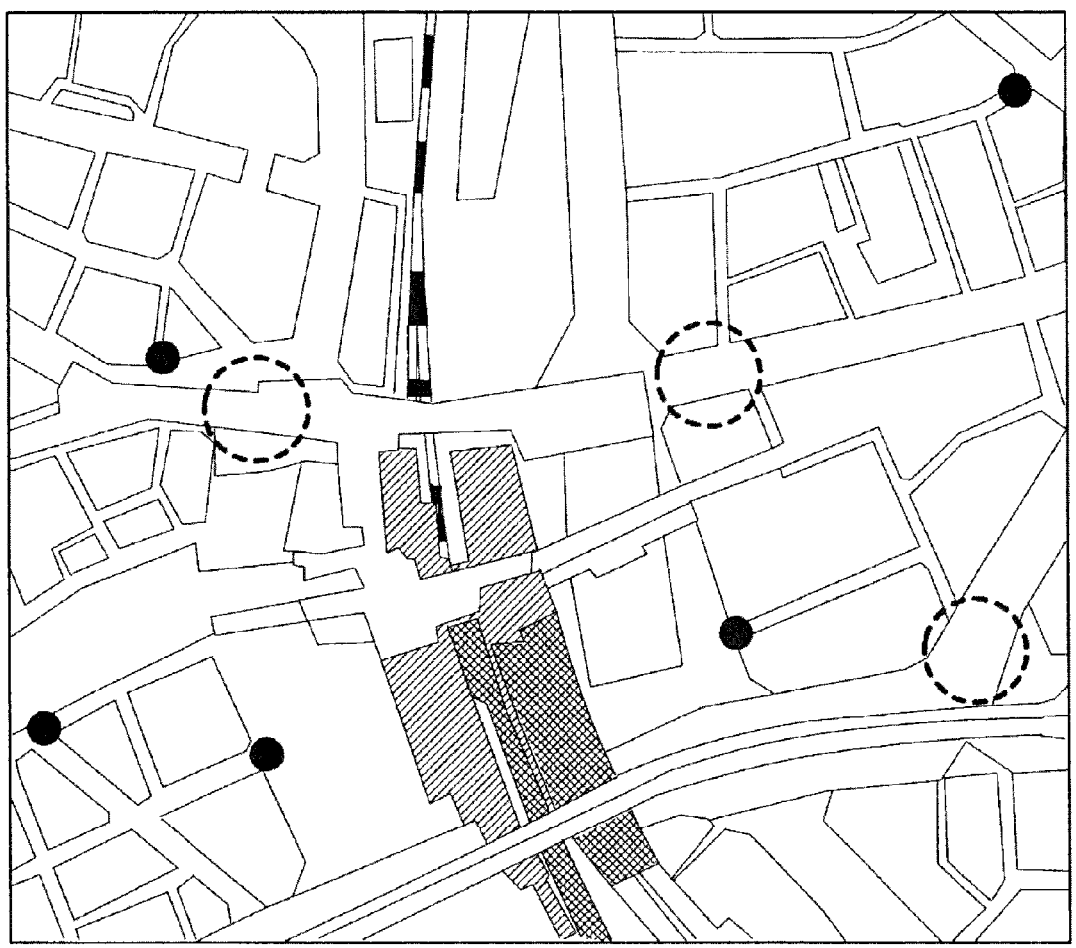
FIG. 30 is an explanatory diagram for describing a usage method in road design according to a third embodiment.

In the example of FIG. 30, only position information of a region in need of improvement is illustrated, but a level of a degree of hazard and a duration of a traffic congestion time can be also calculated using the techniques according to the first and second embodiments. For example, the level of the degree of hazard can be calculated based on evaluation information of the magnitude of the speed difference or the like. Further, a time zone with a high degree of hazard can also be calculated. In addition, a traffic congestion time zone can be also calculated. For this reason, an improvement plan is made based on a region in which a time zone with a high degree of hazard overlaps a school attendance time zone of students that attend a neighboring school, a region with a long traffic congestion time, or the like, and more practical road improvement can be made. Further, as an objective index is proposed, impractical public projects can be reduced, and a waste of public funds can be suppressed.

The third embodiment according to the present technology has been described above. Furthermore, an application of the technique according to the present embodiment contributes to an improvement of public welfare.

5: Fourth Embodiment

Usage in Improvement of Operation Control

Next, a fourth embodiment according to the present technology will be described. The present embodiment relates to a method of acquiring a traveling status of an operation-controlled vehicle and using the acquired information for an improvement of the operation control.

[5-1: System Configuration Example]

Figure 31:
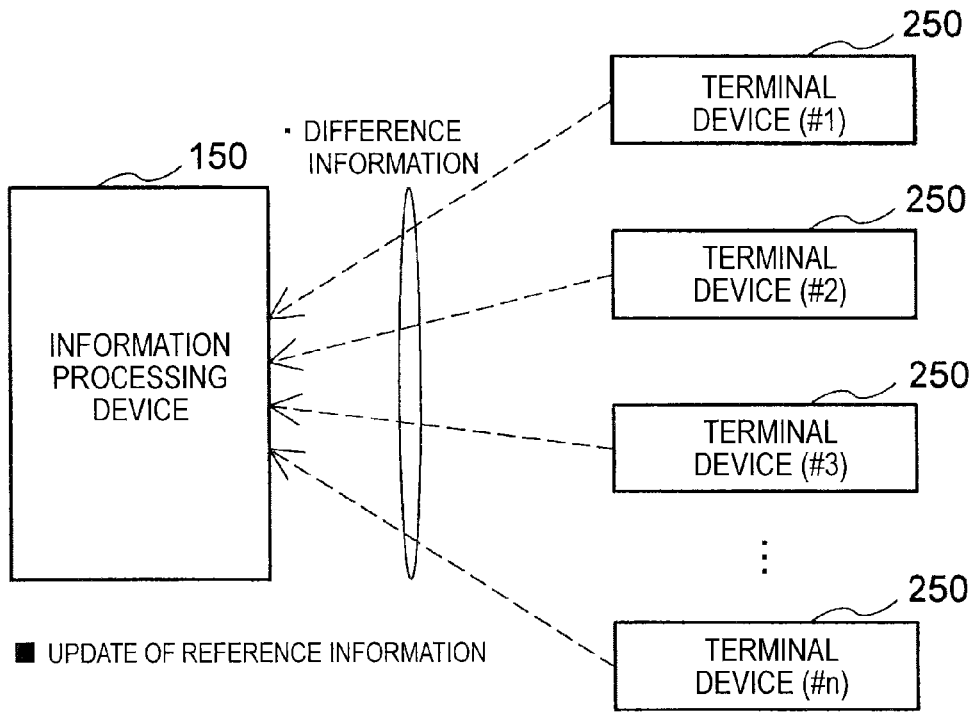
FIG. 31 is an explanatory diagram for describing a system configuration according to a fourth embodiment.
Figure 32:
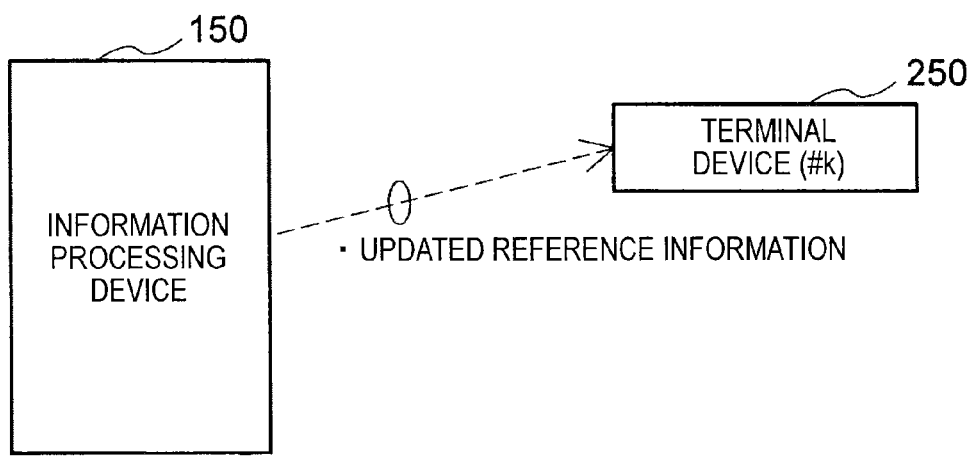
FIG. 32 is an explanatory diagram for describing a system configuration according to the fourth embodiment.

First, a system configuration example capable of implementing a method according to the present embodiment will be described with reference to FIGS. 31 and 32. FIGS. 31 and 32 are explanatory diagrams for describing a system configuration example capable of implementing a method according to the present embodiment.

As illustrated in FIG. 31, the system according to the present embodiment mainly includes an information processing device 150 and a plurality of terminal devices 250.

For example, the information processing device 150 configures a part of a control system installed in a control center that performs operation control of vehicles. The information processing device 150 may be configured with a plurality of calculation processing devices. Further, the information processing device 150 may be a cloud computing system. Meanwhile, the terminal device 250 is a device mounted in a vehicle in some form. For example, the terminal device 250 may be a device installed in a vehicle such as a car navigation system or an in-vehicle computer or may be a device such as a mobile telephone or an information terminal held by a driver or another passenger. Here, in the following description, for the sake of convenience of description, a device mounted in a vehicle is assumed as the terminal device 250.

As illustrated in FIG. 31, each terminal device 250 detects a difference between a traveling status of a vehicle in which the its own device is mounted and the reference information used as the reference of operation control, and transmits difference information representing the difference to the information processing device 150. For example, a vehicle speed, an arrival time at a predetermined spot, or the like may be used as a traveling status of a vehicle. For example, a reference speed of each road based on a legal speed, an estimated time of arrival at a predetermined spot, or the like may be used as the reference information. For example, when the reference speed is used as the reference information, the difference information includes a difference between an actually detected vehicle speed and a reference speed in a corresponding driving region. Meanwhile, when the estimated arrival time is used as the reference information, the difference information includes a difference (delay time) between an actual arrival time at a predetermined spot and an estimated time of arrival at a predetermined spot.

Each terminal device 250 generates the difference information at predetermined time intervals or at a predetermined timing, and transmits the difference information to the information processing device 150. Thus, the difference information from the plurality of terminal devices 250 is collected in the information processing device 150. For this reason, the information processing device 150 can recognize traveling statuses of vehicles in various spots or regions. In this regard, the information processing device 150 updates the reference information using the difference information collected from the plurality of terminal devices 250. The reference information updated by the information processing device 150 is transmitted to the terminal device 250 of a vehicle whose operation is controlled by the reference information as illustrated in FIG. 32.

The system configuration according to the present embodiment has been described above.

[5-2: Device Configuration]

Next, configurations of the information processing device 150 and the terminal device 250 that configure the system according to the present embodiment will be described in further detail.

(5-2-1: Configuration of Information Processing Device 150)

Figure 33:
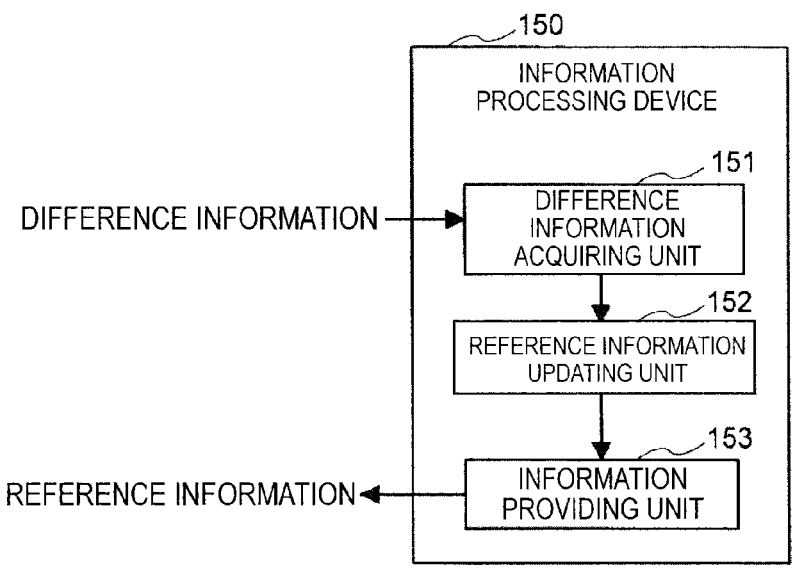
FIG. 33 is an explanatory diagram for describing a functional configuration of an information processing device according to the fourth embodiment.

First, a functional configuration of the information processing device 150 according to the present embodiment will be described with reference to FIG. 33. FIG. 33 is an explanatory diagram for describing the functional configuration of the information processing device 150 according to the present embodiment.

As illustrated in FIG. 33, the information processing device 150 mainly includes a difference information acquiring unit 151, a reference information updating unit 152, and an information providing unit 153.

The difference information acquiring unit 151 acquires the difference information from each terminal device 250. The difference information acquired by the difference information acquiring unit 151 is input to the reference information updating unit 152. Upon receiving the difference information, the reference information updating unit 152 determines whether or not the reference information is to be updated based on the input difference information. When it is determined that the reference information is to be updated, the reference information updating unit 152 updates the reference information such that the operation status is improved. The details of a reference information updating method will be described later. The updated reference information is input to the information providing unit 153. Upon receiving the updated reference information, the information providing unit 153 provides the input updated reference information to the terminal device 250 corresponding to the reference information.

The functional configuration of the information processing device 150 according to the present embodiment has been described above.

(5-2-2: Configuration of Terminal Device 250)

Figure 34:
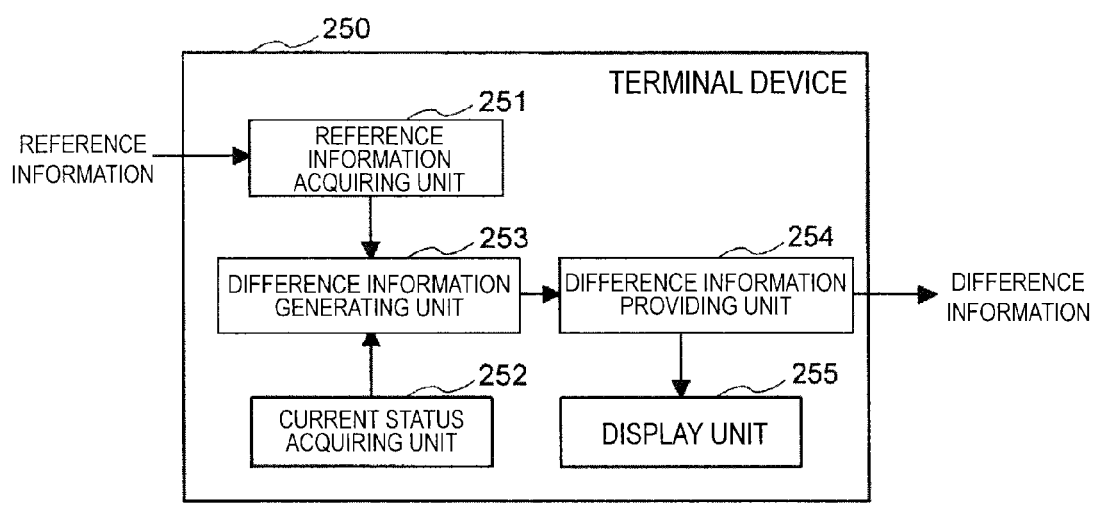
FIG. 34 is an explanatory diagram for describing a functional configuration of a terminal device according to the fourth embodiment.

Next, a functional configuration of the terminal device 250 according to the present embodiment will be described with reference to FIG. 34. FIG. 34 is an explanatory diagram for describing the functional configuration of the terminal device 250 according to the present embodiment.

As illustrated in FIG. 34, the terminal device 250 mainly includes a reference information acquiring unit 251, a current status acquiring unit 252, a difference information generating unit 253, a difference information providing unit 254, and a display unit 255.

The reference information acquiring unit 251 acquires reference information used as a reference of operation control. The reference information may be provided from the information processing device 150. The reference information may be stored in a storage device (not shown) connected to or built in the terminal device 250 in advance. The reference information acquired by the reference information acquiring unit 251 is input to the difference information generating unit 253. A traveling status (hereinafter, "current status") of a vehicle is input from the current status acquiring unit 252 to the difference information generating unit 253.

For example, a traveling speed of a vehicle, an arrival time at a predetermined spot, or the like may be used as the current status. The current status acquiring unit 252 acquires the current status from a driving system or a sensor of a vehicle or the like, and inputs the current status to the difference information generating unit 253. Upon receiving the current status, the difference information generating unit 253 compares the input current status with the reference information, and generates the difference information. For example, the difference information generating unit 253 calculates a difference between the traveling speed of the vehicle and the reference speed, and outputs the calculated difference as the difference information. Further, the difference information generating unit 253 calculates a difference between an actual arrival time and an estimated arrival time represented by the reference information, and outputs the calculated difference as the difference information. At this time, the difference information generating unit 253 includes information of a spot or a region corresponding to the current status in the difference information.

The difference information generated by the difference information generating unit 253 is input to the difference information providing unit 254. Upon receiving the difference information, the difference information providing unit 254 transmits the input difference information to the information processing device 150. In addition, the difference information providing unit 254 causes the input difference information to be displayed on the display unit 255. For example, the difference information providing unit 254 displays a warning of an excessive speed or an arrival delay based on the difference information, displays a concrete numerical value such as a speed difference or an arrival time difference, or displays the reference information together with the above-mentioned information. Through this display, the driver can quickly recognize the current status.

The functional configuration of the terminal device 250 according to the present embodiment has been described above.

[5-3: Driving Reference Updating Method]

Next, the details of the reference information updating method performed by the information processing device 150 will be described.

(5-3-1: Regarding Environmental Condition)

The reference information used for operation control is set through sufficient review by on-site observation. Further, monitoring of the operation status and an update of the reference information are performed at regular intervals. However, since monitoring of the operation status is performed by a labor-intensive method and the frequency and a period of time of monitoring are limited, there are situations in which the reference information is inappropriate. For example, there are bus companies that are operated using special schedules at the beginning and end of a year or during a particular period of time such as a summer break, but there are no bus companies that change their schedule according to the season or day of the week (or a weekday) other than Saturday, Sunday and holidays. However, even in the same time zone, traffic congestion is heavy on Friday nights, and traffic congestion is light on Wednesday nights. That is, the operation status remarkably differs according to environmental conditions.

For example, the weather, a time zone, a season, a holiday/weekday, a day of the week, and the like are considered as the environmental conditions as illustrated in FIG. 35. Conditions such as a clear, cloudy, rain, snow, a thunderstorm, and heavy winds are considered as the weather. Further, conditions such as early morning, (morning) rush hour, daytime, (evening) rush hour, night, and late night are considered as the time zone. Further, conditions such as spring, summer, autumn, and winter may be considered as the season. In addition, for example, in addition to distinction between a holiday and a weekday, conditions such as spring break, summer break, winter break, New Year's, Bon festival, a public holiday, and consecutive holidays may be considered as a distinction of holiday/weekday. Further, a method of considering each of Monday to Sunday as an environmental condition may be considered. When the technique according to an embodiment proposed in the present technology is applied, the operation statuses on various situations in which the environmental conditions are combined can be recognized point by point.

In this regard, a method of optimizing the reference information using the operation status (a set of difference information) detected according to various environmental conditions is proposed. When this method is applied, the operation status can be optimized according to the environmental conditions. Further, through analysis of the difference information, various causes that are hardly detected by monitoring based on the labor-intensive method can be objectively extracted, and thus the operation reference can be optimized by less effort.

(5-3-2: Basic Configuration)

Figure 36:
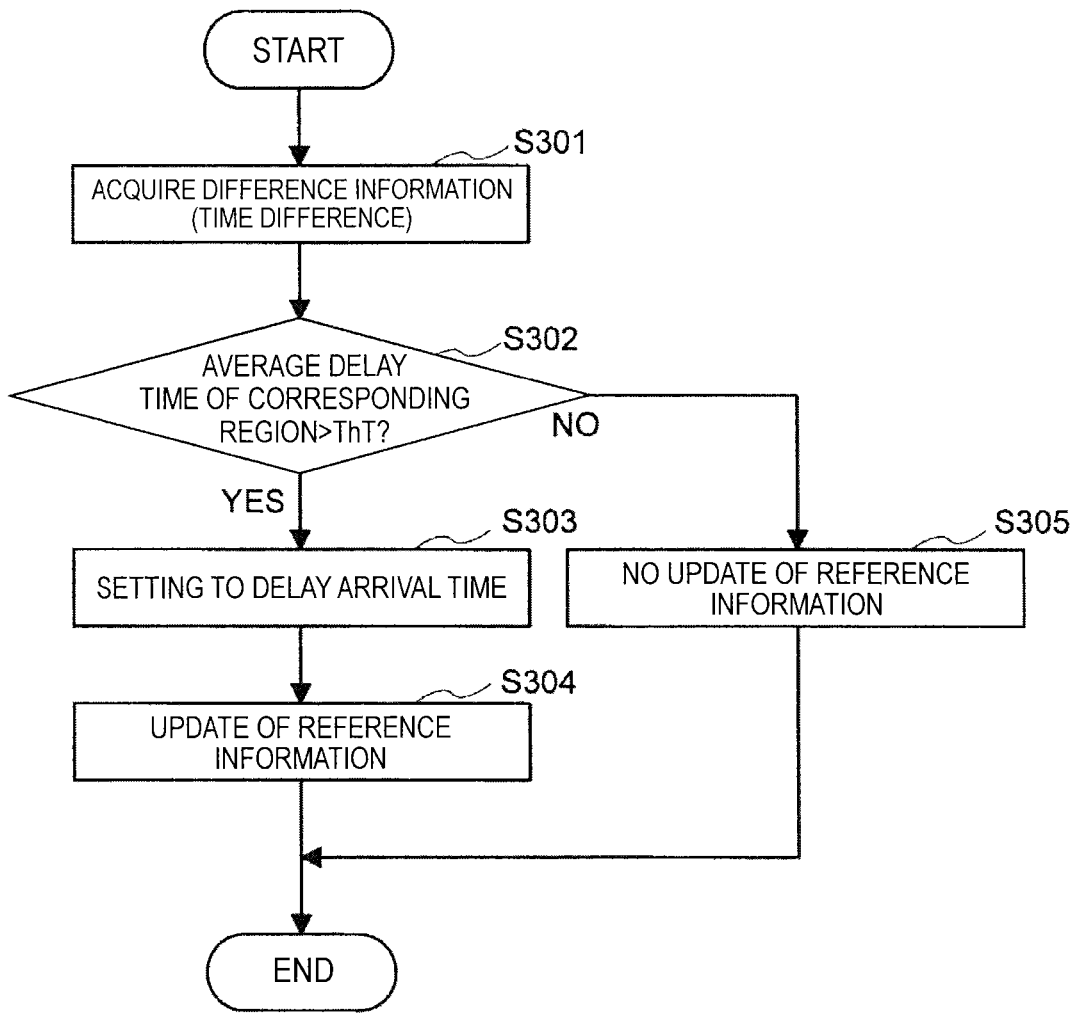
FIG. 36 is an explanatory diagram for describing a reference information updating method according to the fourth embodiment.
Figure 37:
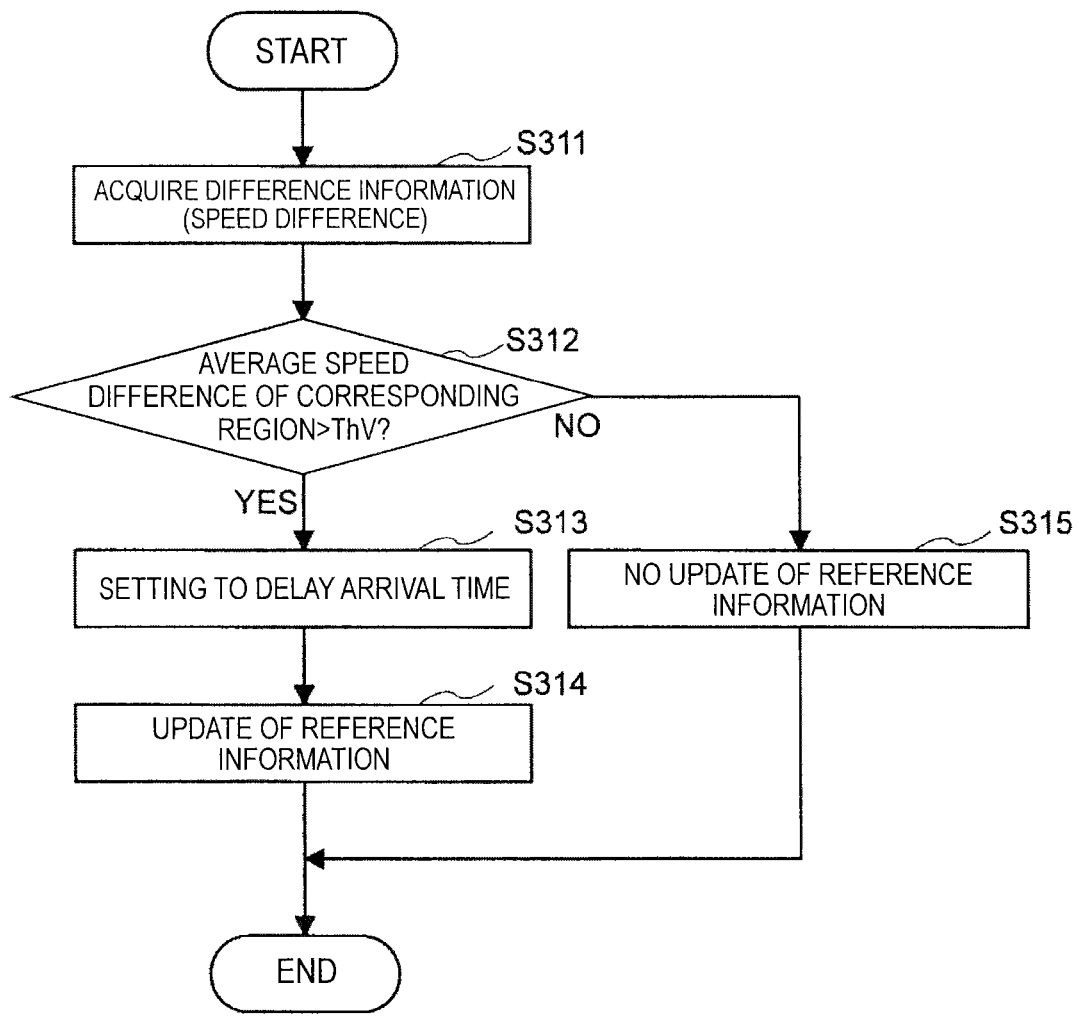
FIG. 37 is an explanatory diagram for describing a reference information updating method according to the fourth embodiment.

Next, the flow of a reference information update process will be described with reference to FIGS. 36 and 37. FIGS. 36 and 37 are explanatory diagrams for describing the flow of the reference information update process. The update process illustrated in FIG. 37 relates to a processing flow of updating the reference information in order to avoid a situation in which it is difficult to arrive by an arrival time if the speed is not increased. By employing this processing flow, it is possible to prevent the speed from being excessively increased (safety improvement).

(Basic Configuration #1: Configuration Using Delay Time)

First, FIG. 36 will be referred to. As illustrated FIG. 36, when the reference information update process starts on a certain target region, the information processing device 150 acquires the difference information from the terminal device 250 through the function of the difference information acquiring unit 151 (S301). Next, through the function of the reference information updating unit 152, the information processing device 150 calculates a delay time of the corresponding region using the difference information acquired in step S301 and determines whether or not the calculated average delay time is larger than a predetermined threshold value (ThT; ThT>0) (S302). When the average delay time is larger than the predetermined threshold value, the information processing device 150 causes the process to proceed to step S303. However, when the average delay time is smaller than the predetermined threshold value, the information processing device 150 causes the process to proceed to step S305.

When the process proceeds to step S303, the information processing device 150 sets the updated reference information to delay the arrival time through the function of the reference information updating unit 152 (S303), and then causes the process to proceed to step S304. The information processing device 150 that has caused the process to proceed to step S304 updates the reference information of the storage device (not shown) and the target terminal device 250 based on the reference information set in step S303 through the function of the reference information updating unit 152 (S304). However, when the process proceeds to step S305, the information processing device 150 ends a series of processes related to an update of the reference information without updating the reference information (S305).

The method of updating the reference information using the difference information including the difference between the actual traveling speed and the reference speed has been described above. The above description has been made in connection with the method of updating the reference information using the average speed difference, but a method of updating the reference information using an evaluation index other than the average speed difference may be considered. For example, a method of counting the number of vehicles in which the delay time is longer than a predetermined threshold value and determining that the reference information has to be updated when the number of counted vehicles is larger than a predetermined number may be considered.

(Basic Configuration #2: Configuration Using Speed Difference)

Next, FIG. 37 will be referred to. As illustrated in FIG. 37, when the reference information update process starts on a certain target region, the information processing device 150 acquires the difference information from the terminal device 250 through the function of the difference information acquiring unit 151 (S311). Next, through the function of the reference information updating unit 152, the information processing device 150 calculates the average speed difference of the corresponding region using the difference information acquired in step 311 and determines whether or not the calculated average speed difference is larger than a predetermined threshold value (Thy; ThV>0) (S312). When the average speed difference is larger than the predetermined threshold value, the information processing device 150 causes the process to proceed to step S313. However, when the average speed difference is lower than the predetermined threshold value, the information processing device 150 causes the process to proceed to step S315.

When the process proceeds to step S313, the information processing device 150 sets the updated reference information to delay the arrival time through the function of the reference information updating unit 152 (S313), and then causes the process to proceed to step S314. The information processing device 150 that has caused the process to proceed to step S314 updates the reference information of the storage device (not shown) and the target terminal device 250 based on the reference information set in step S313 through the function of the reference information updating unit 152 (S314). However, when the process proceeds to step S315, the information processing device 150 ends a series of processes related to an update of the reference information without updating the reference information (S315).

The method of updating the reference information using the difference information including the difference between the actual traveling speed and the reference speed has been described above. The above description has been made in connection with the method of determining whether or not the reference information has to be updated using the average speed difference, but a method of determining whether or not the reference information has to be updated using an evaluation index other than the average speed difference may be considered.

For example, a method of counting the number of vehicles in which the speed difference is lower than the predetermined threshold value and determining that an update is necessary when the number of counted vehicles is larger than a predetermined number may be considered.

(5-3-3: Configuration Considering Fuel Efficiency)

Figure 38:
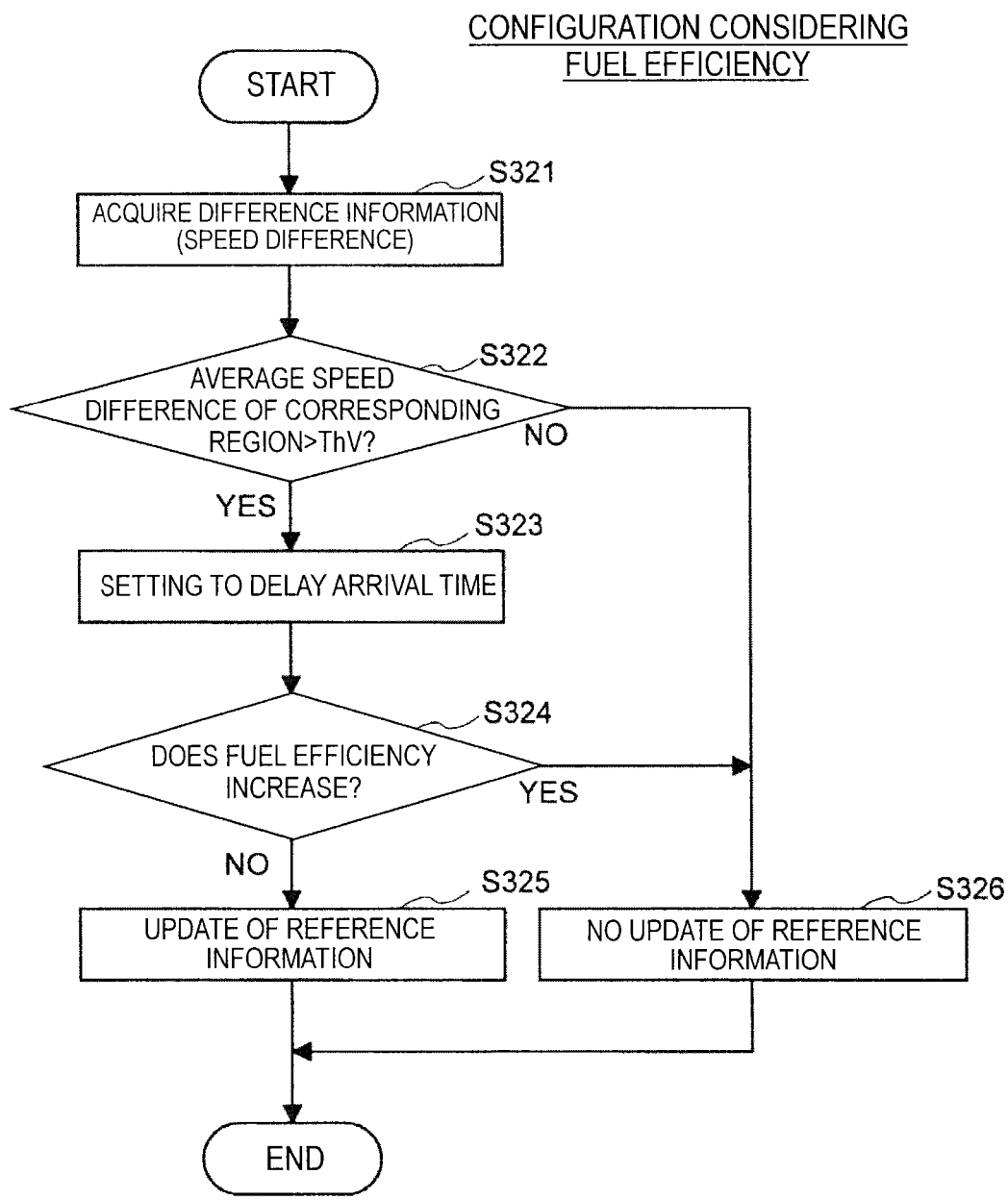
FIG. 38 is an explanatory diagram for describing a reference information updating method (a configuration considering fuel efficiency) according to the fourth embodiment.

The basic information can be appropriately updated by the above-described method, but it is necessary that various situations are actually considered. One of the considerations is fuel efficiency. In case of the public transportation system, even slight decreases in fuel efficiency slightly lead to significant increases in cost. In this regard, a reference information updating method considering the fuel efficiency is proposed. FIG. 38 is an explanatory diagram for describing a reference information updating method considering fuel efficiency based on the update process illustrated in FIG. 37.

As illustrated in FIG. 38, when the reference information update process starts on a certain target region, the information processing device 150 acquires the difference information from the terminal device 250 through the function of the difference information acquiring unit 151 (S321). Next, through the function of the reference information updating unit 152, the information processing device 150 calculates the average speed difference of the corresponding region using the difference information acquired in step S321 and determines whether or not the calculated average speed difference is larger than a predetermined threshold value (ThV; ThV>0) (S322). When the average speed difference is larger than the predetermined threshold value, the information processing device 150 causes the process to proceed to step S323. However, when the average speed difference is lower than the predetermined threshold value, the information processing device 150 causes the process to proceed to step S326.

When the process proceeds to step S323, the information processing device 150 sets the updated reference information to delay the arrival time through the function of the reference information updating unit 152 (S323), and then causes the process to proceed to step S324. The information processing device 150 that has caused the process to proceed to step S324 simulates the fuel efficiency when operation control is performed based on the updated reference information and determines whether or not the fuel efficiency is lowered through the function of the reference information updating unit 152 (S324). When the fuel efficiency is lowered, the information processing device 150 causes the process to proceed to step S326. However, when the fuel efficiency is not lowered, the information processing device 150 causes the process to proceed to step S325.

When the process proceeds to step S325, the information processing device 150 updates the reference information of the storage device (not shown) and the target terminal device 250 based on the reference information set in step S323 (S325). However, when the process proceeds to step S326, the information processing device 150 ends a series of processes related to an update of the reference information without updating the reference information (S326).

The method of updating the reference information using the difference information including the difference between the actual traveling speed and the reference speed has been described above. When the above-described method is applied, an update of the reference information causing the fuel efficiency to be lowered is avoided. The above description has been made in connection with the method of determining whether or not the update is necessary using the average speed difference, but a method of determining whether or not the update is necessary using an evaluation index other than the average speed difference may be considered. For example, a method of counting the number of vehicles in which the speed difference is lower than the predetermined threshold value and determining that an update is necessary when the number of counted vehicles is larger than a predetermined number may be considered.

(5-3-4: Configuration Considering Safety)

Figure 39:
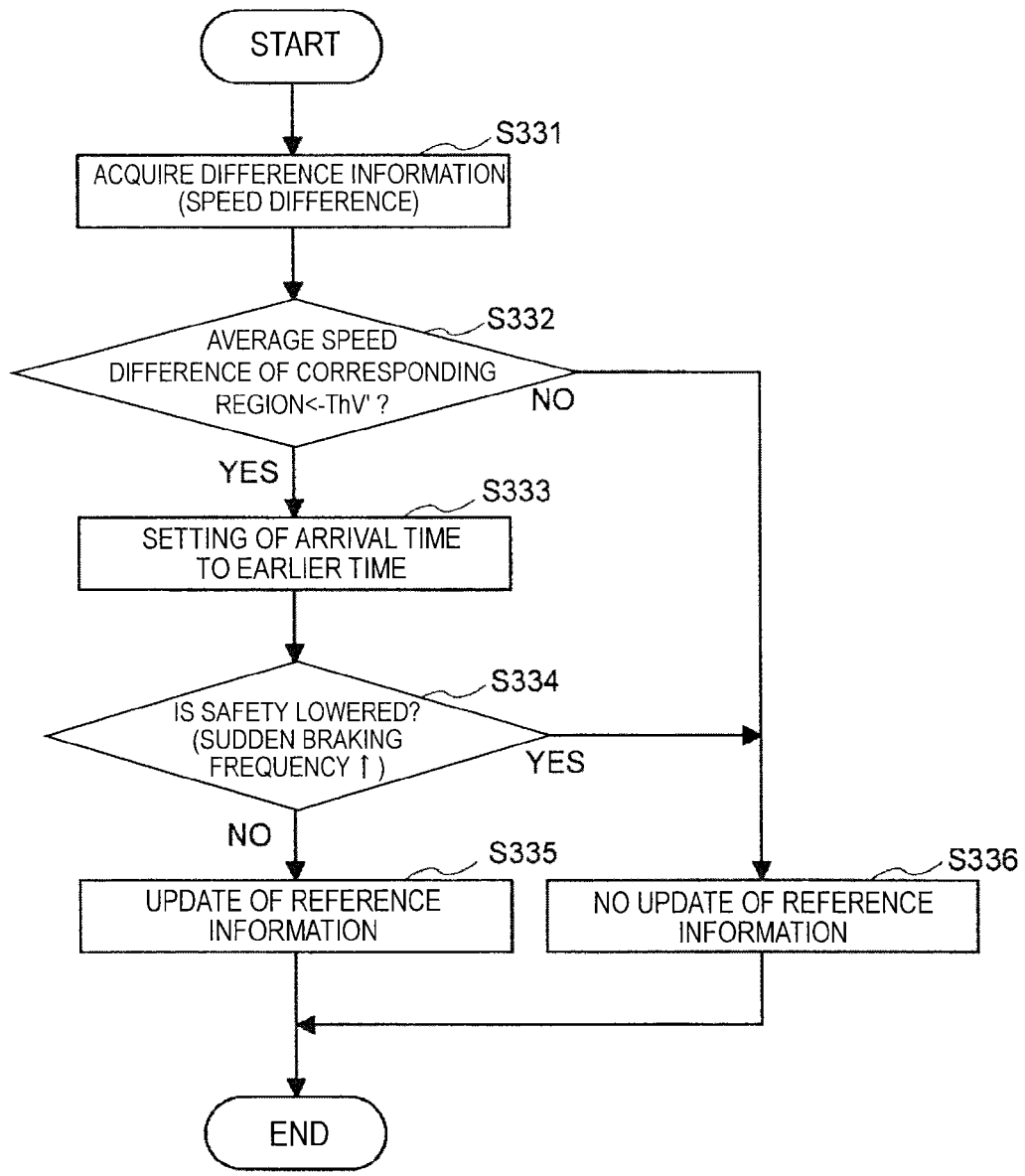
FIG. 39 is an explanatory diagram for describing a reference information updating method (a configuration considering safety) according to the fourth embodiment.

The basic information can be appropriately updated by the above-described method, but it is necessary that various situations are actually considered. One of the considerations is safety. In case of the public transportation system or the like, consideration of safety is a matter that is important in terms of corporate social responsibility (CSR). In this regard, a reference information updating method considering safety is proposed. FIG. 39 is an explanatory diagram for describing a reference information updating method considering safety.

First, when a vehicle is intentionally run at a slow speed in order to adjust the arrival time, it is likely that the arrival time is desired to be changed to an earlier time such that the vehicle can be run at a standard cruising speed. When the vehicle travels at a speed slower than necessary, the fuel efficiency is lowered, and the user's dissatisfaction increases, and thus this situation has to be improved. However, in this case, it is necessary to avoid a situation in which the speed increases and safety is compromised. In this case, as an update method of harmonizing both matters and safely improving the user's convenience, an update method illustrated in FIG. 39 is proposed.

As illustrated in FIG. 39, when the reference information update process starts on a certain target region, the information processing device 150 acquires the difference information from the terminal device 250 through the function of the difference information acquiring unit 151 (S331). Next, through the function of the reference information updating unit 152, the information processing device 150 calculates the average speed difference of the corresponding region using the difference information acquired in step S331 and determines whether or not the calculated average speed difference is lower than a predetermined threshold value (−ThV'; ThV'>0)(S332). When the average speed difference is lower than the predetermined threshold value, the information processing device 150 causes the process to proceed to step S333. However, when the average speed difference is higher than the predetermined threshold value, the information processing device 150 causes the process to proceed to step S336.

When the process proceeds to step S333, the information processing device 150 sets the updated reference information to change the arrival time to an earlier time through the function of the reference information updating unit 152

(S333), and then causes the process to proceed to step S334. The information processing device 150 that has caused the process to proceed to step S334 evaluates safety (for example, the frequency of sudden braking) when operation control is performed based on the updated reference information and determines whether or not safety is lowered through the function of the reference information updating unit 152 (S334). When safety is lowered, the information processing device 150 causes the process to proceed to step S336. However, when safety is not lowered, the information processing device 150 causes the process to proceed to step S335.

When the process proceeds to step S335, the information processing device 150 updates the reference information of the storage device (not shown) and the target terminal device 250 based on the reference information set in step S333 (S335). However, when the process proceeds to step S336, the information processing device 150 ends a series of processes related to an update of the reference information without updating the reference information (S336).

The method of updating the reference information using the difference information including the difference between the actual traveling speed and the reference speed has been described above. When the above-described method is applied, an update of the reference information causing the safety to be lowered is avoided. The above description has been made in connection with the method of determining whether or not the update is necessary using the average speed difference, but a method of determining whether or not the update is necessary using an evaluation index other than the average speed difference may be considered. For example, a method of counting the number of vehicles in which the speed difference is higher than the predetermined threshold value and determining that an update is necessary when the number of counted vehicles is larger than a predetermined number may be considered.

Next, a modified example of the above-described configuration will be described. The modified example relates to a method of updating the reference information to be suitable for the current operation status. First, an update method of setting an arrival time to be delayed to be suitable for the speed when the vehicle speed is slow will be described with reference to an example of FIG. 40. Further, an update method considering the fuel efficiency will be described with reference to FIG. 41. Furthermore, an update method considering safety will be described with reference to FIG. 42.

(5-3-5: (Modified Example) Basic Configuration (FIG. 40))

Figure 40:
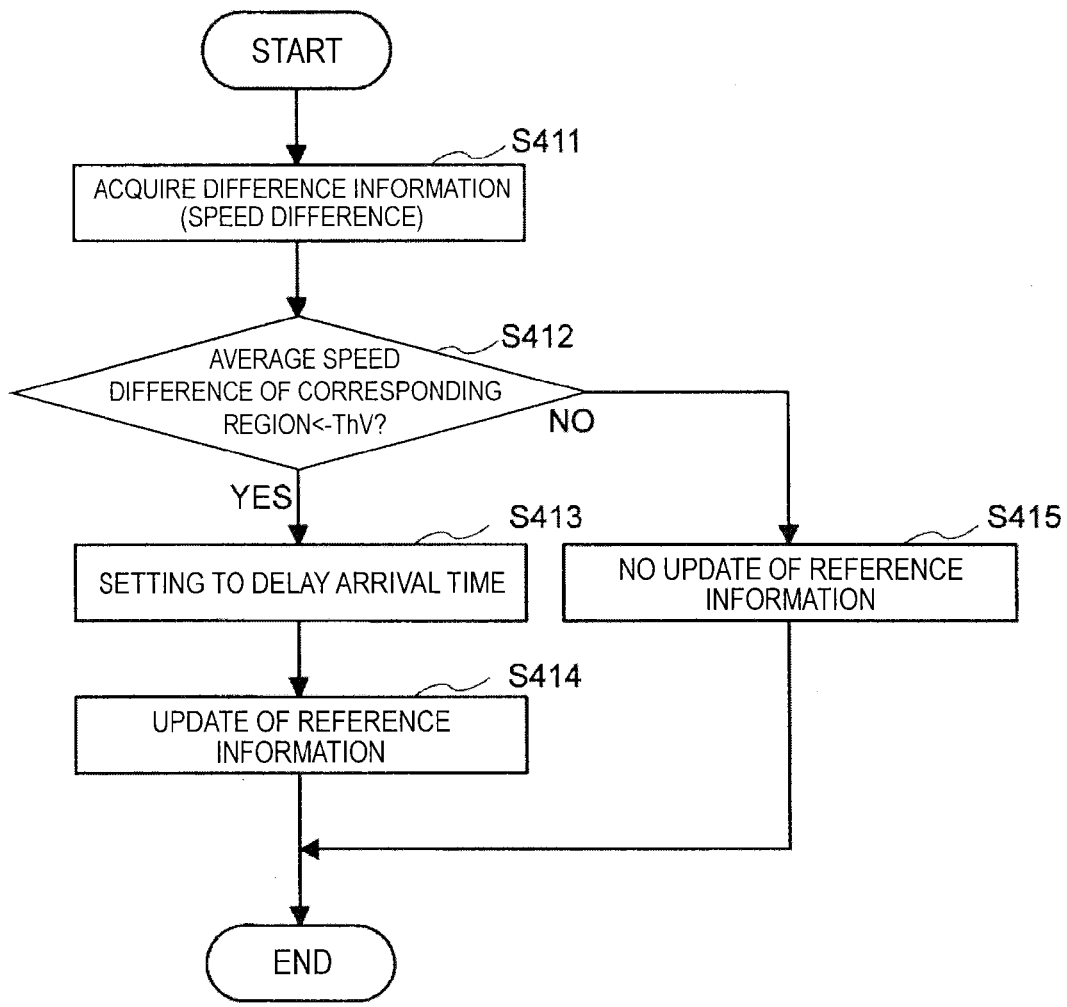
FIG. 40 is an explanatory diagram for describing a reference information updating method according to a modified example of the fourth embodiment.

First, FIG. 40 will be referred to. As illustrated in FIG. 40, when the reference information update process starts on a certain target region, the information processing device 150 acquires the difference information from the terminal device 250 through the function of the difference information acquiring unit 151 (S411). Next, through the function of the reference information updating unit 152, the information processing device 150 calculates the average speed difference of the corresponding region using the difference information acquired in step S411 and determines whether or not the calculated average speed difference is lower than a predetermined threshold value (−ThV; ThV>0) (S412). When the average speed difference is lower than the predetermined threshold value, the information processing device 150 causes the process to proceed to step S413. However, when the average speed difference is higher than the predetermined threshold value, the information processing device 150 causes the process to proceed to step S415.

When the process proceeds to step S413, the information processing device 150 sets the updated reference information to delay the arrival time through the function of the reference information updating unit 152 (S413), and then causes the process to proceed to step S414. The information processing device 150 that has caused the process to proceed to step S414 updates the reference information of the storage device (not shown) and the target terminal device 250 based on the reference information set in step S413 through the function of the reference information updating unit 152 (S414). However, when the process proceeds to step S415, the information processing device 150 ends a series of processes related to an update of the reference information without updating the reference information (S415).

The method of updating the reference information using the difference information including the difference between the actual traveling speed and the reference speed has been described above. The above description has been made in connection with the method of determining whether or not the update is necessary using the average speed difference, but a method of determining whether or not the update is necessary using an evaluation index other than the average speed difference may be considered. For example, a method of counting the number of vehicles in which the speed difference is lower than the predetermined threshold value and determining that an update is necessary when the number of counted vehicles is larger than a predetermined number may be considered.

(5-3-6: (Modified Example) Configuration Considering Fuel Efficiency (FIG. 41))

Figure 41:
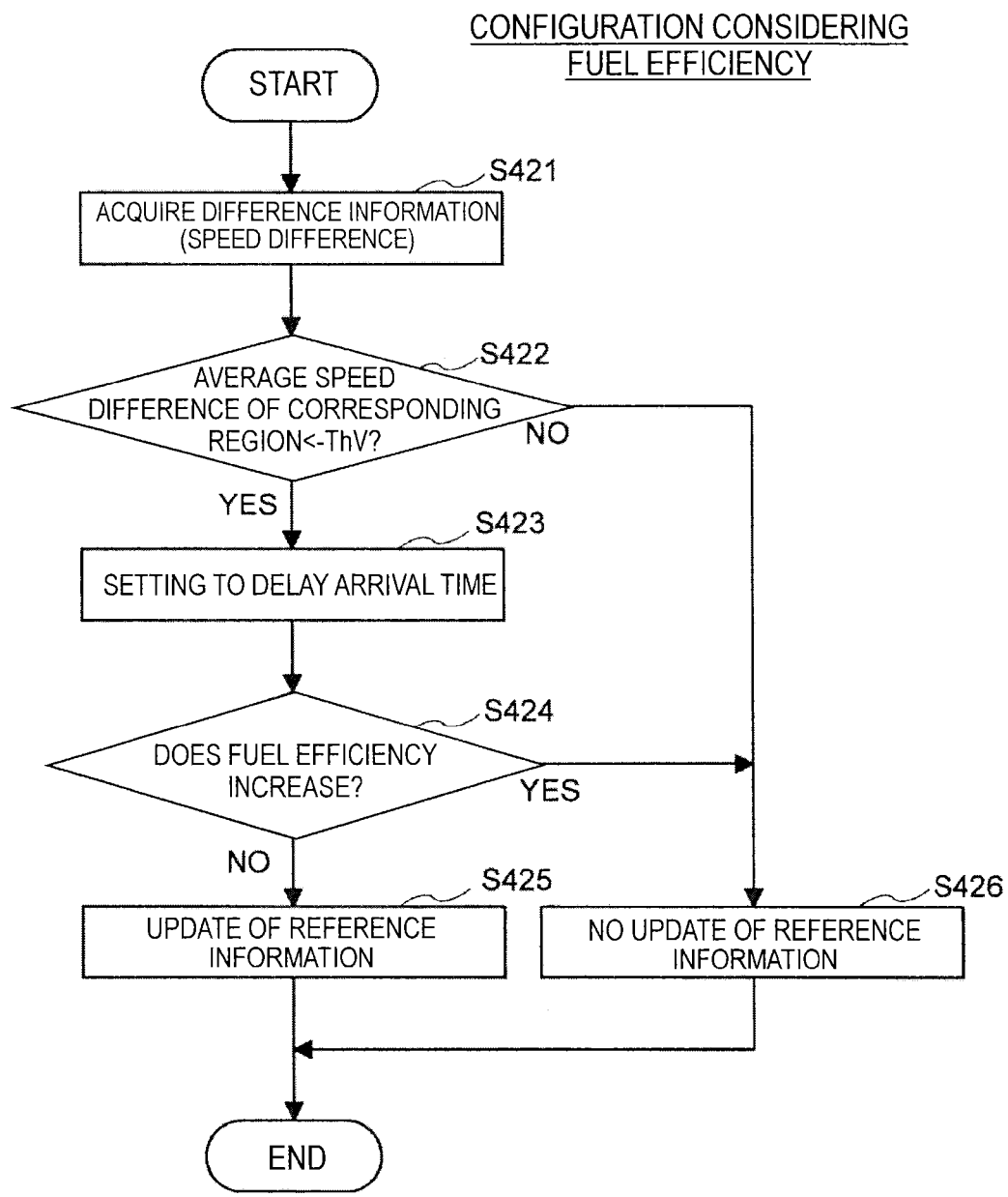
FIG. 41 is an explanatory diagram for describing a reference information updating method (a configuration considering fuel efficiency) according to a modified example of the fourth embodiment.

The basic information can be appropriately updated by the above-described method, but it is necessary that various situations are actually considered. One of the considerations is fuel efficiency. In case of the public transportation system, even a slight decrease in fuel efficiency leads to a significant increase in cost. In this regard, a reference information updating method considering the fuel efficiency is proposed. FIG. 41 is an explanatory diagram for describing a reference information updating method considering fuel efficiency based on the update process illustrated in FIG. 40.

As illustrated in FIG. 41, when the reference information update process starts on a certain target region, the information processing device 150 acquires the difference information from the terminal device 250 through the function of the difference information acquiring unit 151 (S421). Next, through the function of the reference information updating unit 152, the information processing device 150 calculates the average speed difference of the corresponding region using the difference information acquired in step S421 and determines whether or not the calculated average speed difference is lower than a predetermined threshold value (−ThV; ThV>0) (S422). When the average speed difference is lower than the predetermined threshold value, the information processing device 150 causes the process to proceed to step S423. However, when the average speed difference is higher than the predetermined threshold value, the information processing device 150 causes the process to proceed to step S426.

When the process proceeds to step S423, the information processing device 150 sets the updated reference information to delay the arrival time through the function of the reference information updating unit 152 (S423), and then causes the process to proceed to step S424. The information processing device 150 that has caused the process to proceed to step S424 simulates the fuel efficiency when operation control is performed based on the updated reference information and determines whether or not the fuel efficiency is lowered through the function of the reference information updating unit 152 (S424). When the fuel efficiency is lowered, the information processing device 150 causes the process to proceed to step S426. However, when the fuel efficiency is not lowered, the information processing device 150 causes the process to proceed to step S425.

When the process proceeds to step S425, the information processing device 150 updates the reference information of the storage device (not shown) and the target terminal device 250 based on the reference information set in step S423 (S425). However, when the process proceeds to step S426, the information processing device 150 ends a series of processes related to an update of the reference information without updating the reference information (S426).

The method of updating the reference information using the difference information including the difference between the actual traveling speed and the reference speed has been described above. When the above-described method is applied, an update of the reference information causing the fuel efficiency to be lowered is avoided. The above description has been made in connection with the method of determining whether or not the update is necessary using the average speed difference, but a method of determining whether or not the update is necessary using an evaluation index other than the average speed difference may be considered. For example, a method of counting the number of vehicles in which the speed difference is lower than the predetermined threshold value and determining that an update is necessary when the number of counted vehicles is larger than a predetermined number may be considered.

(5-3-7: (Modified Example) Configuration Considering Safety (FIG. 42))

Figure 42:
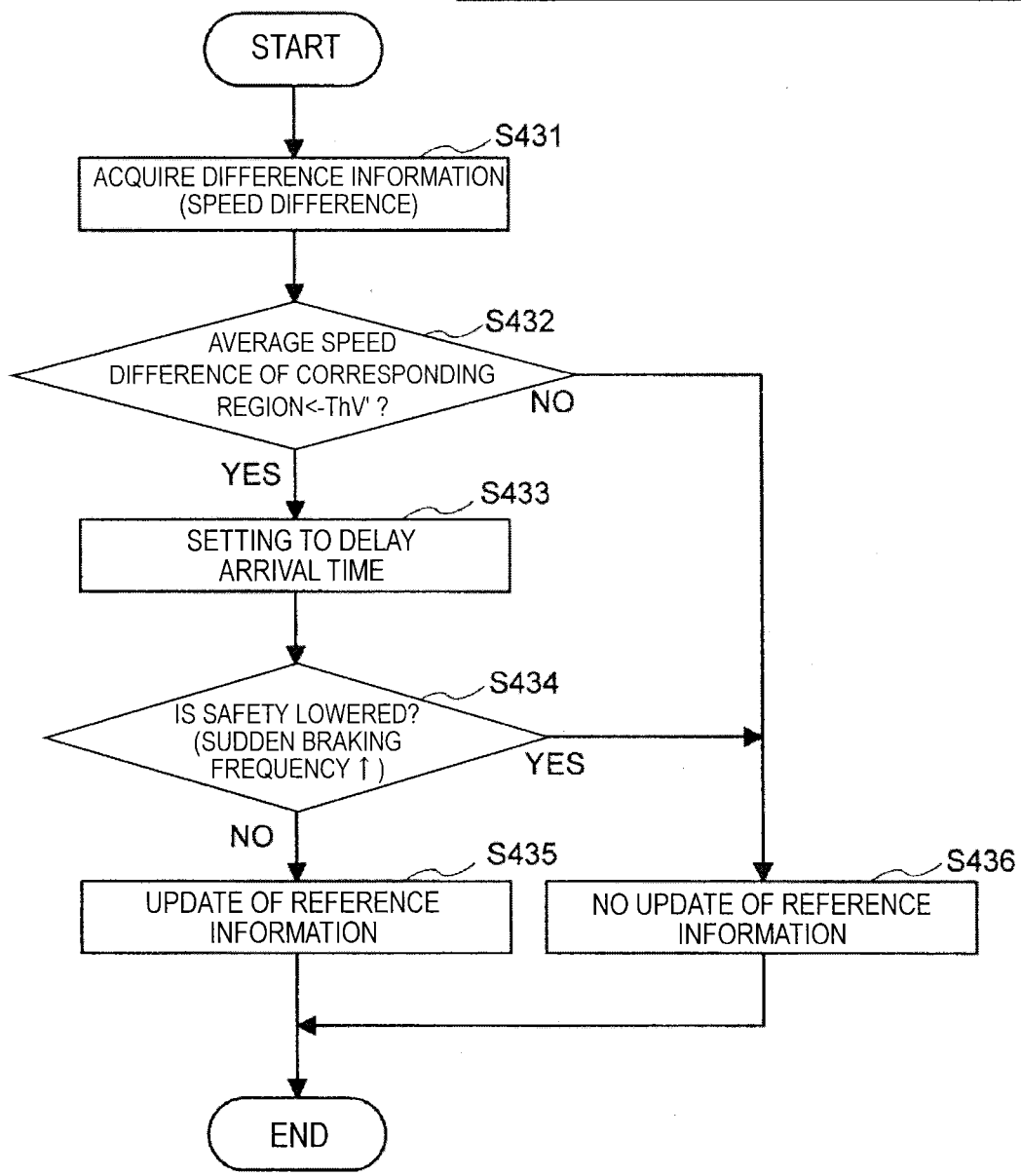
FIG. 42 is an explanatory diagram for describing a reference information updating method (a configuration considering safety) according to a modified example of the fourth embodiment.

The basic information can be appropriately updated by the above-described method, but it is necessary that various situations are actually considered. One of the considerations is safety. In case of the public transportation system or the like, consideration of safety is a matter that is important in terms of corporate social responsibility (CSR). In this regard, a reference information updating method considering safety is proposed. FIG. 42 is an explanatory diagram for describing a reference information updating method considering safety.

As illustrated in FIG. 42, when the reference information update process starts on a certain target region, the information processing device 150 acquires the difference information from the terminal device 250 through the function of the difference information acquiring unit 151 (S431). Next, through the function of the reference information updating unit 152, the information processing device 150 calculates the average speed difference of the corresponding region using the difference information acquired in step S431, and determines whether or not the calculated average speed difference is lower than a predetermined threshold value (−ThV; ThV'>0) (S432). When the average speed difference is lower than the predetermined threshold value, the information processing device 150 causes the process to proceed to step S433. However, when the average speed difference is higher than the predetermined threshold value, the information processing device 150 causes the process to proceed to step S436.

When the process proceeds to step S433, the information processing device 150 sets the updated reference information to delay the arrival time through the function of the reference information updating unit 152 (S433), and then causes the process to proceed to step S434. The information processing device 150 that has caused the process to proceed to step S434 evaluates safety (for example, the frequency of sharp braking) when operation control is performed based on the updated reference information and determines whether or not safety is lowered through the function of the reference information updating unit 152 (S434). When safety is lowered, the information processing device 150 causes the process to proceed to step S436. However, when safety is not lowered, the information processing device 150 causes the process to proceed to step S435.

When the process proceeds to step S435, the information processing device 150 updates the reference information of the storage device (not shown) and the target terminal device 250 based on the reference information set in step S433 (S435). However, when the process proceeds to step S436, the information processing device 150 ends a series of processes related to an update of the reference information without updating the reference information (S436).

The method of updating the reference information using the difference information including the difference between the actual traveling speed and the reference speed has been described above. When the above-described method is applied, an update of the reference information causing the safety to be lowered is avoided. The above description has been made in connection with the method of determining whether or not the update is necessary using the average speed difference, but a method of determining whether or not the update is necessary using an evaluation index other than the average speed difference may be considered. For example, a method of counting the number of vehicles in which the speed difference is higher than the predetermined threshold value and determining that an update is necessary when the number of counted vehicles is larger than a predetermined number may be considered.

The fourth embodiment according to the present technology has been described above.

6: Example Hardware Configuration

Figure 43:
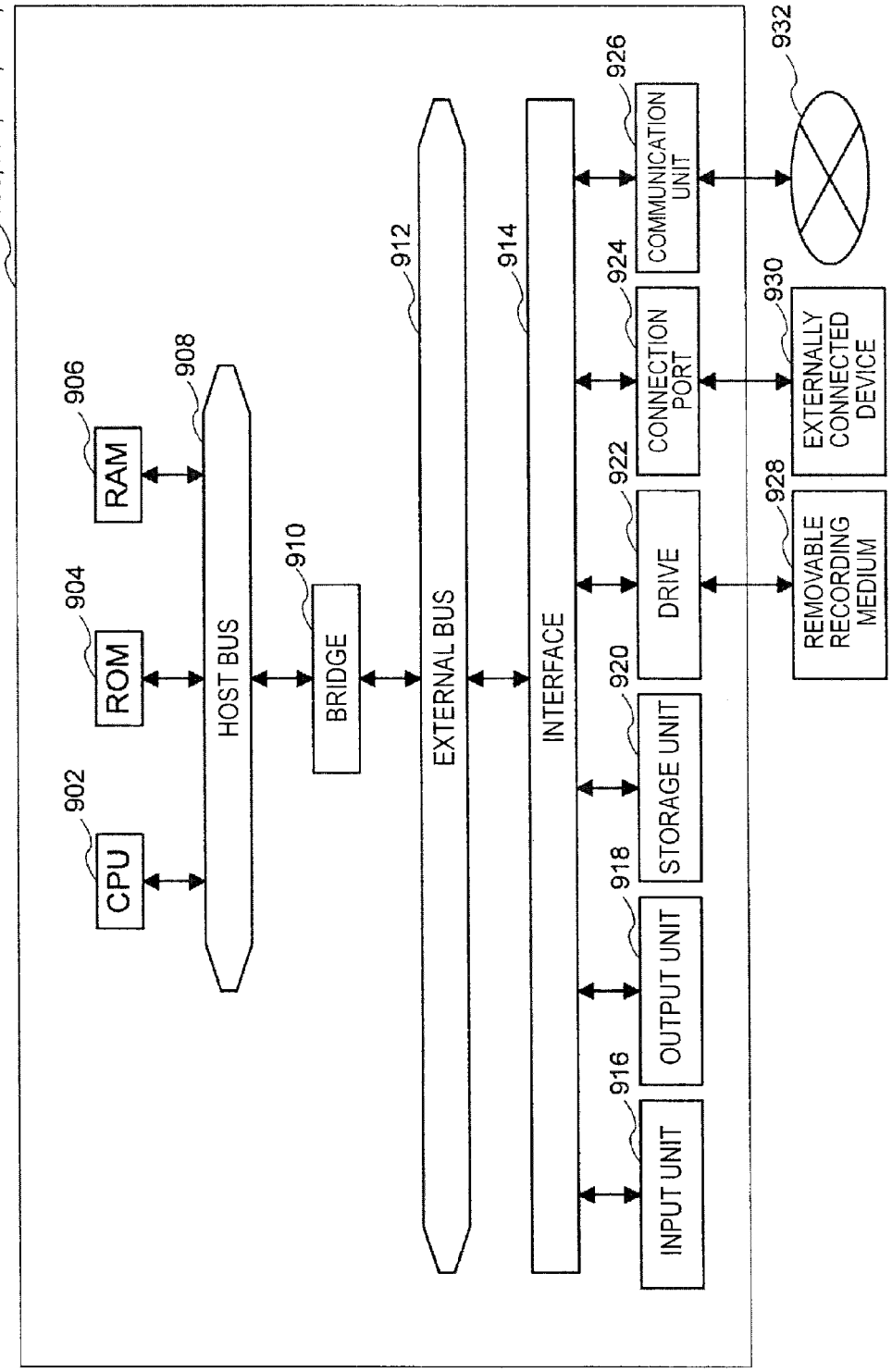
FIG. 43 is an explanatory diagram for describing a hardware configuration example for implementing functions included in devices and systems according to the first to fourth embodiments.

The function of each structural element of the information processing devices 100, 130 and 150, and the terminal devices 200, 230 and 250 described above can be realized by using, for example, the hardware configuration of an information processing device shown in FIG. 43. That is, the function of each structural element can be realized by controlling the hardware shown in FIG. 43 using a computer program. Additionally, the mode of this hardware is arbitrary, and may be a personal computer, a mobile information terminal such as a mobile phone, a PHS or a PDA, a game machine, or various types of information appliances. Moreover, the PHS is an abbreviation for Personal Handy-phone System. Also, the PDA is an abbreviation for Personal Digital Assistant.

As shown in FIG. 43, this hardware mainly includes a CPU 902, a ROM 904, a RAM 906, a host bus 908, and a bridge 910. Furthermore, this hardware includes an external bus 912, an interface 914, an input unit 916, an output unit 918, a storage unit 920, a drive 922, a connection port 924, and a communication unit 926. Moreover, the CPU is an abbreviation for Central Processing Unit. Also, the ROM is an abbreviation for Read Only Memory. Furthermore, the RAM is an abbreviation for Random Access Memory.

The CPU 902 functions as an arithmetic processing unit or a control unit, for example, and controls entire operation or a part of operation of each structural element based on various programs recorded on the ROM 904, the RAM 906, the storage unit 920, or a removal recording medium 928. The ROM 904 is means for storing, for example, a program to be loaded on the CPU 902 or data or the like used in an arithmetic operation. The RAM 906 temporarily or perpetually stores, for example, a program to be loaded on the CPU 902 or various parameters or the like arbitrarily changed in the execution of the program.

These structural elements are connected to each other by, for example, the host bus 908 capable of performing high-speed data transmission. For its part, the host bus 908 is connected through the bridge 910 to the external bus 912 whose data transmission speed is relatively low, for example. Furthermore, the input unit 916 is, for example, a mouse, a keyboard, a touch panel, a button, a switch, or a lever. Also, the input unit 916 may be a remote control that can transmit a control signal by using an infrared ray or other radio waves.

The output unit 918 is, for example, a display device such as a CRT, an LCD, a PDP or an ELD, an audio output device such as a speaker or headphones, a printer, a mobile phone, or a facsimile, that can visually or auditorily notify a user of acquired information. Moreover, the CRT is an abbreviation for Cathode Ray Tube. The LCD is an abbreviation for Liquid Crystal Display. The PDP is an abbreviation for Plasma Display Panel. Also, the ELD is an abbreviation for Electro-Luminescence Display.

The storage unit 920 is a device for storing various data. The storage unit 920 is, for example, a magnetic storage device such as a hard disk drive (HDD), a semiconductor storage device, an optical storage device, or a magneto-optical storage device. The HDD is an abbreviation for Hard Disk Drive.

The drive 922 is a device that reads information recorded on the removal recording medium 928 such as a magnetic disk, an optical disk, a magneto-optical disk, or a semiconductor memory, or writes information in the removal recording medium 928. The removal recording medium 928 is, for example, a DVD medium, a Blu-ray medium, an HD-DVD medium, various types of semiconductor storage media, or the like. Of course, the removal recording medium 928 may be, for example, an electronic device or an IC card on which a non-contact IC chip is mounted. The IC is an abbreviation for Integrated Circuit.

The connection port 924 is a port such as an USB port, an IEEE1394 port, a SCSI, an RS-232C port, or a port for connecting an externally connected device 930 such as an optical audio terminal. The externally connected device 930 is, for example, a printer, a mobile music player, a digital camera, a digital video camera, or an IC recorder. Moreover, the USB is an abbreviation for Universal Serial Bus. Also, the SCSI is an abbreviation for Small Computer System Interface.

The communication unit 926 is a communication device to be connected to a network 932, and is, for example, a communication card for a wired or wireless LAN, Bluetooth (registered trademark), or WUSB, an optical communication router, an ADSL router, or various communication modems. The network 932 connected to the communication unit 926 is configured from a wire-connected or wirelessly connected network, and is the Internet, a home-use LAN, infrared communication, visible light communication, broadcasting, or satellite communication, for example. Moreover, the LAN is an abbreviation for Local Area Network. Also, the WUSB is an abbreviation for Wireless USB. Furthermore, the ADSL is an abbreviation for Asymmetric Digital Subscriber Line.

7: Summary

Lastly, the technical contents according to the embodiment of the present disclosure will be briefly described. The technical contents stated here can be applied to various information processing devices, such as a personal computer, a mobile phone, a portable game machine, a portable information terminal, an information appliance, a car navigation system, and the like.

Additionally, the information processing device may also be configured as below.

(Idea Related to Method Used for Congestion Detection)

(A1)

An information processing device, including:

a difference information acquiring unit that acquires, for one or a plurality of first vehicles that travel according to a content of reference information including a predetermined traveling speed or arrival time, difference information representing a difference between an actual traveling speed or arrival time in each of the first vehicles and the content of the reference information; and a road status analyzing unit that analyzes a road status in a predetermined region using difference information related to the first vehicles present in the predetermined region.

(A2)

The information processing device according to (A1), wherein the road status analyzing unit analyzes the road status and detects a traffic congestion state of a road.

(A3)

The information processing device according to (A2), wherein, when a proportion of first vehicles whose actual traveling speed is much slower than a predetermined traveling speed included in the reference information to the first vehicles present in the predetermined region is larger than a predetermined threshold value, the road status analyzing unit determines that a road of the predetermined region is in a traffic congestion state.

(A4) The information processing device according to (A2), wherein, when a proportion of first vehicles whose actual arrival time is much later than a predetermined arrival time included in the reference information to the first vehicles present in the predetermined region is larger than a predetermined threshold value, the road status analyzing unit determines that a road of the predetermined region is in a traffic congestion state.

(A5)

The information processing device according to (A4), wherein, when a setting spot to which the predetermined arrival time is set is not present in the predetermined region, the road status analyzing unit detects a traffic congestion state of the road in the predetermined region using the actual arrival time at a closest setting spot before a vehicle enters the predetermined region or after the vehicle leaves the predetermined region.

(A6)

The information processing device according to according to any one of (A3) to (A5), wherein the reference information is set to distinguish at least between an automobile expressway and another road, and wherein, when the automobile expressway and the other road are present within the predetermined region, the road status analyzing unit detects a traffic congestion state in the automobile expressway and a traffic congestion state in the other road.

(A7)

The information processing device according to any one of (A4) to (A6), further including an information providing unit that provides information of a road in a traffic congestion state to the first vehicles, a second vehicle different from the first vehicles, or a device that manages the first vehicles, wherein the information providing unit provides information related to a predetermined region designated from an information provision destination or information related to the predetermined region and a neighboring region.

(A8)

10. The information processing device according to (A7),
wherein, when a current position and a destination are designated as the information related to the predetermined region, the information providing unit provides a route to bypass a road determined to be in a traffic congestion state as the information related to the predetermined region.

(A9)

The information processing device according to any one of (A3) to (A6),
wherein, when the road of the predetermined region is determined to be in a traffic congestion state, the road status analyzing unit predicts a cause of traffic congestion using the difference information.

(A10)

The information processing device according to any one of (A1) to (A9),
wherein the first vehicles are vehicles belonging to a same type of business.

(A11)

The information processing device according to (A10),
wherein the first vehicles are vehicles whose operation is controlled by the reference information.

(A12)

The information processing device according to (A11),
wherein the first vehicles are vehicles of a public transportation system.

(A13)

The information processing device according to (A3) or (A4),
wherein the road status analyzing unit extracts a road that is in a traffic congestion state for a long time or a predetermined region including the road.

(A 14)

A terminal device, including:
a display unit that displays an analysis result of a road status in a predetermined region, which is analyzed using difference information related to first vehicles present within the predetermined region among pieces of difference information representing a difference between an actual traveling speed or arrival time in each first vehicle and a content of reference information, the pieces of difference information being acquired for one or a plurality of the first vehicles traveling according to the content of the reference information including a predetermined traveling speed or arrival time.

(A15)

An information processing method, including:
acquiring, for one or a plurality of first vehicles that travel according to a content of reference information including a predetermined traveling speed or arrival time, difference information representing a difference between an actual traveling speed or arrival time in each of the first vehicles and the content of the reference information; and
analyzing a road status in a predetermined region using difference information related to the first vehicles present in the predetermined region.

(A16)

A status display method, including:
displaying an analysis result of a road status in a predetermined region, which is analyzed using difference information related to first vehicles present within the predetermined region among pieces of difference information representing a difference between an actual traveling speed or arrival time in each first vehicle and a content of reference information, the pieces of difference information being acquired for one or a plurality of the first vehicles traveling according to the content of the reference information including a predetermined traveling speed or arrival time.

(A17)

The information processing device according to (A2),
wherein, when a number of first vehicles whose actual traveling speed is much slower than a predetermined traveling speed included in the reference information among the first vehicles present in the predetermined region is larger than a predetermined threshold value, the road status analyzing unit determines that a road of the predetermined region is in a traffic congestion state.

(A18)

The information processing device according to (A2),
wherein, when a number of first vehicles whose actual arrival time is much later than a predetermined arrival time included in the reference information among the first vehicles present in the predetermined region is larger than a predetermined threshold value, the road status analyzing unit determines that a road of the predetermined region is in a traffic congestion state.

(Idea Related to Method Used for Hazard Prediction)

(B1)

An information processing device, including:
a difference information acquiring unit that acquires difference information representing a difference between an actual traveling speed in each of first vehicles and content of reference information including a predetermined traveling speed on one or more of the first vehicles that travel according to the content of the reference information; and
a degree of hazard analyzing unit that analyzes a degree of hazard in a predetermined region using the difference information related to the first vehicle that travels in each predetermined region on a plurality of predetermined regions.

(B2)

The information processing device according to (B1),
wherein the degree of hazard analyzing unit determines that a road in a corresponding predetermined region is hazardous when a proportion of the first vehicles in which the actual traveling speed is much faster than a predetermined traveling speed included in the reference information to the first vehicles presented in the predetermined region is larger than a predetermined threshold value.

(B3)

The information processing device according to (B1),
wherein the degree of hazard analyzing unit determines that a road in a corresponding predetermined region is hazardous when a proportion of the first vehicles in which the actual traveling speed is much slower than a predetermined traveling speed included in the reference information to the first vehicles presented in the predetermined region is larger than a predetermined threshold value.

(B4)

The information processing device according to (B3),
wherein the first vehicles are vehicles for which an arrival time at a predetermined spot is fixed, and operation control is performed based on the arrival time.

(B5)

The information processing device according to any one of (B1) to (B4),
wherein the predetermined traveling speed is a legal speed.

(B6)

The information processing device according to any one of (B2) to (B4), further including
an information providing unit that provides information of a predetermined region determined to have a hazard or information related to the predetermined region and a neighboring region to the first vehicles, a second vehicle different from the first vehicles, or a device that manages the first vehicles.

(B7)

The information processing device according to (B3) or (B4), further including a traffic congestion information acquiring unit that acquires traffic congestion information of the predetermined region, wherein the degree of hazard analyzing unit determines that the predetermined region is not hazardous even when a proportion of the first vehicles in which the actual traveling speed is much slower than a predetermined traveling speed included in the reference information to the first vehicles presented in the predetermined region is larger than a predetermined threshold value when it is determined that the predetermined region is in a traffic congestion state based on traffic congestion information of the predetermined region.

(B8)

The information processing device according to (B3) or (B4), further including a weather information acquiring unit that acquires weather information, wherein the degree of hazard analyzing unit determines that the predetermined region is not hazardous even when a proportion of the first vehicles in which the actual traveling speed is much slower than a predetermined traveling speed included in the reference information to the first vehicles presented in the predetermined region is larger than a predetermined threshold value when it is determined that the predetermined region is in a bad weather state based on weather information of the predetermined region.

(B9)

A terminal device, including:

an analysis result acquiring unit that acquires a result of analyzing a degree of hazard in each of a plurality of predetermined regions using difference information related to a first vehicle traveling in each predetermined region based on difference information representing a difference between an actual traveling speed in each first vehicle and content of reference information including a predetermined traveling speed, which is acquired on one or more of the first vehicles that travel according to the content of the reference information; and a display unit that displays information related to a region with a high degree of hazard based on the analysis result.

(B10)

An information processing method, including:

acquiring difference information representing a difference between an actual traveling speed in each of first vehicles and content of reference information including a predetermined traveling speed on one or more of the first vehicles that travel according to the content of the reference information; and analyzing a degree of hazard in a predetermined region using the difference information related to the first vehicle that travels in each predetermined region on a plurality of predetermined regions.

(B11)

A hazard information display method, including:

acquiring a result of analyzing a degree of hazard in each of a plurality of predetermined regions using difference information related to a first vehicle traveling in each predetermined region based on difference information representing a difference between an actual traveling speed in each first vehicle and content of reference information including a predetermined traveling speed, which is acquired on one or more of the first vehicles that travel according to the content of the reference information; and displaying information related to a region with a high degree of hazard based on the analysis result.

(Idea Related to Method Used for Improvement of Operation Control)

(C1)

An information processing device, including:

a difference information acquiring unit that acquires difference information representing a difference between an actual traveling speed or arrival time in each of first vehicles and content of reference information including a predetermined traveling speed or arrival time on one or more of the first vehicles that travel according to the content of the reference information; and a reference information correcting unit that classifies the difference information for each predetermined environmental condition having influence on a road status, corrects the predetermined traveling speed or arrival time to reduce each piece of classified difference information, and generates new reference information for each environmental condition.

(C2)

The information processing device according to (C1), wherein the environmental condition is one selected from weather, a season, a date, a day of the week, a weekday, a public holiday, and a time zone or a combination thereof.

(C3)

The information processing device according to (C1) or (C2), further including a fuel efficiency information acquiring unit that acquires information related to fuel efficiency of the first vehicles, wherein the reference information correcting unit corrects the predetermined traveling speed or arrival time within a range in which the fuel efficiency of the first vehicles is not lowered when the new reference information is generated for each environmental condition.

(C4)

The information processing device according to (C1) or (C2), further including a sudden braking information acquiring unit that acquires information related to a frequency with which the first vehicles apply sudden braking, wherein the reference information correcting unit corrects the predetermined traveling speed or arrival time when the frequency with which the first vehicles traveling according to content of the new reference information generated for each environmental condition apply sudden braking increases.

(C5)

The information processing device according to (C3), wherein the reference information correcting unit reduces the predetermined traveling speed or delays the arrival time when the frequency with which the first vehicles traveling according to content of the new reference information generated for each environmental condition apply sudden braking increases.

(C6)

The information processing device according to (C3), wherein the reference information correcting unit corrects the predetermined traveling speed or arrival time such that the new reference information is recovered to original reference information when the frequency with which the first vehicles traveling according to content of the new reference information generated for each environmental condition apply sudden braking increases.

(C7)

A reference adjusting method, including:

acquiring difference information representing a difference between an actual traveling speed or arrival time in each of first vehicles and content of reference information including a predetermined traveling speed or arrival time on one or more of the first vehicles that travel according to the content of the reference information; and classifying the difference information for each predetermined environmental condition having influence on a road status, correcting the predetermined traveling speed or arrival time to reduce each piece of classified difference information, and generating new reference information for each environmental condition.

As described above, the exemplary embodiments of the present technology have been described hereinbefore in detail with reference to the accompanying drawings, but the present technology is not limited to the embodiments. A person having ordinary skill in the art would understand that various modifications or variations can be made within the scope of the technical spirit defined in the claims and included within the technical scope of the present technology.

The present disclosure contains subject matter related to that disclosed in Japanese Priority Patent Application JP 2012-031652 filed in the Japan Patent Office on Feb. 16, 2012, the entire content of which is hereby incorporated by reference.

What is claimed is:

1. An information processing device, comprising:
    a central processing unit (CPU) configured to:
        acquire, for one or a plurality of first vehicles that travel according to a content of reference information including a predetermined traveling speed or arrival time, difference information representing a difference between an actual traveling speed or arrival time in each of the one or the plurality of first vehicles and the content of the reference information;
        analyze a road status in a predetermined region using the difference information related to the one or the plurality of first vehicles present in the predetermined region; and
        detect a traffic congestion state of a road of the predetermined region,
    wherein, when a proportion of first vehicles whose actual traveling speed is slower than a predetermined traveling speed included in the reference information to the one or the plurality of first vehicles present in the predetermined region is larger than a first predetermined threshold value, the CPU is configured to determine that the road of the predetermined region is in a traffic congestion state.

2. The information processing device according to claim 1, wherein, when a number of the first vehicles whose actual traveling speed is slower than the predetermined traveling speed included in the reference information among the one or the plurality of first vehicles present in the predetermined region is larger than a second predetermined threshold value, it is determined that the road of the predetermined region is in the traffic congestion state.

3. The information processing device according to claim 1, wherein, when a proportion of first vehicles whose actual arrival time is later than a predetermined arrival time included in the reference information to the one or the plurality of first vehicles present in the predetermined region is larger than a third predetermined threshold value, the CPU is configured to determine that the road of the predetermined region is in the traffic congestion state.

4. The information processing device according to claim 1, wherein, when a number of first vehicles whose actual arrival time is later than a predetermined arrival time included in the reference information among the one or the plurality of first vehicles present in the predetermined region is larger than a fourth predetermined threshold value, the CPU is configured to determine that the road of the predetermined region is in the traffic congestion state.

5. The information processing device according to claim 3, wherein, when a setting spot to which the predetermined arrival time is set is not present in the predetermined region, the CPU is configured to detect the traffic congestion state of the road in the predetermined region using the actual arrival time at a closest setting spot before a vehicle enters the predetermined region or after the vehicle leaves the predetermined region.

6. The information processing device according to claim 1, wherein the reference information is set to distinguish at least between an automobile expressway and another road, and
    wherein, when the automobile expressway and the other road are present within the predetermined region, the CPU is operable to detect a traffic congestion state in the automobile expressway and a traffic congestion state in the other road.

7. The information processing device according to claim 3, wherein the CPU is configured to:
    provide information of the road in the traffic congestion state to the one or the plurality of first vehicles, a second vehicle different from the one or the plurality of first vehicles, or a device that manages the one or the plurality of first vehicles,
    provide information related to the predetermined region designated from an information provision destination or information related to the predetermined region and a neighboring region.

8. The information processing device according to claim 7, wherein, when a current position and a destination are designated as the information related to the predetermined region, the CPU is configured to provide a route to bypass the road determined to be in the traffic congestion state as the information related to the predetermined region.

9. The information processing device according to claim 1, wherein, when the road of the predetermined region is determined to be in the traffic congestion state, the CPU is configured to predict a cause of traffic congestion using the difference information.

10. The information processing device according to claim 1,
    wherein the one or the plurality of first vehicles are vehicles belonging to a same type of business.

11. The information processing device according to claim 10,
    wherein the one or the plurality of first vehicles are vehicles whose operation is controlled by the reference information.

12. The information processing device according to claim 11,
    wherein the one or the plurality of first vehicles are vehicles of a public transportation system.

13. The information processing device according to claim 1,
    wherein the CPU is configured to extract the road that is in the traffic congestion state for a time more than a predetermined time or the predetermined region including the road.

14. A terminal device, comprising:
a display unit that displays an analysis result of a road status in a predetermined region, which is analyzed using difference information related to first vehicles present within the predetermined region among pieces of difference information representing a difference between an actual traveling speed or arrival time in each first vehicle and a content of reference information, the pieces of difference information being acquired for one or a plurality of the first vehicles traveling according to the content of the reference information including a predetermined traveling speed or arrival time, wherein, when a proportion of first vehicles whose actual traveling speed is slower than a predetermined traveling speed included in the reference information to the first vehicles present in the predetermined region is larger than a predetermined threshold value, a road of the predetermined region is determined to be in a traffic congestion state.

15. An information processing method, comprising:
in an information processing device comprising a central processing unit (CPU):
acquiring, for one or a plurality of first vehicles that travel according to a content of reference information including a predetermined traveling speed or arrival time, difference information representing a difference between an actual traveling speed or arrival time in each of the one or the plurality of first vehicles and the content of the reference information;
analyzing a road status in a predetermined region using the difference information related to the one or the plurality of first vehicles present in the predetermined region; and
determining that a road of the predetermined region is in a traffic congestion state when a proportion of first vehicles whose actual traveling speed is slower than a predetermined traveling speed included in the reference information to the one or the plurality of first vehicles present in the predetermined region is larger than a predetermined threshold value.

16. An information processing device, comprising:
a central processing unit (CPU) configured to:
acquire, for one or a plurality of first vehicles that travel according to a content of reference information including a predetermined traveling speed or arrival time, difference information representing a difference between an actual traveling speed or arrival time in each of the one or the plurality of first vehicles and the content of the reference information;
analyze a road status in a predetermined region using the difference information related to the one or the plurality of first vehicles present in the predetermined region; and
detect a traffic congestion state of a road of the predetermined region,
wherein, when a number of first vehicles whose actual traveling speed is slower than a predetermined traveling speed included in the reference information among the one or the plurality of first vehicles present in the predetermined region is larger than a predetermined threshold value, the CPU determines that the road of the predetermined region is in the traffic congestion state.

* * * * *